(12) United States Patent
Thompkins et al.

(10) Patent No.: US 10,522,836 B2
(45) Date of Patent: Dec. 31, 2019

(54) CARBON-LEAD BLENDS FOR USE IN HYBRID ENERGY STORAGE DEVICES

(75) Inventors: Leah A. Thompkins, Seattle, WA (US); Aaron M. Feaver, Seattle, WA (US); Henry R. Costantino, Woodinville, WA (US); Alan Tzu-Yang Chang, Renton, WA (US); Katharine Geramita, Seattle, WA (US); Avery Sakshaug, Everett, WA (US); Matthew J. Maroon, Peoria, IL (US)

(73) Assignee: BASF SE, Ludwigshafen (DE)

( * ) Notice: Subject to any disclaimer, the term of this patent is extended or adjusted under 35 U.S.C. 154(b) by 372 days.

(21) Appl. No.: 13/486,731

(22) Filed: Jun. 1, 2012

(65) Prior Publication Data

US 2013/0004841 A1 Jan. 3, 2013

Related U.S. Application Data

(60) Provisional application No. 61/493,350, filed on Jun. 3, 2011.

(51) Int. Cl.
*H01M 4/36* (2006.01)
*H01M 4/62* (2006.01)
(Continued)

(52) U.S. Cl.
CPC ............... *H01M 4/625* (2013.01); *C08K 3/04* (2013.01); *C08K 3/08* (2013.01); *C08K 7/22* (2013.01); *H01B 1/18* (2013.01); *H01G 11/50* (2013.01); *H01M 4/14* (2013.01); *H01M 4/56* (2013.01); *H01M 4/583* (2013.01); *H01B 1/02* (2013.01); *H01B 1/04* (2013.01); *H01M 10/06* (2013.01); *H01M 2004/021* (2013.01); *Y02E 60/126* (2013.01); *Y02E 60/13* (2013.01); *Y02T 10/7016* (2013.01); *Y02T 10/7022* (2013.01)

(58) Field of Classification Search
None
See application file for complete search history.

(56) References Cited

U.S. PATENT DOCUMENTS 3,518,123 A    6/1970    Katsoulis et al.
3,619,428 A *   11/1971    David ............................. 264/14
(Continued)

FOREIGN PATENT DOCUMENTS

CA      2176452 A1    11/1997
CN      1554102 A     12/2004
(Continued)

OTHER PUBLICATIONS

WebElements "Lead"; attached as a PDF showing the webpage availability date as Aug. 14, 2009 (via the Wayback Machine); web URL is http://www.webelements.com/lead/, pp. 1-3.*
(Continued)

*Primary Examiner* — Katie L. Hammer
(74) *Attorney, Agent, or Firm* — Seed Intellectual Property Law Group LLP

(57) ABSTRACT

The present application is directed to blends comprising a plurality of carbon particles and a plurality of lead particles. The blends find utility in any number of electrical devices, for example, in lead acid batteries. Methods for making and using the blends are also disclosed.

41 Claims, 15 Drawing Sheets

(51) Int. Cl.
*H01M 4/56* (2006.01)
*H01M 4/60* (2006.01)
*H01B 1/18* (2006.01)
*C08K 3/04* (2006.01)
*C08K 3/08* (2006.01)
*C08K 7/22* (2006.01)
*H01M 4/583* (2010.01)
*H01G 11/50* (2013.01)
*H01M 4/14* (2006.01)
*H01B 1/02* (2006.01)
*H01B 1/04* (2006.01)
*H01M 4/02* (2006.01)
*H01M 10/06* (2006.01)

(56) References Cited

U.S. PATENT DOCUMENTS

| | | | |
|---|---|---|---|
| 3,876,505 A | 4/1975 | Stoneburner | |
| 3,977,901 A | 8/1976 | Buzzelli | |
| 4,082,694 A | 4/1978 | Wennerberg et al. | |
| 4,159,913 A | 7/1979 | Birchall et al. | |
| 4,198,382 A | 4/1980 | Matsui | |
| 4,543,341 A | 9/1985 | Barringer et al. | |
| 4,580,404 A | 4/1986 | Pez et al. | |
| 4,769,197 A | 9/1988 | Kromrey | |
| 4,843,015 A | 6/1989 | Grubbs, Jr. et al. | |
| 4,862,328 A | 8/1989 | Morimoto et al. | |
| 4,873,218 A | 10/1989 | Pekala | |
| 4,954,469 A | 9/1990 | Robinson | |
| 4,997,804 A | 3/1991 | Pekala | |
| 4,999,330 A | 3/1991 | Bose et al. | |
| 5,061,416 A | 10/1991 | Willkens et al. | |
| 5,093,216 A | 3/1992 | Azuma et al. | |
| 5,260,855 A | 11/1993 | Kaschmitter et al. | |
| 5,294,498 A | 3/1994 | Omaru et al. | |
| 5,416,056 A | 5/1995 | Baker | |
| 5,420,168 A | 5/1995 | Mayer et al. | |
| 5,465,603 A | 11/1995 | Anthony et al. | |
| 5,508,341 A | 4/1996 | Mayer et al. | |
| 5,529,971 A | 6/1996 | Kaschmitter et al. | |
| 5,614,460 A | 3/1997 | Schwarz et al. | |
| 5,626,637 A | 5/1997 | Baker | |
| 5,626,977 A | 5/1997 | Mayer et al. | |
| 5,670,571 A | 9/1997 | Gabrielson et al. | |
| 5,674,642 A | 10/1997 | Le et al. | |
| 5,710,092 A | 1/1998 | Baker | |
| 5,726,118 A | 3/1998 | Ivey et al. | |
| 5,744,258 A | 4/1998 | Bai et al. | |
| 5,789,338 A | 8/1998 | Kaschmitter et al. | |
| 5,834,138 A | 11/1998 | Yamada et al. | |
| 5,858,486 A | 1/1999 | Metter et al. | |
| 5,882,621 A | 3/1999 | Doddapaneni et al. | |
| 5,891,822 A | 4/1999 | Oyama et al. | |
| 5,908,896 A | 6/1999 | Mayer et al. | |
| 5,945,084 A | 8/1999 | Droege | |
| 5,965,483 A * | 10/1999 | Baker | C01B 31/08 502/425 |
| 6,006,797 A | 12/1999 | Bülow et al. | |
| 6,064,560 A | 5/2000 | Hirahara et al. | |
| 6,069,107 A | 5/2000 | Kuznetsov et al. | |
| 6,072,693 A | 6/2000 | Tsushima et al. | |
| 6,096,456 A | 8/2000 | Takeuchi et al. | |
| 6,117,585 A * | 9/2000 | Anani | H01G 4/40 429/122 |
| 6,147,213 A | 11/2000 | Poli et al. | |
| 6,153,562 A | 11/2000 | Villar et al. | |
| 6,205,016 B1 | 3/2001 | Niu | |
| 6,225,257 B1 | 5/2001 | Putyera et al. | |
| 6,242,127 B1 | 6/2001 | Paik et al. | |
| 6,309,446 B1 | 10/2001 | Nakanoya et al. | |
| 6,310,762 B1 | 10/2001 | Okamura et al. | |
| 6,339,528 B1 | 1/2002 | Lee et al. | |
| 6,509,119 B1 | 1/2003 | Kobayashi et al. | |
| 6,574,092 B2 | 6/2003 | Sato et al. | |
| 6,592,838 B1 | 7/2003 | Nomoto et al. | |
| 6,697,249 B2 | 2/2004 | Maletin et al. | |
| 6,764,667 B1 | 7/2004 | Steiner, III | |
| 6,815,105 B2 | 11/2004 | Cooper et al. | |
| 7,245,478 B2 | 7/2007 | Zhong et al. | |
| 7,419,649 B2 | 9/2008 | Lundquist et al. | |
| 7,582,902 B2 | 9/2009 | Tano et al. | |
| 7,626,804 B2 | 12/2009 | Yoshio et al. | |
| 7,722,991 B2 | 5/2010 | Zhang et al. | |
| 7,723,262 B2 | 5/2010 | Feaver et al. | |
| 7,754,178 B2 | 7/2010 | Tano et al. | |
| 7,785,495 B2 | 8/2010 | Kikuchi et al. | |
| 7,816,413 B2 | 10/2010 | Feaver et al. | |
| 7,835,136 B2 | 11/2010 | Feaver et al. | |
| 8,158,556 B2 | 4/2012 | Feaver et al. | |
| 8,277,974 B2 | 10/2012 | Kumar et al. | |
| 8,293,818 B2 | 10/2012 | Costantino et al. | |
| 8,329,252 B2 | 12/2012 | Makarov et al. | |
| 8,361,659 B2 | 1/2013 | Richard | |
| 8,404,384 B2 | 3/2013 | Feaver et al. | |
| 8,411,415 B2 | 4/2013 | Yoshinaga et al. | |
| 8,467,170 B2 | 6/2013 | Feaver et al. | |
| 8,480,930 B2 | 7/2013 | Suh et al. | |
| 8,482,900 B2 | 7/2013 | Gadkaree et al. | |
| 8,580,870 B2 | 11/2013 | Costantino et al. | |
| 8,691,177 B2 | 4/2014 | Pfeifer et al. | |
| 9,067,848 B2 | 6/2015 | Stadie et al. | |
| 9,133,295 B2 | 9/2015 | Qureshi et al. | |
| 9,133,337 B2 | 9/2015 | Ludvik et al. | |
| 9,136,064 B2 | 9/2015 | Gadkaree et al. | |
| 9,186,174 B2 | 11/2015 | Krishnan | |
| 9,409,777 B2 | 8/2016 | Geramita et al. | |
| 9,412,523 B2 | 8/2016 | Costantino et al. | |
| 9,464,162 B2 | 10/2016 | Kron et al. | |
| 9,580,321 B2 | 2/2017 | Feaver et al. | |
| 9,680,159 B2 | 6/2017 | Feaver et al. | |
| 9,714,172 B2 | 7/2017 | Geramita et al. | |
| 9,985,289 B2 | 5/2018 | Costantino et al. | |
| 2001/0002086 A1 | 5/2001 | Webb | |
| 2002/0031706 A1 | 3/2002 | Dasgupta et al. | |
| 2002/0031710 A1 | 3/2002 | Kezuka et al. | |
| 2002/0036885 A1 | 3/2002 | Lee et al. | |
| 2002/0104474 A1 | 8/2002 | Wakamatsu et al. | |
| 2002/0114126 A1 | 8/2002 | Hirahara et al. | |
| 2002/0122985 A1 | 9/2002 | Sato et al. | |
| 2002/0168314 A1 | 11/2002 | Roemmler | |
| 2002/0172637 A1 | 11/2002 | Chesneau et al. | |
| 2003/0012722 A1 | 1/2003 | Liu | |
| 2003/0013606 A1 | 1/2003 | Hampden-Smith et al. | |
| 2003/0064564 A1 | 4/2003 | Lin | |
| 2003/0064565 A1 | 4/2003 | Maletin et al. | |
| 2003/0108785 A1 | 6/2003 | Wu et al. | |
| 2003/0170548 A1 | 9/2003 | Otsuki et al. | |
| 2004/0106040 A1 | 6/2004 | Fukuoka et al. | |
| 2004/0132845 A1 | 7/2004 | Rhine et al. | |
| 2004/0141963 A1 | 7/2004 | Umekawa et al. | |
| 2004/0180264 A1 | 9/2004 | Honbo et al. | |
| 2004/0241237 A1 * | 12/2004 | Pirard | B01J 21/18 424/484 |
| 2004/0248730 A1 | 12/2004 | Kim et al. | |
| 2004/0248790 A1 | 12/2004 | Hinuma et al. | |
| 2005/0014643 A1 | 1/2005 | Lini et al. | |
| 2005/0041370 A1 | 2/2005 | Wilk et al. | |
| 2005/0058589 A1 | 3/2005 | Lundquist et al. | |
| 2005/0058907 A1 | 3/2005 | Kurihara et al. | |
| 2005/0079349 A1 * | 4/2005 | Hampden-Smith | B01J 2/003 428/402 |
| 2005/0079359 A1 | 4/2005 | Fujita et al. | |
| 2005/0135993 A1 | 6/2005 | Xu et al. | |
| 2005/0153130 A1 | 7/2005 | Long et al. | |
| 2005/0196336 A1 * | 9/2005 | Chatterjee et al. | 423/448 |
| 2005/0221981 A1 | 10/2005 | Wagh et al. | |
| 2005/0233195 A1 | 10/2005 | Arnold et al. | |
| 2005/0250011 A1 | 11/2005 | Mitchell et al. | |
| 2005/0266990 A1 | 12/2005 | Iwasaki et al. | |
| 2006/0008408 A1 | 1/2006 | Yoon et al. | |
| 2006/0057355 A1 | 3/2006 | Suzuki et al. | |
| 2006/0079587 A1 | 4/2006 | Albert et al. | |
| 2006/0093915 A1 | 5/2006 | Lundquist et al. | |

(56) References Cited

U.S. PATENT DOCUMENTS

| | | |
|---|---|---|
| 2006/0223965 A1 | 10/2006 | Trifu |
| 2006/0240979 A1 | 10/2006 | Hirahara et al. |
| 2007/0002523 A1 | 1/2007 | Ando et al. |
| 2007/0008677 A1 | 1/2007 | Zhong et al. |
| 2007/0048605 A1 | 3/2007 | Pez et al. |
| 2007/0104981 A1* | 5/2007 | Lam ............ H01M 2/28 429/7 |
| 2007/0113735 A1 | 5/2007 | Feaver et al. |
| 2007/0142222 A1 | 6/2007 | Erkey et al. |
| 2007/0166602 A1 | 7/2007 | Burchardt |
| 2007/0292732 A1 | 12/2007 | Feaver et al. |
| 2008/0011986 A1 | 1/2008 | Yamakawa et al. |
| 2008/0044726 A1 | 2/2008 | Feng et al. |
| 2008/0112876 A1 | 5/2008 | Dailey |
| 2008/0132632 A1 | 6/2008 | Schiraldi et al. |
| 2008/0145757 A1 | 6/2008 | Mah et al. |
| 2008/0145761 A1 | 6/2008 | Petrat et al. |
| 2008/0180881 A1 | 7/2008 | Feaver et al. |
| 2008/0201925 A1 | 8/2008 | Zhong et al. |
| 2008/0204973 A1 | 8/2008 | Zhong et al. |
| 2008/0206638 A1 | 8/2008 | Takahashi et al. |
| 2008/0241640 A1 | 10/2008 | Rajeshwar et al. |
| 2008/0268297 A1 | 10/2008 | Quayle et al. |
| 2008/0293911 A1 | 11/2008 | Qureshi et al. |
| 2008/0297981 A1 | 12/2008 | Endo et al. |
| 2008/0299456 A1 | 12/2008 | Shiga et al. |
| 2009/0035344 A1 | 2/2009 | Thomas et al. |
| 2009/0053594 A1 | 2/2009 | Johnson et al. |
| 2009/0097189 A1 | 4/2009 | Tasaki et al. |
| 2009/0104509 A1 | 4/2009 | Kwak et al. |
| 2009/0104530 A1 | 4/2009 | Shizuka et al. |
| 2009/0114544 A1 | 5/2009 | Rousseau et al. |
| 2009/0117466 A1 | 5/2009 | Zhamu et al. |
| 2009/0145482 A1 | 6/2009 | Mitzi et al. |
| 2009/0185327 A1 | 7/2009 | Seymour |
| 2009/0213529 A1 | 8/2009 | Gogotsi et al. |
| 2009/0286160 A1 | 11/2009 | Kozono et al. |
| 2010/0008021 A1 | 1/2010 | Hu et al. |
| 2010/0047671 A1 | 2/2010 | Chiang et al. |
| 2010/0051881 A1* | 3/2010 | Ahn et al. ............ 252/513 |
| 2010/0092370 A1 | 4/2010 | Zhang et al. |
| 2010/0097741 A1 | 4/2010 | Zhong et al. |
| 2010/0098615 A1 | 4/2010 | Tennison et al. |
| 2010/0110613 A1 | 5/2010 | Zhong et al. |
| 2010/0288970 A1 | 11/2010 | Watanabe et al. |
| 2010/0310941 A1 | 12/2010 | Kumta et al. |
| 2010/0316907 A1 | 12/2010 | Yamamoto et al. |
| 2010/0331179 A1 | 12/2010 | Feaver et al. |
| 2011/0002086 A1 | 1/2011 | Feaver et al. |
| 2011/0028599 A1 | 2/2011 | Costantino et al. |
| 2011/0053765 A1 | 3/2011 | Feaver et al. |
| 2011/0111284 A1 | 5/2011 | Maeshima et al. |
| 2011/0159375 A1 | 6/2011 | Feaver et al. |
| 2011/0177393 A1 | 7/2011 | Park et al. |
| 2011/0199716 A1 | 8/2011 | Feaver et al. |
| 2011/0200848 A1 | 8/2011 | Chiang et al. |
| 2011/0223494 A1 | 9/2011 | Feaver et al. |
| 2011/0281180 A1* | 11/2011 | Kim ............ H01M 4/133 429/338 |
| 2011/0287189 A1 | 11/2011 | Shembel et al. |
| 2012/0045685 A1 | 2/2012 | Seki et al. |
| 2012/0081838 A1* | 4/2012 | Costantino ............ H01B 1/04 361/502 |
| 2012/0129049 A1 | 5/2012 | Rayner |
| 2012/0156567 A1 | 6/2012 | Ayme-Perrot et al. |
| 2012/0183856 A1 | 7/2012 | Cui et al. |
| 2012/0241691 A1 | 9/2012 | Soneda et al. |
| 2012/0251876 A1 | 10/2012 | Jagannathan |
| 2012/0262127 A1 | 10/2012 | Feaver et al. |
| 2012/0264020 A1 | 10/2012 | Burton et al. |
| 2012/0305651 A1 | 12/2012 | Anderson et al. |
| 2012/0308870 A1 | 12/2012 | Okuda et al. |
| 2012/0321959 A1 | 12/2012 | Yushin et al. |
| 2013/0020349 A1 | 1/2013 | Feaver et al. |
| 2013/0082213 A1 | 4/2013 | Duncan et al. |
| 2013/0157151 A1 | 6/2013 | Feaver et al. |
| 2013/0169238 A1 | 7/2013 | Rojeski |
| 2013/0189575 A1 | 7/2013 | Anguchamy et al. |
| 2013/0244862 A1 | 9/2013 | Ivanovici et al. |
| 2013/0252082 A1 | 9/2013 | Thompkins et al. |
| 2013/0280601 A1 | 10/2013 | Geramita et al. |
| 2013/0295462 A1 | 11/2013 | Atanassova et al. |
| 2013/0321982 A1 | 12/2013 | Feaver et al. |
| 2013/0337334 A1 | 12/2013 | Tao et al. |
| 2013/0344391 A1 | 12/2013 | Yushin et al. |
| 2014/0038042 A1 | 2/2014 | Rios et al. |
| 2014/0170482 A1 | 6/2014 | Park et al. |
| 2014/0287317 A1 | 9/2014 | Tiquet et al. |
| 2014/0302396 A1 | 10/2014 | Lu et al. |
| 2014/0335410 A1 | 11/2014 | Loveridge et al. |
| 2015/0037249 A1 | 2/2015 | Fu |
| 2015/0062781 A1 | 3/2015 | Feaver et al. |
| 2015/0162603 A1 | 6/2015 | Yushin et al. |
| 2015/0207148 A1 | 7/2015 | Kimura et al. |
| 2015/0255800 A1 | 9/2015 | Feaver et al. |
| 2016/0039970 A1 | 2/2016 | Kron et al. |
| 2016/0043384 A1 | 2/2016 | Zhamu et al. |
| 2016/0104882 A1 | 4/2016 | Yushin et al. |
| 2016/0122185 A1 | 5/2016 | Feaver et al. |
| 2016/0133394 A1 | 5/2016 | Sakshaug et al. |
| 2016/0344030 A1 | 11/2016 | Sakshaug et al. |
| 2016/0372750 A1 | 12/2016 | Chang et al. |
| 2017/0015559 A1 | 1/2017 | Costantino et al. |
| 2017/0152340 A1 | 6/2017 | Geramita et al. |
| 2017/0155148 A1 | 6/2017 | Costantino et al. |
| 2017/0170477 A1 | 6/2017 | Sakshaug et al. |
| 2017/0346084 A1 | 11/2017 | Sakshaug et al. |
| 2017/0349442 A1 | 12/2017 | Feaver et al. |
| 2018/0097240 A1 | 4/2018 | Feaver et al. |
| 2018/0130609 A1 | 5/2018 | Feaver et al. |
| 2018/0294484 A1 | 10/2018 | Fredrick et al. |
| 2018/0331356 A1 | 11/2018 | Feaver et al. |
| 2019/0097222 A1 | 3/2019 | Feaver et al. |
| 2019/0103608 A1 | 4/2019 | Costantino et al. |

FOREIGN PATENT DOCUMENTS

| | | |
|---|---|---|
| CN | 1762900 A | 4/2006 |
| CN | 1986401 A | 6/2007 |
| CN | 101194384 A | 6/2008 |
| CN | 101318648 A | 12/2008 |
| CN | 101604743 A | 12/2009 |
| CN | 101969120 A | 2/2011 |
| CN | 102482095 A | 5/2012 |
| CN | 102820455 A | 12/2012 |
| CN | 102834955 A | 12/2012 |
| CN | 103094528 A | 5/2013 |
| CN | 103746098 A | 4/2014 |
| CN | 104108698 A | 10/2014 |
| CN | 102509781 B | 11/2015 |
| DE | 10 210 049 249 A1 | 4/2012 |
| EP | 0 649 815 A1 | 4/1995 |
| EP | 0 861 804 A1 | 9/1998 |
| EP | 1 049 116 A1 | 11/2000 |
| EP | 1 052 716 A2 | 11/2000 |
| EP | 1 115 130 A1 | 7/2001 |
| EP | 1 514 859 A2 | 3/2005 |
| EP | 2 117 068 A1 | 11/2009 |
| EP | 2 983 186 A1 | 2/2016 |
| JP | 2-300222 A | 12/1990 |
| JP | 4-59806 A | 2/1992 |
| JP | 4-139174 A | 5/1992 |
| JP | 5-117493 A | 5/1993 |
| JP | 5-156121 A | 6/1993 |
| JP | 05-320955 A | 12/1993 |
| JP | 7-232908 A | 9/1995 |
| JP | 8-59919 A | 3/1996 |
| JP | 8-112539 A | 5/1996 |
| JP | 9-63905 A | 3/1997 |
| JP | 9-275042 A | 10/1997 |
| JP | 9-328308 A | 12/1997 |
| JP | 10-297912 A | 11/1998 |
| JP | 2001-89119 A | 4/2001 |
| JP | 2001-278609 A | 10/2001 |

(56) References Cited

FOREIGN PATENT DOCUMENTS

| | | |
|---|---|---|
| JP | 2002-532689 A | 10/2002 |
| JP | 2004-67498 A | 3/2004 |
| JP | 2004-514637 A | 5/2004 |
| JP | 2004-203715 A | 7/2004 |
| JP | 2004-221332 A | 8/2004 |
| JP | 2004-315283 A | 11/2004 |
| JP | 2005-93984 A | 4/2005 |
| JP | 2005-132696 A | 5/2005 |
| JP | 2005-136397 A | 5/2005 |
| JP | 2005-187320 A | 7/2005 |
| JP | 2006-160597 A | 6/2006 |
| JP | 2006-248848 A | 9/2006 |
| JP | 2006-264993 A | 10/2006 |
| JP | 2007-115749 A | 5/2007 |
| JP | 2008-7387 A | 1/2008 |
| JP | 2008-094925 A | 4/2008 |
| JP | 2009-259803 A | 11/2009 |
| JP | 2009259803 A * | 11/2009 |
| JP | 2012-121796 A | 6/2012 |
| WO | 95/01165 A1 | 1/1995 |
| WO | 98/30496 A1 | 7/1998 |
| WO | 02/39468 A2 | 5/2002 |
| WO | 2004/087285 A1 | 10/2004 |
| WO | 2004/099073 A2 | 11/2004 |
| WO | 2004/110930 A1 | 12/2004 |
| WO | 2005/043653 A1 | 5/2005 |
| WO | 2007/061761 A1 | 5/2007 |
| WO | 2008/047700 A1 | 4/2008 |
| WO | 2008/113133 A1 | 9/2008 |
| WO | 2009/032104 A2 | 3/2009 |
| WO | 2010/032782 A1 | 3/2010 |
| WO | 2010/059749 A1 | 5/2010 |
| WO | 2010/138760 A2 | 12/2010 |
| WO | 2011/002536 A2 | 1/2011 |
| WO | 2011/003033 A1 | 1/2011 |
| WO | 2012/045002 A1 | 4/2012 |
| WO | 2012/071916 A1 | 6/2012 |
| WO | 2012/092210 A1 | 7/2012 |
| WO | 2013/120009 A1 | 8/2013 |
| WO | 2013/120011 A1 | 8/2013 |
| WO | 2014/201275 A2 | 12/2014 |

OTHER PUBLICATIONS

English text translation of Hoshiba (JP 2009-259803 A), accessed from the EPO website, attached as a PDF.*
IGCL.com ("Activated Carbon" page on Indo German Carbons Limited website, weblink http://www.igcl.com/php/activated_carbon.php; Internet Archive Wayback Machine shows an availability date of Apr. 17, 2009; screenshot PDF pp. 1-3). (Year: 2009).*
Abraham et al., "A Polymer Electrolyte-Based Rechargeable Lithium/Oxygen Battery," *J. Electrochem. Soc.* 143(1):1, Jan. 1996.
Alcañiz-Monge et al., "Methane Storage in Activated Carbon Fibres," *Carbon* 35(2):291-297, 1997.
Anderegg, "Grading Aggregates: II—The Application of Mathematical Formulas to Mortars," *Industrial and Engineering Chemistry* 23(9): 1058-1064, 1931.
Andreasen et al., "Ueber die Beziehung zwischen Kornabstufung and Zwischenraum in Produkten aus losen Körnern (mit einigen Experimenten)," *Kolloid-Zeitschrift* 50(3):217-228, Mar. 1930 (with translation of summary).
Babić et al., "Carbon cryogel as support of platinum nano-sized electrocatalyst for the hydrogen oxidation reaction," *Electrochemica Acta* 51:3820-3826, 2006.
Babić et al., "Characterization of carbon cryogel synthesized by sol-gel polycondensation and freeze-drying," *Carbon* 42:2617-2624, 2004.
Babić et al., "Characterization of carbon cryogels synthesized by sol-gel polycondensation," *J. Serb. Chem. Soc.* 70(1):21-31, 2005.
Barbieri et al., "Capacitance limits of high surface area activated carbons for double layer capacitors," *Carbon* 43:1303-1310, 2005.
Barton et al., "Tailored Porous Materials," *Chem. Mater.* 11:2633-2656, 1999.
Beattie et al., "High-Capacity Lithium-Air Cathodes," *J. Electrochem. Soc.* 156(1):A44-A47, 2009.
Besenhard, "Handbook of battery materials," *Weinheim, Wiley—VCH*, Weinheim, New York, 398-401, Dec. 31, 1999.
Bock et al., "Structural Investigation of Resorcinol Formaldehyde and Carbon Aerogels Using Saxs and Bet,"*Journal of Porous Materials* 4:287-294, 1997.
Buiel, et al., "Li-insertion in hard carbon anode materials for Li-ion batteries," *Electrochimica Acta* 45:121-130, 1999.
Burchell et al., "Low Pressure Storage of Natural Gas for Vehicular Applications," *The Engineering Society for Advancing Mobility Land Sea Air and Space*, Government/Industry Meeting, Washington D.C., Jun. 19-21, 2000, 7 pages.
Butler et al., "Braking Performance Test Procedure for the Hybrid Vehicle Energy Storage Systems: Capacitor Test Results," *Joint International Meeting of the Electrochemical Society*, Abstract 684, Honolulu, HI, Oct. 3-8, 2004, 5 pages.
Chmiola et al., "Anomalous Increase in Carbon Capacitance at Pore Sizes Less Than 1 Nanometer," *Science* 313:1760-1763, Sep. 22, 2006.
Conway et al., "Partial Molal Volumes of Tetraalkylammonium Halides and Assignment of Individual Ionic Contributions," *Trans. Faraday Soc.* 62:2738-2749, 1966.
Czakkel et al., "Influence of drying on the morphology of resorcinol-formaldehyde-based carbon gels," *Microporous and Mesoporous Materials* 86:124-133, 2005.
Débart et al., "α-$MnO_2$ Nanowires: A Catalyst for the $O_2$ Electrode in Rechargeable Lithium Batteries," *Agnew. Chem. Int. Ed.* 47:4521-4524, 2008.
Ding et al., "How Conductivities and Viscosities of PC-DEC and PC-EC Solutions of $LiBF_4$, $LiPF_6$, LiBOB, $Et_4NBF_4$, and $Et_4NBF_6$ Differ and Why," *Journal of the Electrochemical Society* 151(12):A2007-A2015, 2004.
Dinger et al., "Particle Packing III—Discrete versus Continuous Particle Sizes," *Interceram* 41(5):332-334, 1992.
Dinger et al., "Particle Packing IV—Computer Modelling of Particle Packing Phenomena," *Interceram* 42(3):150-152, 1993.
Edward, "Molecular Volumes and the Stokes-Einstein Equation," *Journal of Chemical Education* 47(4):261-270, Apr. 1970.
Eikerling et al., "Optimized Structure of Nanoporous Carbon-Based Double-Layer Capacitors," *Journal of the Electrochemical Society* 152(1):E24-E33, 2005.
Endo et al., "Morphology and organic EDLC applications of chemically activated AR-resin-based carbons," *Carbon* 40:2613-2626, 2002.
Feaver et al., "Activated carbon cryogels for low pressure methane storage," *Carbon* 44:590-593, 2006.
Furnas, "Grading Aggregates I—Mathematical Relations for Beds of Broken Solids of Maximum Density," *Industrial and Engineering Chemistry* 23(9): 1052-1058, 1931.
Gouérec et al., "Preparation and Modification of Polyacrylonitrile Microcellular Foam Films for Use as Electrodes in Supercapacitors," *Journal of the Electrochemical Society* 148(1):A94-A101, 2001.
Hahn et al., "A dilatometric study of the voltage limitation of carbonaceous electrodes in aprotic EDLC type electrolytes by charge-induced strain," *Carbon* 44:2523-2533, 2006.
Hasegawa et al., "Preparation of carbon gel microspheres containing silicon powder for lithium ion battery anodes," *Carbon* 42:2573-2579, 2004.
Hirscher et al., "Are carbon nanostructures an efficient hydrogen storage medium?" *Journal of Alloys and Compounds* 356-357:433-437, 2003.
Hsieh et al., "Synthesis of mesoporous carbon composite and its electric double-layer formation behavior," *Microporous and Mesoporous Materials* 93:232-239, 2006.
Hu et al., "Effects of electrolytes and electrochemical pretreatments on the capacitive characteristics of activated carbon fabrics for supercapacitors," *Journal of Power Sources* 125:299-308, 2004.
Inomata et al., "Natural gas storage in activated carbon pellets without a binder," *Carbon* 40:87-93, 2002.

(56) References Cited

OTHER PUBLICATIONS

International Preliminary Report of Patentability for International Application No. PCT/US/2010/030396, dated Jul. 23, 2013, 9 pages.
International Preliminary Report of Patentability for International Application No. PCT/US2006/044524, dated May 27, 2008, 7 pages.
International Preliminary Report of Patentability for International Application No. PCT/US2007/084886, dated May 19, 2009, 7 pages.
International Search Report and Written Opinion for International Application No. PCT/US2006/044524, dated Apr. 11, 2007, 8 pages.
International Search Report and Written Opinion for International Application No. PCT/US2007/84886, dated Jun. 11, 2008, 11 pages.
International Search Report and Written Opinion for International Application No. PCT/US2010/40836, dated Sep. 8, 2010, 12 pages.
International Search Report and Written Opinion for International Application No. PCT/US2010/059947, dated Mar. 2, 2011, 14 pages.
Job et al., "Carbon aerogels, cryogels and xerogels: Influence of the drying method on the textural properties of porous carbon materials," *Carbon* 43:2481-2494, 2005.
Khomenko et al., "High-voltage asymmetric supercapacitors operating in aqueous electrolyte," *Appl. Phys. A* 82:567-573, 2006.
Kocklenberg et al., "Texture control of freeze-dried resorcinol-formaldehyde gels," *Journal of Non-Crystalline Solids* 225:8-13, 1998.
Kowalczyk et al., "Estimation of the pore-size distribution function from the nitrogen adsorption isotherm. Comparison of density functional theory and the method of Do and co-workers," *Carbon* 41:1113-1125, 2003.
Lozano-Castelló et al., "Influence of pore structure and surface chemistry on electric double layer capacitance in non-aqueous electrolyte," *Carbon* 41:1765-1775, 2003.
Lozano-Castelló et al., "Powdered Activated Carbons and Activated Carbon Fibers for Methane Storage: A Comparative Study," *Energy & Fuels* 16:1321-1328, 2002.
McEwen et al., "Nonequeous Electrolytes and Novel Packaging Concepts for Electrochemical Capacitors," The 7th International Seminar on Double Layer capacitors and Similar Energy Storage Devices, Deerfield Beach, FL Dec. 8-10, 1997, 56 pages.
Miller, "Pulse Power Performance of Electrochemical Capacitors: Technical Status of Present Commercial Devices," Proceedings of the 8$^{th}$ International Seminar on Double Layer Capacitors and Similar Energy Storage Devices, Deerfield Beach, Florida, Dec. 7-9, 1998, 9 pages.
Nishihara et al., "Preparation of resorcinol—formaldehyde carbon cryogel microhoneycombs," *Carbon* 42:899-901, 2004.
Ogasawara et al., "Rechargeable $LI_2O_2$ Electrode for Lithium Batteries," *Journal American Chemical Society* 128(4):1390-1393, 2006.
Pääkkö, "Long and entangled native cellulose I nanofibers allow flexible aerogels and hierarchically porous templates for functionalities," *Soft Matter* 4:2492-2499, 2008.
Pekala et al., "Structure of Organic Aerogels. 1. Morphology and Scaling," *Macromolecules* 26:5487-5493, 1993.
Pekala, "Organic aerogels from the polycondensation of resorcinol with formaldehyde," *Journal of Materials Science* 24:3221-3227, 1989.
Perrin et al., "Methane Storage within Dry and Wet Active Carbons: A Comparative Study," *Energy & Fuels* 17:1283-1291, 2003.
Pojanavaraphan et al., "Prevulcanized natural rubber latex/clay aerogel nanocomposites," *European Polymer Journal* 44:1968-1977, 2008.
Qu et al., "Studies of activated carbons used in double-layer capacitors," *Journal of Power Sources* 74:99-107, 1998.
Ravikovitch et al., "Unified Approach to Pore Size Characterization of Microporous Carbonaceous Materials from $N_2$, Ar, and $CO_2$ Adsorption Isotherms," *Langmuir* 16:2311-2320, 2000.
Read, J., "Ether-Based Electrolytes for the Lithium/Oxygen Organic Electrolyte Battery," *J. Electrochem. Soc.* 153(1):A96-A100, 2006.
Read et al., "Oxygen Transport Properties of Organic Electrolytes and Performance of Lithium/Oxygen Battery," *J. Electrochem. Soc.* 150(10):A1351-A1356, 2003.
Read, J., "Characterization of the Lithium/Oxygen Organic Electrolyte Battery," *J. Electrochemical Soc.* 149(9):A1190-A1195, 2002.
Reichenauer et al., "Microporosity in carbon aerogels," *Journal of Non-Crystalline Solids* 225:210-214, 1998.
Salitra et al., "Carbon Electrodes for Double-Layer Capacitors I. Relations Between Ion and Pore Dimensions," *Journal of the Electrochemical Society* 147(7):2486-2493, 2000.
Setoyama et al., "Simulation Study on the Relationship Between a High Resolution $\alpha_S$-Plot and the Pore Size Distribution for Activated Carbon," *Carbon* 36(10):1459-1467, 1998.
Simon et al., "Materials for electrochemical capacitors," *Nature Materials* 7:845-854, Nov. 2008.
Takeuchi et al., "Removal of single component chlorinated hydrocarbon vapor by activated carbon of very high surface area," *Separation and Purification Technology* 15:79-90, 1999.
Tamon et al., "Influence of freeze-drying conditions on the mesoporosity of organic gels as carbon precursors," *Carbon* 38:1099-1105, 2000.
Tamon et al., "Preparation of mesoporous carbon by freeze drying," *Carbon* 37:2049-2055, 1999.
Tonanon et al., "Influence of surfactants on porous properties of carbon cryogels prepared by sol-gel polycondensation of resorcinol and formaldehyde," *Carbon* 41:2981-2990, 2003.
Toyo Tanso, "Isotropic Graphite Engineering Data," *Toyo Tanso Co., Ltd.* Catalog published 1994.
Toyo Tanso, "Isotropic Graphite Technical Data," *Toyo Tanso Co., Ltd.* Catalog published 1997.
Toyo Tanso, "Graphite Applications," *Toyo Tanso Co., Ltd.* Catalog published 1998. (Machine Translation attached).
Toyo Tanso Carbon Products, "Special Graphite and Compound Material Products," *Toyo Tanso Co., Ltd.* Catalog published 2008.
Ue, "Mobility and Ionic Association of Lithium and Quaternary Ammonium Salts in Propylene Carbonate and γ-Butyrolactone," *J. Electrochem. Soc.* 141(12):3336-3342, Dec. 1994.
Wei et al., "A novel electrode material for electric double-layer capacitors," *Journal of Power Sources* 141:386-391, 2005.
Williford et al., "Air electrode design for sustained high power operation of Li/air batteries," *Journal of Power Sources* 194:1164-1170, 2009.
Wu et al., "Fabrication and nano-structure control of carbon aerogels via a microemulsion-templated sol-gel polymerization method," *Carbon* 44:675-681, 2006.
Xie et al., "Pore size control of Pitch-based activated carbon fibers by pyrolytic deposition of propylene," *Applied Surface Science* 250:152-160, 2005.
Xu et al., "Optimization of Nonaqueous Electrolytes for Primary Lithium/Air Batteries Operated in Ambient Environment," *Journal of the Electrochemical Society* 156(10):A773-A779, 2009.
Yamamoto et al., "Control of mesoporosity of carbon gels prepared by sol-gel polycondensation and freeze drying," *Journal of Non-Crystalline Solids* 288:46-55, 2001.
Yamamoto et al., "Porous properties of carbon gel microspheres as adsorbents for gas separation," *Carbon* 42:1671-1676, 2004.
Yamamoto et al., "Preparation and characterization of carbon cryogel microspheres," *Carbon* 40:1345-1351, 2002.
Yang et al., "Preparation of highly microporous and mesoporous carbon from the mesophase pitch and its carbon foams with KOH," *Carbon* 42:1872-1875, 2004.
Zhang et al., "Discharge characteristic of non-aqueous electrolyte $Li/O_2$ battery," *Journal of Power Sources* 195:1235-1240, 2010.
Costantino et al., "Manufacturing Methods for the Production of Carbon Materials," U.S. Appl. No. 14/047,935, filed Oct. 7, 2013.
Thompkins et al., "Composite Carbon Materials Comprising Lithium Alloying Electrochemical Modifiers," U.S. Appl. No. 14/084,469, filed Nov. 19, 2013.
Feaver et al., "Mesoporous Carbon Materials Comprising Bifunctional Catalysts," filed Nov. 17, 2014, U.S. Appl. No. 14/543,587, 102 pages.

(56) References Cited

OTHER PUBLICATIONS

Constantino et al., "Carbon-Based Compositions With Highly Efficient Volumetric Gas Sorption," filed Nov. 5, 2014, U.S. Appl. No. 14/533,956, 90 pages.

Kim et al., "Adsorption of phenol and reactive dyes from aqueous solution on carbon cryogel microspheres with controlled porous structure," *Microporous and Mesoporous Materials* 96:191-196, 2006.

Job et al., "Highly dispersed platinum catalysts prepared by impregnation of texture-tailored carbon xerogels," *Journal of Catalysis* 240:160-171, 2006.

Job et al., "Synthesis of transition metal-doped carbon xerogels by solubilization of metal salts in resorcinol-formaldehyde aqueous solution," *Carbon* 42:3217-3227, 2004.

Cao et al., "Li-ion capacitors with carbon cathode and hard carbon/stabilized lithium metal powder anode electrodes, "*Journal of Power Sources* 213:180-185, Apr. 2012.

Kim et al., "Correlation between the capacitor performance and pore structure," *Tanso* 221:31-39, 2006.

Konno et al., "Preparation of activated carbon having the structure derived from biomass by alkali activation with NaOH, and its application for electric double-layer capacitor," *Tanso* 231:2-7, 2008.

Naoi et al., "Second generation 'nanohybrid supercapacitor': Evolution of capacitive energy storage devices," *Energy Environ. Sci.* 5:9363-9373, 2012.

Otowa et al., "Production and adsorption characteristics of MAXSORB: High-surface-area active carbon," *Gas seperation and Purification* 7(4):241-245, 1993.

Pekala et al., "Aerogels derived from multifunctional organic monomers," *Journal of Non-Crystalline Solids* 145:90-98, 1992.

Sivakkumar et al., "Evaluation of Lithium-ion capacitors assembled with pre-lithiated graphite anode and activated carbon cathode," *Electrochimica Acta* 65:280-287, Jan. 2012.

Xu et al., "Synthesis of mesoporous carbon and its adsorption property to biomolecules," *Macroporous and Mesoporous Materials* 115:461-468, 2008.

Gao et al., "Nitrogen-rich graphene from small molecules as high performance anode material," *Nanotechnology* 25:415402, 2014. (8 pages).

Hong et al., "Hydrogen evolution inhibition with diethylenetriamine modification of activated carbon for a lead-acid battery," *RSC Adv.* 4:33574, 2014. (4 pages).

Abánades et al., "Experimental analysis of direct thermal methane cracking," *International Journal of Hydrogen Energy* 36(20):12877-12886, 2011.

Fotouhi et al., "A low cost, disposable cable-shaped Al-air battery for portable biosensors," *J. Micromech. Microeng.* 26:055011, 2016. (8 pages).

Huang et al., "Nitrogen-containing mesoporous carbons prepared from melamine formaldehyde resins with $CaCl_2$ as a template," *J. Colloid Interface Sci.* 363(1):193-198, 2011.

Pimenta et al., "Studying disorder in graphite-based systems by Raman spectroscopy," *Phys. Chem. Chem. Phys.* 9:1276-1291, 2007.

Sigma Aldrich, "Triton X-100," Data Sheet, URL=https://www.sigmaaldrich.com/catalog/product/roche/11332481001?lang=en&region=US, download date Feb. 21, 2019.

Zhao et al., "Highly-Ordered Mesoporous Carbon Nitride with Ultrahigh Surface Area and Pore Volume as a Superior Dehydrogenation Catalyst," *Chem. Mater.* 26(10):3151-3161, 2014.

\* cited by examiner

CARBON-LEAD BLENDS FOR USE IN HYBRID ENERGY STORAGE DEVICES

CROSS-REFERENCE TO RELATED APPLICATION

This application claims the benefit under 35 U.S.C. § 119(e) of U.S. Provisional Patent Application No. 61/493,350 filed Jun. 3, 2011; which application is incorporated herein by reference in its entirety.

BACKGROUND

Technical Field

The present application relates to compositions and devices for energy storage and distribution. The compositions comprise a plurality of lead particles and a plurality of carbon particles and exhibit desirable electrochemical properties suitable for use in hybrid carbon-lead energy storage devices.

Description of the Related Art

Hybrid energy storage devices, also known as asymmetric supercapacitors or hybrid battery/supercapacitors, utilize a combination of battery electrodes and supercapacitor electrodes. For example, hybrid lead-carbon energy storage devices employ lead-acid battery positive electrodes (cathodes) and ultracapacitor negative electrodes (anodes). Such devices comprise a unique set of characteristics including long cycle life, increased power, fast recharge capability and a wide range of temperature operability.

Conventional lead-acid energy storage devices may have limited active life and power performance. Hybrid energy storage devices employing either carbon or lead-acid electrodes (but not their combination at the same electrode) may provide some improvement and advantages over conventional lead-acid devices; however, their active life, energy capacity and power performance can likewise be limited. For example, lead-based positive electrodes often fail due to a loss of active lead dioxide paste from the current collector grid after multiple charge/discharge cycles. The anodes of these devices also deteriorate upon multiple charge/discharge cycles because the discharge lead sulfate crystal size increases and leads to 'densification' of the negative plate resulting in reduced charge acceptance and loss of capacity. This electrode failure is thought to be a result of secondary and tertiary side reactions caused by impurities in the carbon materials employed in these devices. In addition, the low surface area of the electrodes and relatively high ion migration distances limits the power performance of these devices.

The conventional wisdom is that such energy storage devices, particularly those made in commercial quantities require significant compression of the electrodes as they are placed into the case for the energy storage device. Moreover, because supercapacitor energy storage devices of the sort discussed herein comprise lead-based positive electrodes together with carbon-based negative electrodes, and lead-based positive electrodes are known from the lead acid battery art, considerable attention has been paid to the development of improved negative electrodes.

The positive electrode of ultracapacitor energy storage devices effectively defines the active life of the device. The negative electrodes typically will not wear out; but on the other hand, just as with lead acid storage batteries, the positive lead-based electrodes of ultracapacitor energy storage devices will typically fail first. Those failures are generally the result of the loss of active lead dioxide paste shedding from the current collector grid as a consequence of spalling and dimensional change deterioration during charging and discharging cycles.

Although the need for improved carbon materials for use in hybrid lead-carbon energy storage devices has been recognized, such carbon material has yet to be developed. Accordingly, there continues to be a need in the art for improved electrode materials for use in hybrid lead-carbon electrical energy storage devices, as well as for methods of making the same and devices containing the same. The present invention fulfills these needs and provides further related advantages.

BRIEF SUMMARY

In general terms, the current invention is directed to compositions and devices for energy storage and distribution that employ a physical blend of carbon particles and lead particles. These blends of lead with the carbon materials exhibit desirable electrochemical properties suitable for use in hybrid carbon-lead energy storage devices. The carbon particles may be any suitable carbon material. For example, in some embodiments the carbon particles are activated carbon particles, and in other embodiments the carbon particles are ultrapure. In other embodiments the carbon particles comprise a total PIXE impurity content of greater than 1000 PPM (i.e., "non-ultrapure"). The carbon material may also comprise certain additives. For example, in some embodiments the carbon particles comprise a lead material (e.g., lead oxide) impregnated within the pores of the carbon or on the surface of the carbon.

Accordingly, in one embodiment the present invention provides a blend comprising a plurality of carbon particles and a plurality of lead particles In other embodiments, the invention provides a blend comprising carbon and lead, wherein the blend comprises a total impurity content of less than 500 ppm of all elements having atomic numbers ranging from 11 to 92, excluding lead, as measured by proton induced x-ray emission.

In another embodiment, the invention is directed to a blend comprising a plurality of carbon particles and a plurality of lead particles, wherein the carbon particles comprise lead within a pore structure or on a surface of the carbon particles.

In still other embodiments, the invention provides an electrical energy storage device comprising any of the blends disclosed herein. For example, in some embodiments the device is a battery comprising:

a) at least one positive electrode comprising a first active material in electrical contact with a first current collector;

b) at least one negative electrode comprising a second active material in electrical contact with a second current collector; and c) an electrolyte;

wherein the positive electrode and the negative electrode are separated by an inert porous separator, and wherein at least one of the first or second active materials comprises a blend according to the present disclosure.

Negative active materials comprising the carbon-lead blends are also provided. Furthermore, energy storage devices comprising the negative active material are also provided. In addition. methods of using the novel compositions and devices are also provided.

These and other aspects of the invention will be apparent upon reference to the following detailed description. To this end, various references are set forth herein which describe in more detail certain background information, procedures, compounds and/or compositions, and are each hereby incorporated by reference in their entirety.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1:
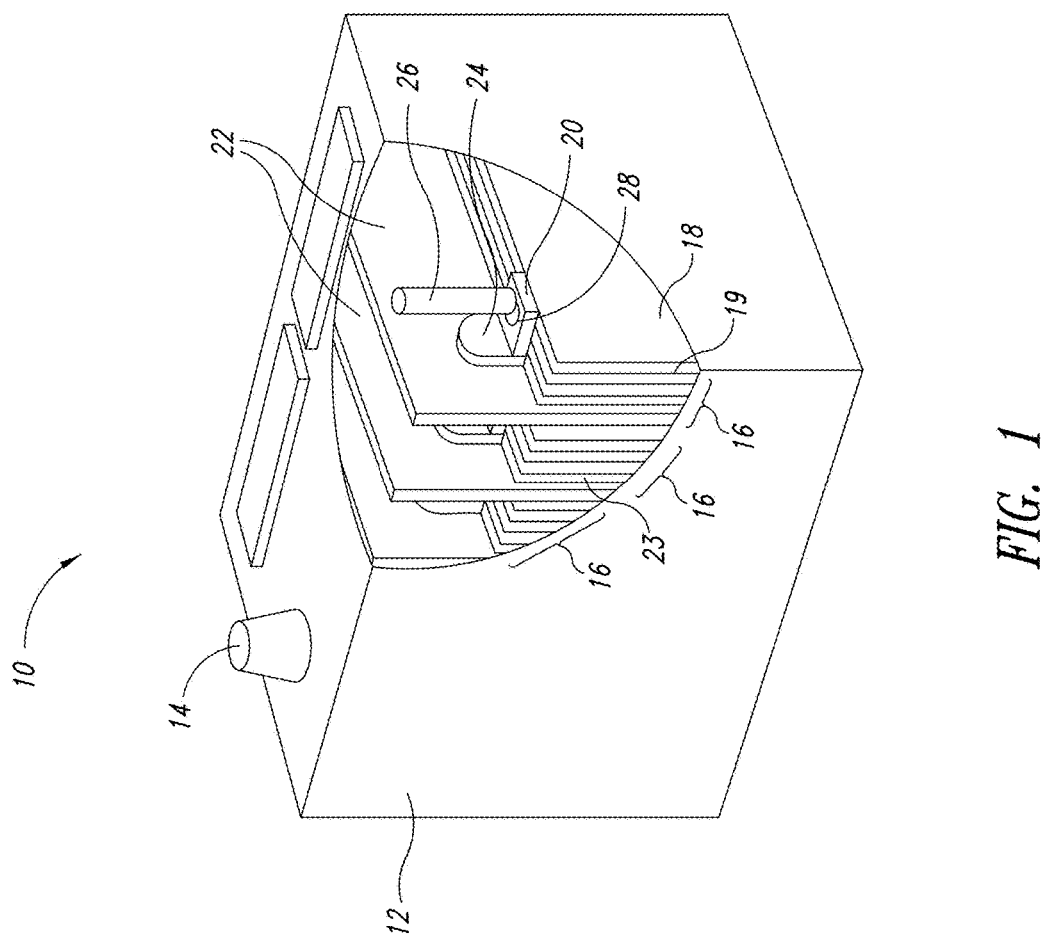
FIG. 1 depicts a representation of an exemplary energy storage device.

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Definitions

As used herein, and unless the context dictates otherwise, the following terms have the meanings as specified below.

"Carbon material" refers to a material or substance comprised substantially of carbon. Carbon materials include ultrapure as well as amorphous and crystalline carbon materials. Examples of carbon materials include, but are not limited to, activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like.

"Amorphous" refers to a material, for example an amorphous carbon material, whose constituent atoms, molecules, or ions are arranged randomly without a regular repeating pattern. Amorphous materials may have some localized crystallinity (i.e., regularity) but lack long-range order of the positions of the atoms. Pyrolyzed and/or activated carbon materials are generally amorphous.

"Crystalline" refers to a material whose constituent atoms, molecules, or ions are arranged in an orderly repeating pattern. Examples of crystalline carbon materials include, but are not limited to, diamond and graphene.

"Synthetic" refers to a substance which has been prepared by chemical means rather than from a natural source. For example, a synthetic carbon material is one which is synthesized from precursor materials and is not isolated from natural sources.

"Impurity" or "impurity element" refers to an undesired foreign substance (e.g., a chemical element) within a material which differs from the chemical composition of the base material. For example, an impurity in a carbon material refers to any element or combination of elements, other than carbon, which is present in the carbon material. Impurity levels are typically expressed in parts per million (ppm).

"PIXE impurity" or "PIXE element" is any impurity element having an atomic number ranging from 11 to 92 (i.e., from sodium to uranium). The phrases "total PIXE impurity content" and "total PIXE impurity level" both refer to the sum of all PIXE impurities present in a sample, for example, a polymer gel or a carbon material. Electrochemical modifiers are not considered PIXE impurities as they are a desired constituent of the carbon materials. For example, in some embodiments an element may be intentionally added to a carbon material, for example lead, and will not be considered a PIXE impurity, while in other embodiments the same element may not be desired and, if present in the carbon material, will be considered a PIXE impurity. PIXE impurity concentrations and identities may be determined by proton induced x-ray emission (PIXE).

"Ultrapure" refers to a substance having a total PIXE impurity content of less than 0.010%. For example, an "ultrapure carbon material" is a carbon material having a total PIXE impurity content of less than 0.010% (i.e., 1000 ppm).

"Ash content" refers to the nonvolatile inorganic matter which remains after subjecting a substance to a high decomposition temperature. Herein, the ash content of a carbon material is calculated from the total PIXE impurity content as measured by proton induced x-ray emission, assuming that nonvolatile elements are completely converted to expected combustion products (i.e., oxides).

"Polymer" refers to a macromolecule comprised of two or more structural repeating units.

"Synthetic polymer precursor material" or "polymer precursor" refers to compounds used in the preparation of a synthetic polymer. Examples of polymer precursors that can be used in certain embodiments of the preparations disclosed herein include, but are not limited to, aldehydes (i.e., HC(=O)R, where R is an organic group), such as for example, methanal (formaldehyde); ethanal (acetaldehyde); propanal (propionaldehyde); butanal (butyraldehyde); glucose; benzaldehyde and cinnamaldehyde. Other exemplary polymer precursors include, but are not limited to, phenolic compounds such as phenol and polyhydroxy benzenes, such as dihydroxy or trihydroxy benzenes, for example, resorcinol (i.e., 1,3-dihydroxy benzene), catechol, hydroquinone, and phloroglucinol. Mixtures of two or more polyhydroxy benzenes are also contemplated within the meaning of polymer precursor.

"Monolithic" refers to a solid, three-dimensional structure that is not particulate in nature.

"Sol" refers to a colloidal suspension of precursor particles (e.g., polymer precursors), and the term "gel" refers to a wet three-dimensional porous network obtained by condensation or reaction of the precursor particles.

"Polymer gel" refers to a gel in which the network component is a polymer; generally a polymer gel is a wet (aqueous or non-aqueous based) three-dimensional structure comprised of a polymer formed from synthetic precursors or polymer precursors.

"Sol gel" refers to a sub-class of polymer gel where the polymer is a colloidal suspension that forms a wet three-dimensional porous network obtained by reaction of the polymer precursors.

"Polymer hydrogel" or "hydrogel" refers to a subclass of polymer gel or gel wherein the solvent for the synthetic precursors or monomers is water or mixtures of water and one or more water-miscible solvent.

"Carbon hydrogel" refers to a sub-class of a hydrogel wherein the synthetic polymer precursors are largely organic in nature.

"RF polymer hydrogel" refers to a sub-class of polymer gel wherein the polymer was formed from the catalyzed reaction of resorcinol and formaldehyde in water or mixtures of water and one or more water-miscible solvent.

"Acid" refers to any substance that is capable of lowering the pH of a solution. Acids include Arrhenius, Brønsted and Lewis acids. A "solid acid" refers to a dried or granular compound that yields an acidic solution when dissolved in a solvent. The term "acidic" means having the properties of an acid.

"Base" refers to any substance that is capable of raising the pH of a solution. Bases include Arrhenius, Brønsted and Lewis bases. A "solid base" refers to a dried or granular compound that yields basic solution when dissolved in a solvent. The term "basic" means having the properties of a base.

"Mixed solvent system" refers to a solvent system comprised of two or more solvents, for example, two or more miscible solvents. Examples of binary solvent systems (i.e., containing two solvents) include, but are not limited to: water and acetic acid; water and formic acid; water and propionic acid; water and butyric acid and the like. Examples of ternary solvent systems (i.e., containing three solvents) include, but are not limited to: water, acetic acid, and ethanol; water, acetic acid and acetone; water, acetic acid, and formic acid; water, acetic acid, and propionic acid; and the like. The present invention contemplates all mixed solvent systems comprising two or more solvents.

"Miscible" refers to the property of a mixture wherein the mixture forms a single phase over certain ranges of temperature, pressure, and composition.

"Catalyst" is a substance which alters the rate of a chemical reaction. Catalysts participate in a reaction in a cyclic fashion such that the catalyst is cyclically regenerated. The present disclosure contemplates catalysts which are sodium free. The catalyst used in the preparation of a ultrapure polymer gel as described herein can be any compound that facilitates the polymerization of the polymer precursors to form an ultrapure polymer gel. A "volatile catalyst" is a catalyst which has a tendency to vaporize at or below atmospheric pressure. Exemplary volatile catalysts include, but are not limited to, ammoniums salts, such as ammonium bicarbonate, ammonium carbonate, ammonium hydroxide, and combinations thereof. Generally such catalysts are used in the range of molar ratios of 10:1 to 2000:1 phenolic compound: catalyst. Typically, such catalysts can be used in the range of molar ratios of 20:1 to 200:1 phenolic compound: catalyst. For example, such catalysts can be used in the range of molar ratios of 25:1 to 100:1 phenolic compound: catalyst.

"Solvent" refers to a substance which dissolves or suspends reactants (e.g., ultrapure polymer precursors) and provides a medium in which a reaction may occur. Examples of solvents useful in the preparation of the gels, ultrapure polymer gels, ultrapure synthetic carbon materials and ultrapure synthetic amorphous carbon materials disclosed herein include, but are not limited to, water, alcohols and mixtures thereof. Exemplary alcohols include ethanol, t-butanol, methanol and mixtures thereof. Such solvents are useful for dissolution of the synthetic ultrapure polymer precursor materials, for example dissolution of a phenolic or aldehyde compound. In addition, in some processes such solvents are employed for solvent exchange in a polymer hydrogel (prior to freezing and drying), wherein the solvent from the polymerization of the precursors, for example, resorcinol and formaldehyde, is exchanged for a pure alcohol. In one embodiment of the present application, a cryogel is prepared by a process that does not include solvent exchange.

"Dried gel" or "dried polymer gel" refers to a gel or polymer gel, respectively, from which the solvent, generally water, or mixture of water and one or more water-miscible solvents, has been substantially removed.

"Pyrolyzed dried polymer gel" refers to a dried polymer gel which has been pyrolyzed but not yet activated, while an "activated dried polymer gel" refers to a dried polymer gel which has been activated.

"Cryogel" refers to a dried gel that has been dried by freeze drying.

"RF cryogel" refers to a dried gel that has been dried by freeze drying wherein the gel was formed from the catalyzed reaction of resorcinol and formaldehyde.

"Pyrolyzed cryogel" is a cryogel that has been pyrolyzed but not yet activated.

"Activated cryogel" is a cryogel which has been activated to obtain activated carbon material.

"Xerogel" refers to a dried gel that has been dried by air drying, for example, at or below atmospheric pressure.

"Pyrolyzed xerogel" is a xerogel that has been pyrolyzed but not yet activated.

"Activated xerogel" is a xerogel which has been activated to obtain activated carbon material.

"Aerogel" refers to a dried gel that has been dried by supercritical drying, for example, using supercritical carbon dioxide.

"Pyrolyzed aerogel" is an aerogel that has been pyrolyzed but not yet activated.

"Activated aerogel" is an aerogel which has been activated to obtain activated carbon material.

"Activate" and "activation" each refer to the process of heating a raw material or carbonized/pyrolyzed substance at an activation dwell temperature during exposure to oxidizing atmospheres (e.g., carbon dioxide, oxygen, steam or combinations thereof) to produce an "activated" substance (e.g., activated cryogel or activated carbon material). The activation process generally results in a stripping away of the surface of the particles, resulting in an increased surface area. Alternatively, activation can be accomplished by chemical means, for example, by impregnation of carbon-containing precursor materials with chemicals such as acids like phosphoric acid or bases like potassium hydroxide, sodium hydroxide or salts like zinc chloride, followed by carbonization. "Activated" refers to a material or substance, for example a carbon material, which has undergone the process of activation.

"Carbonizing", "pyrolyzing", "carbonization" and "pyrolysis" each refer to the process of heating a carbon-containing substance at a pyrolysis dwell temperature in an inert atmosphere (e.g., argon, nitrogen or combinations thereof) or in a vacuum such that the targeted material collected at the end of the process is primarily carbon. "Pyrolyzed" refers to a material or substance, for example a carbon material, which has undergone the process of pyrolysis.

"Dwell temperature" refers to the temperature of the furnace during the portion of a process which is reserved for maintaining a relatively constant temperature (i.e., neither increasing nor decreasing the temperature). For example, the pyrolysis dwell temperature refers to the relatively constant temperature of the furnace during pyrolysis, and the activation dwell temperature refers to the relatively constant temperature of the furnace during activation.

"Pore" refers to an opening or depression in the surface, or a tunnel in a carbon material, such as for example activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution and pore length. Generally the pore structure of activated carbon material comprises micropores and mesopores.

"Mesopore" generally refers to pores having a diameter between about 2 nanometers and about 50 nanometers while the term "micropore" refers to pores having a diameter less than about 2 nanometers. Mesoporous carbon materials comprise greater than 50% of their total pore volume in mesopores while microporous carbon materials comprise greater than 50% of their total pore volume in micropores.

"Surface area" refers to the total specific surface area of a substance measurable by the BET technique. Surface area is typically expressed in units of $m^2/g$. The BET (Brunauer/Emmett/Teller) technique employs an inert gas, for example nitrogen, to measure the amount of gas adsorbed on a material and is commonly used in the art to determine the accessible surface area of materials.

"Connected" when used in reference to mesopores and micropores refers to the spatial orientation of such pores.

"Effective length" refers to the portion of the length of the pore that is of sufficient diameter such that it is available to accept salt ions from the electrolyte.

"Electrode" refers to a conductor through which electricity enters or leaves an object, substance or region.

"Binder" refers to a material capable of holding individual particles of a substance (e.g., a carbon material) together such that after mixing a binder and the particles together the resulting mixture can be formed into sheets, pellets, disks or other shapes. Non-exclusive examples of binders include fluoro polymers, such as, for example, PTFE (polytetrafluoroethylene, Teflon), PFA (perfluoroalkoxy polymer resin, also known as Teflon), FEP (fluorinated ethylene propylene, also known as Teflon), ETFE (polyethylenetetrafluoroethylene, sold as Tefzel and Fluon), PVF (polyvinyl fluoride, sold as Tedlar), ECTFE (polyethylenechlorotrifluoroethylene, sold as Halar), PVDF (polyvinylidene fluoride, sold as Kynar), PCTFE (polychlorotrifluoroethylene, sold as Kel-F and CTFE), trifluoroethanol and combinations thereof.

"Expander" refers to an additive used for adjusting the electrochemical and physical properties of a carbon-lead blend. Expanders may be included in electrodes comprising carbon-lead blends. Suitable expanders are known in the art and are available from commercial sources such as Hammond Expanders, USA.

"Inert" refers to a material that is not active in the electrolyte of an electrical energy storage device, that is it does not absorb a significant amount of ions or change chemically, e.g., degrade.

"Conductive" refers to the ability of a material to conduct electrons through transmission of loosely held valence electrons.

"Current collector" refers to a part of an electrical energy storage and/or distribution device which provides an electrical connection to facilitate the flow of electricity in to, or out of, the device. Current collectors often comprise metal and/or other conductive materials and may be used as a backing for electrodes to facilitate the flow of electricity to and from the electrode.

"Electrolyte" means a substance containing free ions such that the substance is electrically conductive. Electrolytes are commonly employed in electrical energy storage devices. Examples of electrolytes include, but are not limited to, sulfuric acid.

"Elemental form" refers to a chemical element having an oxidation state of zero (e.g., metallic lead).

"Oxidized form" form refers to a chemical element having an oxidation state greater than zero.

"Total Pore Volume" refers to single point nitrogen sorption

"DFT Pore Volume" refers to pore volume within certain pore size ranges calculated by density functional theory from nitrogen sorption data.

A. Blends of Carbon Particles and Lead Particles

The present disclosure is directed to blends comprising a plurality of carbon particles (i.e., particles comprising carbon) and a plurality of lead particles (i.e., particles comprising lead). In certain embodiments, the blends result from physically mixing a plurality of carbon particles and a plurality of lead particles and thus have different properties than carbon materials comprising lead within the carbon pores or on the carbon surface, etc. Thus, in some embodiments the blends comprise distinct carbon particles and distinct lead particles. The properties of the blends are particularly suited to the disclosed hybrid energy storage devices, and the properties can be optimized by varying any one of several parameters as discussed below. For example, the purity of the carbon particles (e.g., ultrapure or non-ultrapure), pore size distribution of the carbon particles and relative amount of carbon particles in the blend are just a few parameters that can be varied and optimized to obtain the desired electrochemical properties.

The disclosed blend comprises a plurality of carbon particles and a plurality of lead particles. The mass percent of carbon particles as a percentage of the total mass of carbon particles and lead particles can be varied from 0.01% to 99.9%. In other various embodiments the mass percent of carbon particles as a percentage of the total mass of carbon particles and lead particles ranges from 0.01% to 20%, for example from 0.1% to 10% or from 1.0% to 2.0%. In other embodiments, the mass percent of carbon particles as a percentage of the total mass of carbon particles and lead particles ranges from 0.01% to 2%, from 0.5% to 2.5% or from 0.75% to 2.25%. In some other embodiments, the mass percent of carbon particles as a percentage of the total mass of carbon particles and lead particles ranges from 0.9% to 1.1%, from 1.1% to 1.3%, from 1.3% to 1.5%, from 1.5% to 1.7%, from 1.7% to 1.9% or from 1.9% to 2.1%. In some embodiments the mass percent of carbon particles as a percentage of the total mass of carbon particles and lead particles is about 50%.

Alternatively, in other embodiments the mass percent of carbon particles as a percentage of the total mass of carbon particles and lead particles ranges from 0.1% to 50%, from 0.1% to 10%, from 1% to 10%, from 1% to 5% or 1% to 3%. In still other embodiments, the mass percent of carbon particles as a percentage of the total mass of carbon particles and lead particles ranges from 50% to 99.9%, from 90% to 99.9% or from 90% to 99%.

The volume percent of carbon particles as a percentage of the total volume of carbon particles and lead particles can be varied from 0.1% to 99.9%. In various embodiments the volume percent of carbon particles as a percentage of the total volume of carbon particles and lead particles ranges from 1% to 99%, from 2% to 99%, from 3% to 99%, from 4% to 99%, from 5% to 99%, from 6% to 99%, from 7% to 99%, from 8% to 99%, from 9% to 99%, from 10% to 90%, from 20% to 80%, from 20% to 40%, from 1% to 20%, from 40% to 80% or from 40% to 60%. In some certain embodiment the volume percent of carbon particles as a percentage of the total volume of carbon particles and lead particles is about 50%.

In other alternative embodiments, the volume percent of carbon particles as a percentage of the total volume of carbon particles and lead particles ranges from 0.1% to 50%, from 0.1% to 10% or from 1% to 10%. In other embodiments, the volume percent of carbon particles as a percentage of the total volume of carbon particles and lead particles ranges from 50% to 99.9%, from 90% to 99.9% or from 90% to 99%.

The surface area percent of carbon particles as a percentage of the total surface area of carbon particles and lead particles can also be varied, for example from 0.1% to 99.9%. In some embodiments the surface area percent of carbon particles as a percentage of the total surface area of carbon particles and lead particles ranges from 1% to 99%, from 10% to 90%, from 20% to 80% or from 40% to 60%. In another embodiment, the surface area percent of carbon particles as a percentage of the total surface area of carbon particles and lead particles is about 50%.

In related embodiments, the surface area percent of carbon particles as a percentage of the total surface area of carbon particles and lead particles ranges from 0.1% to 50%, from 0.1% to 10% or from 1% to 10%. In other embodiments, the surface area percent of carbon particles as a percentage of the total surface area of carbon particles and lead particles ranges from 80% to 100%, for example from 80% to 99.9%, from 80% to 99%, from 85% to 99% or from 90% to 99%, For example, in some embodiments the surface area percent of carbon particles as a percentage of the total surface area of carbon particles and lead particles ranges from 90% to 92%, from 92%, from 92% to 94%, from 94% to 96%, from 96% to 98% or from 93% to 99% or even to 99.9%. Alternatively, the surface area percent of carbon particles as a percentage of the total surface area of carbon particles and lead particles ranges from 50% to 99.9%, from 90% to 99.9% or from 90% to 99%.

The carbon particle surface area residing in pores less than 20 angstroms as a percentage of the total surface area residing in pores less than 20 angstroms of carbon particles and lead particles can be varied from 0.1% to 99.9%. In some embodiments, the carbon particle surface area residing in pores less than 20 angstroms as a percentage of the total surface area residing in pores less than 20 angstroms of carbon particles and lead particles ranges from 1% to 99%, from 10% to 90%, from 20% to 80%, from 20% to 60% or from 40% to 60%. In another embodiment, the carbon particle surface area residing in pores less than 20 angstroms as a percentage of the total surface area residing in pores less than 20 angstroms of carbon particles and lead particles is about 50%.

In other related embodiments, the carbon particle surface area residing in pores less than 20 angstroms as a percentage of the total surface area residing in pores less than 20 angstroms of carbon particles and lead particles ranges from 0.1% to 50%, 0.1% to 10% or from 1% to 10%. Alternatively, the carbon particle surface area residing in pores less than 20 angstroms as a percentage of the total surface area residing in pores less than 20 angstroms of carbon particles and lead particles ranges from 50% to 99.9%, from 90% to 99.9% or from 90% to 99%.

In another embodiment, the carbon particle surface area residing in pores greater than 20 angstroms as a percentage of the total surface area residing in pores greater than 20 angstroms of carbon particles and lead particles ranges from 0.1% to 99.9%. For example, in various embodiments, the carbon particle surface area residing in pores greater than 20 angstroms as a percentage of the total surface area residing in pores greater than 20 angstroms of carbon particles and lead particles ranges from 1% to 99%, from 10% to 90%, from 20% to 80% or from 40% to 6%. In a certain embodiment, the carbon particle surface area residing in pores greater than 20 angstroms as a percentage of the total surface area residing in pores greater than 20 angstroms of carbon particles and lead particles ranges from is about 50%.

Alternatively, in a different embodiment, the carbon particle surface area residing in pores greater than 20 angstroms as a percentage of the total surface area residing in pores greater than 20 angstroms of carbon particles and lead particles ranges from 0.1% to 50%. For example, in some embodiments, the carbon particle surface area residing in pores greater than 20 angstroms as a percentage of the total surface area residing in pores greater than 20 angstroms of carbon particles and lead particles ranges from 0.1% to 10% or from 1% to 10%. In another embodiment, the carbon particle surface area residing in pores greater than 20 angstroms as a percentage of the total surface area residing in pores greater than 20 angstroms of carbon particles and lead particles ranges from 50% to 99.9%, from 90% to 99.9% or from 90% to 99%.

In some embodiments, the volume average particle size of the carbon particles relative to the volume average particle size of the lead particles ranges from 0.000001:1 to 100000:1. For example, in some embodiments the volume average particle size of carbon particles relative to the volume average particle size of lead particles ranges from 0.0001:1 to 10000:1, from 0.001:1 to 1000:1, from 0.01:1 to 100:1, from 0.01:1 to 10:1, from 0.1:1 to 2:1, from 0.1:1 to 10:1 or from 1:1 to 1000:1. In one embodiment the volume average particle size of the carbon particles relative to the volume average particle size of the lead particles is about 1:1.

In certain embodiments, the composition of particles is comprised of more than one population of carbon particles and/or more than one population of lead particles. The different populations can be different with respect to various physical-chemical attributes such as, particle size, extent of meso- or micro-porosity, surface functionality, and the like. For example, in some embodiments, the blend comprises a multi-modal carbon particle size distribution and lead particles. For example, the carbon particles can be comprised of two size modes. For example, in some embodiments the ratio between the two size modes ranges from 0.000001:1 to 100000:1, for example in a one embodiment the ratio between the two size modes is about 0.001:1.

The lead particles can be any type of particle which comprises lead. For example, the lead particles may comprise elemental lead, oxidized lead and/or lead salts. In certain embodiments, the lead particles comprise lead (II) oxide, lead (IV) oxide, lead acetate, lead carbonate, lead sulfate, lead orthoarsenate, lead pyroarsenate, lead bromide, lead caprate, lead carproate, lead caprylate, lead chlorate, lead chloride, lead fluoride, lead nitrate, lead oxychloride, lead orthophosphate sulfate, lead chromate, lead chromate, basic, lead ferrite, lead sulfide, lead tungstate or combinations thereof.

The capacitance of the carbon-lead blends varies depending on the physiochemical properties of the carbon and lead particles. In certain embodiments, the capacitance of the carbon-lead blends is greater than 500 F/g of carbon particles in the blend, greater than 450 F/g of carbon particles in the blend, greater than 400 F/g of carbon particles in the blend, greater than 350 F/g of carbon particles in the blend, greater than 300 F/g of carbon particles in the blend, greater than 250 F/g of carbon particles in the blend, greater than 200 F/g of carbon particles in the blend or even greater than 150 F/g of carbon particles in the blend. In certain embodiments of the foregoing, the capacitance is measured in a sulfuric acid electrolyte. For example, in some embodiments the capacitance is measured based on the discharge data of a galvanostatic charge/discharge profile to 0.9V and 0V at a symmetric current density ranging from 0.1 A/g carbon to 10 A/g carbon, for example 1A/g (see e.g., Example 28).

In still other embodiments, the capacitance of the carbon-lead blends is measured based on surface area of the blend. Accordingly, in certain embodiments the carbon-lead blends comprise a capacitance of greater than 2.0 $F/m^2$, greater than 1.75 $F/m^2$, greater than 1.50 $F/m^2$, greater than 1.25 $F/m^2$, greater than 1.0 $F/m^2$, greater than 0.75 $F/m^2$, greater than 0.5 $F/m^2$, greater than 0.25 $F/m^2$, greater than 0.1 $F/m^2$ or even greater than 0.01 $F/m^2$. In certain embodiments of the foregoing, the capacitance is measured in a sulfuric acid electrolyte. For example, the in some embodiments the capacitance is measured based on the discharge data of a galvanostatic charge/discharge profile to 0.9V and 0V at a symmetric current density ranging from 0.1 A/g carbon to 10 A/g carbon (see e.g., Example 28). One skilled in the art will understand how to determine the $F/m^2$ of a carbon-lead blend, for example the $F/m^2$ value can be calculated by experimentally determining the F/g and the using the density of the carbon-lead composition (e.g., paste) to convert this value to $F/m^2$.

The blends described herein may also be provided in the form of a composition comprising the blend and a solvent (e.g., electrolyte), a binder, and expander or combinations thereof. In certain embodiments the compositions are in the form of a paste. The compositions can be prepared by admixing the carbon particles, lead particles and the solvent (e.g., electrolyte), binder, expander or combinations thereof. The density of the compositions varies from about 2.0 g/cc to about 8 g/cc, from about 3.0 g/cc to about 7.0 g/cc or from about 4.0 g/cc to about 6.0 g/cc. In still other embodiments, the density of the composition is from about 3.5 g/cc to about 4.0 g/cc, from about 4.0 g/cc to about 4.5 g/cc, from about 4.5 g/cc to about 5.0 g/cc, from about 5.0 g/cc to about 5.5 g/cc, from about 5.5 g/cc to about 6.0 g/cc, from about 6.0 g/cc to about 6.5 g/cc, or from about 6.5 g/cc to about 7.0 g/cc.

The purity of the carbon-lead blends can contribute to the electrochemical performance of the same. In this regard, the purity is determined by PIXE analysis and PIXE impurity with respect to the blend exclude any lead content. In some embodiments, the blend comprises a total PIXE impurity content of elements (excluding any lead) of less than 500 ppm and an ash content (excluding any lead) of less than 0.08%. In further embodiments, the blend comprises a total PIXE impurity content of all other elements of less than 300 ppm and an ash content of less than 0.05%. In other further embodiments, the blend comprises a total PIXE impurity content of all other elements of less than 200 ppm and an ash content of less than 0.05%. In other further embodiments, the blend comprises a total PIXE impurity content of all other elements of less than 200 ppm and an ash content of less than 0.025%. In other further embodiments, the blend comprises a total PIXE impurity content of all other elements of less than 100 ppm and an ash content of less than 0.02%. In other further embodiments, the blend comprises a total PIXE impurity content of all other elements of less than 50 ppm and an ash content of less than 0.01%.

The amount of individual PIXE impurities present in the disclosed blends can be determined by proton induced x-ray emission. Individual PIXE impurities may contribute in different ways to the overall electrochemical performance of the disclosed carbon materials. Thus, in some embodiments, the level of sodium present in the blend is less than 1000 ppm, less than 500 ppm, less than 100 ppm, less than 50 ppm, less than 10 ppm, or less than 1 ppm. In some embodiments, the level of magnesium present in the blend is less than 1000 ppm, less than 100 ppm, less than 50 ppm, less than 10 ppm, or less than 1 ppm. In some embodiments, the level of aluminum present in the blend is less than 1000 ppm, less than 100 ppm, less than 50 ppm, less than 10 ppm, or less than 1 ppm. In some embodiments, the level of silicon present in the blend is less than 500 ppm, less than 300 ppm, less than 100 ppm, less than 50 ppm, less than 20 ppm, less than 10 ppm or less than 1 ppm. In some embodiments, the level of phosphorous present in the blend is less than 1000 ppm, less than 100 ppm, less than 50 ppm, less than 10 ppm, or less than 1 ppm. In some embodiments, the level of sulfur present in the blend is less than 1000 ppm, less than 100 ppm, less than 50 ppm, less than 30 ppm, less than 10 ppm, less than 5 ppm or less than 1 ppm. In some embodiments, the level of chlorine present in the blend is less than 1000 ppm, less than 100 ppm, less than 50 ppm, less than 10 ppm, or less than 1 ppm. In some embodiments, the level of potassium present in the blend is less than 1000 ppm, less than 100 ppm, less than 50 ppm, less than 10 ppm, or less than 1 ppm. In other embodiments, the level of calcium present in the blend is less than 100 ppm, less than 50 ppm, less than 20 ppm, less than 10 ppm, less than 5 ppm or less than 1 ppm. In some embodiments, the level of chromium present in the blend is less than 1000 ppm, less than 100 ppm, less than 50 ppm, less than 10 ppm, less than 5 ppm, less than 4 ppm, less than 3 ppm, less than 2 ppm or less than 1 ppm. In other embodiments, the level of iron present in the blend is less than 50 ppm, less than 20 ppm, less than 10 ppm, less than 5 ppm, less than 4 ppm, less than 3 ppm, less than 2 ppm or less than 1 ppm. In other embodiments, the level of nickel present in the blend is less than 20 ppm, less than 10 ppm, less than 5 ppm, less than 4 ppm, less than 3 ppm, less than 2 ppm or less than 1 ppm. In some other embodiments, the level of copper present in the blend is less than 140 ppm, less than 100 ppm, less than 40 ppm, less than 20 ppm, less than 10 ppm, less than 5 ppm, less than 4 ppm, less than 3 ppm, less than 2 ppm or less than 1 ppm. In yet other embodiments, the level of zinc present in the blend is less than 20 ppm, less than 10 ppm, less than 5 ppm, less than 2 ppm or less than 1 ppm. In yet other embodiments, the sum of all other PIXE impurities (excluding the lead) present in the blend is less than 1000 ppm, less than 500 pm, less than 300 ppm, less than 200 ppm, less than 100 ppm, less than 50 ppm, less than 25 ppm, less than 10 ppm or less than 1 ppm. As noted above, in some embodiments other impurities such as hydrogen, oxygen and/or nitrogen may be present in levels ranging from less than 10% to less than 0.01%.

In some embodiments, the blend comprise undesired PIXE impurities near or below the detection limit of the proton induced x-ray emission analysis. For example, in some embodiments the blend comprises less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1.5 ppm bismuth, less than 2 ppm thorium, or less than 4 ppm uranium.

In some specific embodiments, the blend comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission. In other specific embodiments, the blend comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

In other specific embodiments, the blend comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the blend comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

In other embodiments, the blend comprises less than 5 ppm chromium, less than 10 ppm iron, less than 5 ppm nickel, less than 20 ppm silicon, less than 5 ppm zinc, and bismuth, silver, copper, mercury, manganese, platinum, antimony and tin are not detected as measured by proton induced x-ray emission.

In other embodiments, the blend comprises less than 75 ppm bismuth, less than 5 ppm silver, less than 10 ppm chromium, less than 30 ppm copper, less than 30 ppm iron, less than 5 ppm mercury, less than 5 ppm manganese, less than 20 ppm nickel, less than 5 ppm platinum, less than 10 ppm antimony, less than 100 ppm silicon, less than 10 ppm tin and less than 10 ppm zinc as measured by proton induced x-ray emission.

In other embodiments, the blend comprises less than 5 ppm chromium, 10 ppm iron, less than 5 ppm nickel, less than 20 ppm silicon, less than 5 ppm zinc and bismuth, silver, copper, mercury, manganese, platinum, antimony and tin are not detected as measured by proton induced x-ray emission as measured by proton induced x-ray emission.

Other embodiments of the present invention include use of the disclosed carbon-lead blends in an electrical energy storage device. In some embodiments, the electrical energy storage device is a battery. In other embodiments, the electrical energy storage device is in a microhybrid, start-stop hybrid, mild-hybrid vehicle, vehicle with electric turbocharging, vehicle with regenerative braking, hybrid vehicle, an electric vehicle, industrial motive power such as forklifts, electric bikes, golf carts, aerospace applications, a power storage and distribution grid, a solar or wind power system, a power backup system such as emergency backup for portable military backup, hospitals or military infrastructure, and manufacturing backup or a cellular tower power system. Electrical energy storage devices are described in more detail below.

B. Carbon Particles

Various properties of the carbon particles within the blends can be varied to obtain the desired electrochemical result. As discussed above, electrodes comprising carbon materials comprising metals and/or metal compounds and having residual levels of various impurities (e.g., sodium, chlorine, nickel, iron, etc.) are known to have decreased cycle life, durability and performance. Accordingly, one embodiment provides blends comprising a plurality of carbon particles which are significantly more pure than other known carbon materials and are thus expected to improve the operation of any number of electrical energy storage and/or distribution devices.

The high purity of the disclosed carbon particles in certain embodiments can be attributed to the disclosed sol gel processes. Applicants have discovered that when one or more polymer precursors, for example a phenolic compound and an aldehyde, are co-polymerized under acidic conditions in the presence of a volatile basic catalyst, an ultrapure polymer gel results. This is in contrast to other reported methods for the preparation of polymer gels which result in polymer gels comprising residual levels of undesired impurities. The ultrapure polymer gels can be pyrolyzed by heating in an inert atmosphere (e.g., nitrogen) to yield the carbon particles comprising a high surface area and high pore volume. These carbon materials can be further activated without the use of chemical activation techniques— which introduce impurities—to obtain ultrapure activated carbon materials. The carbon particles are prepared from activated carbon materials or, in some instances, pyrolyzed but not activated carbon materials.

In certain embodiments, the carbon particles comprise lead within the pores or on the surface of the carbon particles. Thus the blends may comprise a plurality of carbon particles, which comprise lead, and a plurality of lead particles. Lead can be incorporated into the carbon materials at various stages of the sol gel process. For example, leads and/or lead compounds can be incorporated during the polymerization stage, into the polymer gel or into the pyrolyzed or activated carbon particles. The unique porosity and high surface area of the carbon particles provides for optimum contact of the electrode active material with the electrolyte in, for example, a lead/acid battery. Electrodes prepared from the disclosed blends comprise improved active life and power performance relative to electrodes prepared from known carbon materials.

In some embodiments, the carbon particles are a pyrolyzed dried polymer gel, for example, a pyrolyzed polymer cryogel, a pyrolyzed polymer xerogel or a pyrolyzed polymer aerogel. In other embodiments, the carbon particles are activated (i.e., a synthetic activated carbon material). For example, in further embodiments the carbon particles are an activated dried polymer gel, an activated polymer cryogel, an activated polymer xerogel or an activated polymer aerogel.

The carbon particles can be of any source or purity. For example, in some embodiments, the carbon particles can be ultrapure activated carbon, wherein the carbon particles comprises less than 1000 PPM, for example less than 500 PPM for example less than 200 ppm, for example less than 100 ppm, for example less than 50 ppm, or even less than 10 PPM of PIXE impurities. In other examples, the carbon has levels of PXIE impurities ranging from 0.1 to 1000 ppm. In other embodiments, the carbon particles have PIXE impurities levels ranging from 900 to 1000 ppm. In other embodiments, the carbon particles have PIXE impurities levels ranging from 800 to 900 ppm. In other embodiments, the carbon particles have PIXE impurities levels ranging from 700 to 800 ppm. In other embodiments, the carbon particles have PIXE impurities levels ranging from 600 to 700 ppm. In other embodiments, the carbon particles have PIXE impurities levels ranging from 500 to 600 ppm. In other embodiments, the carbon particles have PIXE impurities levels ranging from 400 to 500 ppm. In other embodiments, the carbon particles have PIXE impurities levels ranging from 300 to 400 ppm. In other embodiments, the carbon particles have PIXE impurities levels ranging from 200 to 300 ppm. In other embodiments, the carbon particles have PIXE impurities levels ranging from 100 to 200 ppm. In other embodiments, the carbon particles have PIXE impurities levels ranging from 0.1 to 100 ppm. In other embodiments, the carbon particles have PIXE impurities levels ranging from 0.1 to 50 ppm. In other embodiments, the carbon particles have PIXE impurities levels ranging from 0.1 to 10 ppm.

The carbon particles may also be "non-ultrapure" (i.e., greater than 100 PPM of PIXE impurities. For example, in some embodiments, the level of total impurities in the non-ultrapure activated carbon (as measured by proton induced x-ray emission) is in the range of about 1000 ppm or greater, for example 2000 ppm. The ash content of the non-ultrapure carbon is in the range of about 0.1% or greater, for example 0.41%. In addition, the non-ultrapure carbon materials can be incorporated into devices suitable for energy storage and distribution, for example in ultracapacitors.

The carbon particles may also comprise lead in addition to being physically blended with lead particles. This results in a blend of lead containing carbon particles and lead particles. Such blends find particular utility in the hybrid devices described herein. In this regard, the carbon particles may be of any purity level, and the lead may be incorporated into the pores of the carbon particles and/or on the surface of the carbon particles. Accordingly, in some embodiments the carbon composition comprises a plurality of carbon particles and a plurality of lead particles, wherein the carbon particles comprise lead, for example at least 1000 PPM of lead. In certain other embodiments of the foregoing, the carbon particles comprise lead and less than 500 PPM of all other PIXE impurities. In some other embodiments, the carbon particles comprise at least 0.10%, at least 0.25%, at least 0.50%, at least 1.0%, at least 5.0%, at least 10%, at least 25%, at least 50%, at least 75%, at least 90%, at least 95%, at least 99% or at least 99.5% of lead. For example, in some embodiments, the carbon particles comprise between 0.5% and 99.5% activated carbon and between 0.5% and 99.5% lead. The percent of lead is calculated on weight percent basis (wt %).

The lead in any of the embodiments disclosed herein can be in any number of forms. For example, in some embodiments, the lead is in the form of elemental lead, lead (II) oxide, lead (IV) oxide or combinations thereof. In other embodiments, the lead is in the form of lead acetate, lead carbonate, lead sulfate, lead orthoarsenate, lead pyroarsenate, lead bromide, lead caprate, lead carproate, lead caprylate, lead chlorate, lead chloride, lead fluoride, lead nitrate, lead oxychloride, lead orthophosphate sulfate, lead chromate, lead chromate, basic, lead ferrite, lead sulfide, lead tungstate or combinations thereof. Other lead salts are also contemplated.

In some embodiments, the carbon particles comprise at least 1,000 ppm of lead. In other embodiments, the carbon material comprises a total of less than 500 ppm of elements (excluding any intentionally added lead) having atomic numbers ranging from 11 to 92, for example, less than 200 ppm, less than 100 ppm, less than 50 ppm, less than 25 ppm, less than 10 ppm, less than 5 ppm or less than 1 ppm. In certain embodiments the lead content and/or the PIXE impurity content is measured by proton induced x-ray emission analysis.

Certain metal elements such as iron, cobalt, nickel, chromium, copper, titanium, vanadium and rhenium may decrease the electrical performance of electrodes comprising the blends. Accordingly, in some embodiments, the carbon particles comprise low levels of one or more of these elements. For example, in certain embodiments, the carbon particles comprise less than 100 ppm iron, less than 50 ppm iron, less than 25 ppm iron, less than 10 ppm iron, less than 5 ppm iron or less than 1 ppm iron. In other embodiments, the carbon particles comprise less than 100 ppm cobalt, less than 50 ppm cobalt, less than 25 ppm cobalt, less than 10 ppm cobalt, less than 5 ppm cobalt or less than 1 ppm cobalt. In other embodiments, the carbon particles comprise less than 100 ppm nickel, less than 50 ppm nickel, less than 25 ppm nickel, less than 10 ppm nickel, less than 5 ppm nickel or less than 1 ppm nickel. In other embodiments, the carbon particles comprise less than 100 ppm chromium, less than 50 ppm chromium, less than 25 ppm chromium, less than 10 ppm chromium, less than 5 ppm chromium or less than 1 ppm chromium. In other embodiments, the carbon particles comprise less than 100 ppm copper, less than 50 ppm copper, less than 25 ppm copper, less than 10 ppm copper, less than 5 ppm copper or less than 1 ppm copper. In other embodiments, the carbon particles comprise less than 100 ppm titanium, less than 50 ppm titanium, less than 25 ppm titanium, less than 10 ppm titanium, less than 5 ppm titanium or less than 1 ppm titanium. In other embodiments, the carbon particles comprise less than 100 ppm vanadium, less than 50 ppm vanadium, less than 25 ppm vanadium, less than 10 ppm vanadium, less than 5 ppm vanadium or less than 1 ppm vanadium. In other embodiments, the carbon particles comprise less than 100 ppm rhenium, less than 50 ppm rhenium, less than 25 ppm rhenium, less than 10 ppm rhenium, less than 5 ppm rhenium or less than 1 ppm rhenium.

In other embodiments, the carbon particles comprise less than 5 ppm chromium, less than 10 ppm iron, less than 5 ppm nickel, less than 20 ppm silicon, less than 5 ppm zinc, and bismuth, silver, copper, mercury, manganese, platinum, antimony and tin are not detected as measured by proton induced x-ray emission.

In other embodiments, the carbon particles comprise less than 75 ppm bismuth, less than 5 ppm silver, less than 10 ppm chromium, less than 30 ppm copper, less than 30 ppm iron, less than 5 ppm mercury, less than 5 ppm manganese, less than 20 ppm nickel, less than 5 ppm platinum, less than 10 ppm antimony, less than 100 ppm silicon, less than 10 ppm tin and less than 10 ppm zinc as measured by proton induced x-ray emission.

In other embodiments, the carbon particles comprise less than 5 ppm chromium, 10 ppm iron, less than 5 ppm nickel, less than 20 ppm silicon, less than 5 ppm zinc and bismuth, silver, copper, mercury, manganese, platinum, antimony and tin are not detected as measured by proton induced x-ray emission as measured by proton induced x-ray emission.

The porosity of the carbon particles is an important parameter for electrochemical performance of the blends. Accordingly, in one embodiment the carbon particles comprise a DFT pore volume of at least 0.35 cc/g, at least 0.30 cc/g, at least 0.25 cc/g, at least 0.20 cc/g, at least 0.15 cc/g, at least 0.10 cc/g, at least 0.05 cc/g or at least 0.01 cc/g for pores less than 20 angstroms. In other embodiments the carbon particles are devoid of any measurable pore volume. In other embodiments, the carbon particles comprise a DFT pore volume of at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g or at least 0.65 cc/g for pores greater than 20 angstroms.

In other embodiments, the carbon particles comprise a DFT pore volume of at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.60 cc/g, at least 0.55 cc/g, at least 0.50 cc/g, at least 0.45 cc/g, at least 0.40 cc/g, at least 0.35 cc/g, at least 0.30 cc/g, at least 0.25 cc/g, at least 0.20 cc/g, at least 0.15 cc/g, or at least 0.10 cc/g for pores ranging from 20 angstroms to 500 angstroms.

In other embodiments, the carbon particles comprise a DFT pore volume of at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.60 cc/g, at least 0.55 cc/g, at least 0.50 cc/g, at least 0.45 cc/g, at least 0.40 cc/g, at least 0.35 cc/g, at least 0.30 cc/g, at least 0.25 cc/g, at least 0.20 cc/g, at least 0.15 cc/g, or at least 0.10 cc/g for pores ranging from 20 angstroms to 1000 angstroms.

In other embodiments, the carbon particle comprises a DFT pore volume of at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.60 cc/g, at least 0.55 cc/g, at least 0.50 cc/g, at least 0.45 cc/g, at least 0.40 cc/g, at least 0.35 cc/g, at least 0.30 cc/g, at least 0.25 cc/g, at least 0.20 cc/g, at least 0.15 cc/g, or at least 0.10 cc/g for pores ranging from 20 angstroms to 2000 angstroms.

In other embodiments, the carbon particles comprises a DFT pore volume of at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.60 cc/g, at least 0.55 cc/g, at least 0.50 cc/g, at least 0.45 cc/g, at least 0.40 cc/g, at least 0.35 cc/g, at least 0.30 cc/g, at least 0.25 cc/g, at least 0.20 cc/g, at least 0.15 cc/g, or at least 0.10 cc/g for pores ranging from 20 angstroms to 5000 angstroms.

In yet other embodiments, the carbon particles comprise a total DFT pore volume of at least 4.00 cc/g, at least 3.75 cc/g, at least 3.50 cc/g, at least 3.25 cc/g, at least 3.00 cc/g, at least 2.75 cc/g, at least 2.50 cc/g, at least 2.25 cc/g, at least 2.00 cc/g, at least 1.90 cc/g, 1.80 cc/g, 1.70 cc/g, 1.60 cc/g, 1.50 cc/g, 1.40 cc/g, at least 1.30 cc/g, at least 1.20 cc/g, at least 1.10 cc/g, at least 1.00 cc/g, at least 0.85 cc/g, at least 0.80 cc/g, at least 0.75 cc/g, at least 0.70 cc/g, at least 0.65 cc/g, at least 0.60 cc/g, at least 0.55 cc/g, at least 0.50 cc/g, at least 0.45 cc/g, at least 0.40 cc/g, at least 0.35 cc/g, at least 0.30 cc/g, at least 0.25 cc/g, at least 0.20 cc/g, at least 0.15 cc/g, or at least 0.10 cc/g.

In certain embodiments mesoporous carbon particles having very little microporosity (e.g., less than 30%, less than 20%, less than 10% or less than 5% microporosity) are provided. The pore volume and surface area of such carbon particles are advantageous for inclusion of lead and electrolyte ions in certain embodiments. For example, the mesoporous carbon can be a polymer gel that has been pyrolyzed, but not activated. In some embodiments, the mesoporous carbon comprises a specific surface area of at least 100 $m^2/g$, at least 200 $m^2/g$, at least 300 $m^2/g$, at least 400 $m^2/g$, at least 500 $m^2/g$, at least 600 $m^2/g$, at least 675 $m^2/g$ or at least 750 $m^2/g$. In other embodiments, the mesoporous carbon particles comprise a total pore volume of at least 0.50 cc/g, at least 0.60 cc/g, at least 0.70 cc/g, at least 0.80 cc/g, at least 0.90 cc/g, at least 1.0 cc/g or at least 1.1 cc/g. In yet other embodiments, the mesoporous carbon particles comprise a tap density of at least 0.30 g/cc, at least 0.35 g/cc, at least 0.40 g/cc, at least 0.45 g/cc, at least 0.50 g/cc or at least 0.55 g/cc.

In addition to low content of undesired PIXE impurities, the disclosed carbon particles may comprise high total carbon content. In addition to carbon, the carbon particles may also comprise oxygen, hydrogen, nitrogen and the electrochemical modifier. In some embodiments, the particles comprises at least 75% carbon, 80% carbon, 85% carbon, at least 90% carbon, at least 95% carbon, at least 96% carbon, at least 97% carbon, at least 98% carbon or at least 99% carbon on a weight/weight basis. In some other embodiments, the carbon particles comprises less than 10% oxygen, less than 5% oxygen, less than 3.0% oxygen, less than 2.5% oxygen, less than 1% oxygen or less than 0.5% oxygen on a weight/weight basis. In other embodiments, the carbon particles comprises less than 10% hydrogen, less than 5% hydrogen, less than 2.5% hydrogen, less than 1% hydrogen, less than 0.5% hydrogen or less than 0.1% hydrogen on a weight/weight basis. In other embodiments, the carbon particles comprises less than 5% nitrogen, less than 2.5% nitrogen, less than 1% nitrogen, less than 0.5% nitrogen, less than 0.25% nitrogen or less than 0.01% nitrogen on a weight/weight basis. The oxygen, hydrogen and nitrogen content of the disclosed carbon particles can be determined by combustion analysis. Techniques for determining elemental composition by combustion analysis are well known in the art.

The total ash content of the carbon particles may, in some instances, have an effect on the electrochemical performance of the blends. Accordingly, in some embodiments, the ash content (excluding any intentionally added lead) of the carbon particles ranges from 0.1% to 0.001% weight percent ash, for example in some specific embodiments the ash content of the carbon particles is less than 0.1%, less than 0.08%, less than 0.05%, less than 0.03%, than 0.025%, less than 0.01%, less than 0.0075%, less than 0.005% or less than 0.001%.

In other embodiments, the carbon particles comprises a total PIXE impurity content of elements (excluding any intentionally added lead) of less than 500 ppm and an ash content (excluding any intentionally added lead) of less than 0.08%. In further embodiments, the carbon particles comprises a total PIXE impurity content of all other elements of less than 300 ppm and an ash content of less than 0.05%. In other further embodiments, the carbon particles comprises a total PIXE impurity content of all other elements of less than 200 ppm and an ash content of less than 0.05%. In other further embodiments, the carbon particles comprises a total PIXE impurity content of all other elements of less than 200 ppm and an ash content of less than 0.025%. In other further embodiments, the carbon particles comprises a total PIXE impurity content of all other elements of less than 100 ppm and an ash content of less than 0.02%. In other further embodiments, the carbon particles comprises a total PIXE impurity content of all other elements of less than 50 ppm and an ash content of less than 0.01%.

The amount of individual PIXE impurities present in the disclosed carbon particles can be determined by proton induced x-ray emission. Individual PIXE impurities may contribute in different ways to the overall electrochemical performance of the disclosed carbon materials. Thus, in some embodiments, the level of sodium present in the carbon particles is less than 1000 ppm, less than 500 ppm, less than 100 ppm, less than 50 ppm, less than 10 ppm, or less than 1 ppm. In some embodiments, the level of magnesium present in the carbon particles is less than 1000 ppm, less than 100 ppm, less than 50 ppm, less than 10 ppm, or less than 1 ppm. In some embodiments, the level of aluminum present in the carbon particles is less than 1000 ppm, less than 100 ppm, less than 50 ppm, less than 10 ppm, or less than 1 ppm. In some embodiments, the level of silicon present in the carbon particles is less than 500 ppm, less than 300 ppm, less than 100 ppm, less than 50 ppm, less than 20 ppm, less than 10 ppm or less than 1 ppm. In some embodiments, the level of phosphorous present in the carbon particles is less than 1000 ppm, less than 100 ppm, less than 50 ppm, less than 10 ppm, or less than 1 ppm. In some embodiments, the level of sulfur present in the carbon particles is less than 1000 ppm, less than 100 ppm, less than 50 ppm, less than 30 ppm, less than 10 ppm, less than 5 ppm or less than 1 ppm. In some embodiments, the level of chlorine present in the carbon particles is less than 1000 ppm, less than 100 ppm, less than 50 ppm, less than 10 ppm, or less than 1 ppm. In some embodiments, the level of potassium present in the carbon particles is less than 1000 ppm, less than 100 ppm, less than 50 ppm, less than 10 ppm, or less than 1 ppm. In other embodiments, the level of calcium present in the carbon particles is less than 100 ppm, less than 50 ppm, less than 20 ppm, less than 10 ppm, less than 5 ppm or less than 1 ppm. In some embodiments, the level of chromium present in the carbon particles is less than 1000 ppm, less than 100 ppm, less than 50 ppm, less than 10 ppm, less than 5 ppm, less than 4 ppm, less than 3 ppm, less than 2 ppm or less than 1 ppm. In other embodiments, the level of iron present in the carbon particles is less than 50 ppm, less than 20 ppm, less than 10 ppm, less than 5 ppm, less than 4 ppm, less than 3 ppm, less than 2 ppm or less than 1 ppm. In other embodiments, the level of nickel present in the carbon particles is less than 20 ppm, less than 10 ppm, less than 5 ppm, less than 4 ppm, less than 3 ppm, less than 2 ppm or less than 1 ppm. In some other embodiments, the level of copper present in the carbon particles is less than 140 ppm, less than 100 ppm, less than 40 ppm, less than 20 ppm, less than 10 ppm, less than 5 ppm, less than 4 ppm, less than 3 ppm, less than 2 ppm or less than 1 ppm. In yet other embodiments, the level of zinc present in the carbon particles is less than 20 ppm, less than 10 ppm, less than 5 ppm, less than 2 ppm or less than 1 ppm. In yet other embodiments, the sum of all other PIXE impurities (excluding the electrochemical modifier) present in the carbon particles is less than 1000 ppm, less than 500 pm, less than 300 ppm, less than 200 ppm, less than 100 ppm, less than 50 ppm, less than 25 ppm, less than 10 ppm or less than 1 ppm. As noted above, in some embodiments other impurities such as hydrogen, oxygen and/or nitrogen may be present in levels ranging from less than 10% to less than 0.01%.

In some embodiments, the carbon particles comprise undesired PIXE impurities near or below the detection limit of the proton induced x-ray emission analysis. For example, in some embodiments the carbon particles comprises less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

In some specific embodiments, the carbon particles comprise less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission. In other specific embodiments, the carbon particles comprise less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

In other specific embodiments, the carbon particles comprise less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the carbon particles comprise less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

The disclosed carbon particles also comprise a high surface area. While not wishing to be bound by theory, it is thought that such high surface area may contribute, at least in part, to the superior electrochemical performance of the blends. Accordingly, in some embodiments, the carbon particles comprise a BET specific surface area of at least 100 m$^2$/g, at least 200 m$^2$/g, at least 300 m$^2$/g, at least 400 m$^2$/g, at least 500 m$^2$/g, at least 600 m$^2$/g, at least 700 m$^2$/g, at least 800 m$^2$/g, at least 900 m$^2$/g, at least 1000 m$^2$/g, at least 1500 m$^2$/g, at least 2000 m$^2$/g, at least 2400 m$^2$/g, at least 2500 m$^2$/g, at least 2750 m$^2$/g or at least 3000 m$^2$/g. For example, in some embodiments of the foregoing, the carbon particles are activated.

In another embodiment, the carbon particles comprise a tap density between 0.1 and 1.0 g/cc, between 0.2 and 0.8 g/cc, between 0.3 and 0.5 g/cc or between 0.4 and 0.5 g/cc. In another embodiment, the carbon particles has a total pore volume of at least 0.1 cm$^3$/g, at least 0.2 cm$^3$/g, at least 0.3 cm$^3$/g, at least 0.4 cm$^3$/g, at least 0.5 cm$^3$/g, at least 0.7 cm$^3$/g, at least 0.75 cm$^3$/g, at least 0.9 cm$^3$/g, at least 1.0 cm$^3$/g, at least 1.1 cm$^3$/g, at least 1.2 cm$^3$/g, at least 1.3 cm$^3$/g, at least 1.4 cm$^3$/g, at least 1.5 cm$^3$/g or at least 1.6 cm$^3$/g.

The pore size distribution of the disclosed carbon particles is one parameter that may have an effect on the electrochemical performance of the blends. Accordingly, in one embodiment, the carbon particles comprise a fractional pore volume of pores at or below 100 nm that comprises at least 50% of the total pore volume, at least 75% of the total pore volume, at least 90% of the total pore volume or at least 99% of the total pore volume. In other embodiments, the carbon particle comprises a fractional pore volume of pores at or below 20 nm that comprises at least 50% of the total pore volume, at least 75% of the total pore volume, at least 90% of the total pore volume or at least 99% of the total pore volume.

In another embodiment, the carbon particles comprise a fractional pore surface area of pores at or below 100 nm that comprises at least 50% of the total pore surface area, at least 75% of the total pore surface area, at least 90% of the total pore surface area or at least 99% of the total pore surface area. In another embodiment, the carbon particles comprise a fractional pore surface area of pores at or below 20 nm that comprises at least 50% of the total pore surface area, at least 75% of the total pore surface area, at least 90% of the total pore surface area or at least 99% of the total pore surface area.

In another embodiment, the carbon particles comprise pores predominantly in the range of 1000 angstroms or lower, for example 100 angstroms or lower, for example 50 angstroms or lower. Alternatively, the carbon particles comprise micropores in the range of 0-20 angstroms and mesopores in the range of 20-1000 angstroms. The ratio of pore volume or pore surface in the micropore range compared to the mesopore range can be in the range of 95:5 to 5:95.

In other embodiments, the carbon particles are mesoporous and comprise monodisperse mesopores. As used herein, the term "monodisperse" when used in reference to a pore size refers generally to a span (further defined as (Dv90−Dv10)/Dv, 50 where Dv10, Dv50 and Dv90 refer to the pore size at 10%, 50% and 90% of the distribution by volume of about 3 or less, typically about 2 or less, often about 1.5 or less.

Yet in other embodiments, the carbons particles comprise a total pore volume of at least 0.2 cc/g, at least 0.5 cc/g, at least 0.75 cc/g, at least 1 cc/g, at least 2 cc/g, at least 3 cc/g, at least 4 cc/g or at least 7 cc/g. In one particular embodiment, the carbon particles comprise a pore volume of from 0.5 cc/g to 1.0 cc/g.

In other embodiments, the carbon particles comprise at least 50% of the total pore volume residing in pores with a diameter ranging from 50 Å to 5000 Å. In some instances, the carbon particles comprise at least 50% of the total pore volume residing in pores with a diameter ranging from 50 Å to 500 Å. Still in other instances, the carbon particles comprise at least 50% of the total pore volume residing in pores with a diameter ranging from 500 Å to 1000 Å. Yet in other instances, the carbon particles comprise at least 50% of the total pore volume residing in pores with a diameter ranging from 1000 Å to 5000 Å.

In some embodiments, the mean particle diameter for the carbon particles ranges from 1 to 1000 microns. In other embodiments the mean particle diameter for the carbon particles ranges from 1 to 100 microns. Still in other embodiments the mean particle diameter for the carbon particles ranges from 5 to 50 microns. Yet in other embodiments, the mean particle diameter for the carbon particles ranges from 5 to 15 microns or from 3 to 5 microns. Still in other embodiments, the mean particle diameter for the carbon particles is about 10 microns.

In some embodiments, the carbon particles comprise pores having a peak pore volume ranging from 2 nm to 10 nm. In other embodiments, the peak pore volume ranges from 10 nm to 20 nm. Yet in other embodiments, the peak pore volume ranges from 20 nm to 30 nm. Still in other embodiments, the peak pore volume ranges from 30 nm to 40 nm. Yet still in other embodiments, the peak pore volume ranges from 40 nm to 50 nm. In other embodiments, the peak pore volume ranges from 50 nm to 100 nm.

While not wishing to be bound by theory, a carbon particle comprising small pore sizes (i.e., pore lengths) may have the advantage of decreased diffusion distances to facilitate impregnation of lead or a lead salt. For example, it is believed that the employment of carbon particles with a substantial fraction of pores in the mesopore range (as discussed above) will provide a significant advantage compared to carbon particles which comprise much larger pore sizes, for example micron or millimeter size pores.

In some embodiments, the blend comprises carbon particles and lead particles wherein, the carbon particles exhibit low surface functionality. For example, in some embodiments, the carbon particles exhibit a surface functionality of less than 20 mEq per 100 gram of carbon, less than 10 mEq per 100 gram of carbon, less than 5 mEq per 100 gram of carbon as determined by Boehm titration or less than 1 mEq per 100 gram of carbon as determined by Boehm titration. In other embodiments, the carbon particles exhibit a surface functionality of greater than 20 mEq per 100 gram of carbon as determined by Boehm titration.

The acidity of the carbon particles may also vary. In some embodiments, acidity, basicity or neutrality of the carbon particles can be determined by adding the carbon particles to sulfuric acid and measuring a change in pH. If the pH decreases, the carbon particles are acidic. If the pH increases, the carbon particles are basic. If the pH shows no change, the carbon particles are neutral. The present invention includes individual embodiments wherein the carbon particles are acidic, basic or neutral. The following table shows different carbon embodiments having different pH values and change in molarity values (see e.g., Example 32)

| pH Range | Change in Molarity Range |
|---|---|
| 3.5-4.5 | 0 to −0.25 |
| 3.5 to 4.5 | −0.5 to −0.75 |
| 5 to 6.5 | 0.3 to 0.8 |
| 7.5 to 9 | 0.25 to 0.6 |
| 8 to 9.5 | 0 to −0.25 |
| 8 to 9.5 | −0.1 to −1.3 |

The pH of the carbon particles can vary. For example, in some embodiments the pH of the carbon particles is basic. For example, in some embodiments the pH of the carbon particles is greater than 7, greater than 8 or greater than 9. In other embodiments, the pH of the carbon particles is acidic. For example, in certain embodiments the pH of the carbon particles is less than 7, less than 6 or less than 5. In still other embodiments, the pH of the carbon particles may be determined by suspending the carbon particles in water and measuring the resulting pH.

The blend may comprise a plurality of carbon particles and a plurality of lead particles, wherein the capacitance of the carbon particles varies. In some embodiments, the capacitance of the carbon particles measured at a rate of 1 mA is greater than 600 F/g, greater than 550 F/g, greater than 500 F/g, greater than 450 F/g, greater than 400 F/g, greater than 350 F/g, greater than 300 F/g, greater than 250 F/g, greater than 200 F/g or greater than 100 F/g. In other embodiments, the capacitance of the carbon particles measured at a rate of 1 mA is less than 300 F/g or less than 250 F/g. In certain embodiments of the foregoing, the capacitance is measured in a sulfuric acid electrolyte. For example, in some embodiments the capacitance is measured based on the discharge data of a galvanostatic charge/discharge profile to 0.9V and 0V at a symmetric current density ranging from 0.1 A/g carbon to 10 A/g carbon (see e.g., Example 28).

In certain embodiments, the water absorbing properties (i.e., total amount of water the carbon particles can absorb) of the carbon particles are predictive of the carbon's electrochemical performance when incorporated into a carbon-lead blend. The water can be absorbed into the pore volume in the carbon particles and/or within the space between the individual carbon particles. The more water absorption, the greater the surface area is exposed to water molecules, thus increasing the available lead-sulfate nucleation sites at the liquid-solid interface. The water accessible pores also allow for the transport of electrolyte into the center of the lead pasted plate for additional material utilization. Accordingly, in some embodiments the carbon particles are activated carbon particles and have a water absorption of greater than 0.2 g $H_2O$/cc (cc=pore volume in the carbon particle), greater than 0.4 g $H_2O$/cc, greater than 0.6 g $H_2O$/cc, greater than 0.8 g $H_2O$/cc, greater than 1.0 g $H_2O$/cc, greater than 1.25 g $H_2O$/cc, greater than 1.5 g $H_2O$/cc, greater than 1.75 g $H_2O$/cc, greater than 2.0 g $H_2O$/cc, greater than 2.25 g $H_2O$/cc, greater than 2.5 g $H_2O$/cc or even greater than 2.75 g $H_2O$/cc. In other embodiments the particles are unactivated particles and have a water absorption of greater than 0.2 g $H_2O$/cc, greater than 0.4 g $H_2O$/cc, greater than 0.6 g $H_2O$/cc, greater than 0.8 g $H_2O$/cc, greater than 1.0 g $H_2O$/cc, greater than 1.25 g $H_2O$/cc, greater than 1.5 g $H_2O$/cc, greater than 1.75 g $H_2O$/cc, greater than 2.0 g $H_2O$/cc, greater than 2.25 g $H_2O$/cc, greater than 2.5 g $H_2O$/cc or even greater than 2.75 g $H_2O$/cc. Methods for determining water absorption of exemplary carbon particles are known in the art and described in Example 26.

The water absorption of the carbon particles can also be measured in terms of an R factor, wherein R is the maximum grams of water absorbed per gram of carbon. In some embodiments, the R factor is greater than 2.0, greater than 1.8, greater than 1.6, greater than 1.4, greater than 1.2, greater than 1.0, greater than 0.8, or greater than 0.6. In other embodiments, the R value ranges from 1.2 to 1.6, and in still other embodiments the R value is less than 1.2.

The R factor of a carbon particle can also be determined based upon the carbon particles' ability to absorb water when exposed to a humid environment for extended periods of time (e.g., 2 weeks). For example, in some embodiments the R factor is expressed in terms of relative humidity. In this regard, the carbon particles comprise an R factor ranging from about 0.1 to about 1.0 at relative humidities ranging from 10% to 100%. In some embodiments, the R factor is less than 0.1, less than 0.2, less than 0.3, less than 0.4, less than 0.5, less than 0.6, less than 0.7 or even less than 0.8 at relative humidities ranging from 10% to 100%. In embodiments of the foregoing, the carbon particles comprise a total pore volume between about 0.1 cc/g and 2.0 cc/g, between about 0.2 cc/g and 1.8 cc/g, between about 0.4 cc/g and 1.4 cc/g, between about 0.6 cc/g and 1.2 cc/g. In other embodiments of the foregoing, the relative humidity ranges from about 10% to about 20%, from about 20% to about 30%, from about 30% to about 40%, from about 40% to about 50%, from about 50% to about 60%, from about 60%, to about 70%, from about 70% to about 80%, from about 80% to about 90% or from about 90% to about 99% or even 100%. The above R factors may be determined by exposing the carbon particles to the specified humidities at room temperature for two weeks.

In another embodiment of the present disclosure, the carbon particles are prepared by a method disclosed herein, for example, in some embodiments the carbon particles are prepared by a method comprising pyrolyzing a dried polymer gel as disclosed herein. In some embodiments, the pyrolyzed polymer gel is further activated to obtain an activated carbon material. In some embodiments, the activated carbon material is particle size reduced using approaches known in the art, for example, jet milling or ball milling. Carbon particles comprising lead can also be prepared by any number of methods described in more detail below.

C. Preparation of the Blends

Blends of carbon particles and lead particles can be produced by methods known in the art. In general, the blends are prepared by admixing carbon particles and lead particles and optionally an electrolyte, expander, binder or combinations thereof. For example, particles of carbon can be made by the polymer gel methods disclosed herein and in U.S. application Ser. No. 12/965,709 and U.S. Publication No. 2001/002086, both of which are hereby incorporated by reference in their entireties. Particles of lead can be made by methods known in the art, for example milling, grinding and the like. Blending of the two different particles can be accomplished also by methods known. In the case of blending multiple populations of carbon particles with lead particles, blending can be done preferentially or in bulk. For example, two particle populations can be initially blended and a third can be added to this mixture. In one embodiment, this first mixture exhibits bimodal carbon particle size. In a further embodiment, the first mixture represents a bimodal distribution of carbon particles and lead particles. In a further embodiment, the first mixture represents a mixture of carbon particles and lead particles of similar size. Details for preparation of the carbon particles are described below.

1. Preparation of Polymer Gels

The polymer gels may be prepared by a sol gel process. For example, the polymer gel may be prepared by co-polymerizing one or more polymer precursors in an appropriate solvent. In one embodiment, the one or more polymer precursors are co-polymerized under acidic conditions. In some embodiments, a first polymer precursor is a phenolic compound and a second polymer precursor is an aldehyde compound. In one embodiment, of the method the phenolic compound is phenol, resorcinol, catechol, hydroquinone, phloroglucinol, or a combination thereof and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol and the aldehyde compound is formaldehyde.

In certain embodiments, lead may be incorporated during the above described polymerization process. For example, in some embodiments, lead in the form of lead particles, lead paste, lead salt, lead oxide or molten lead can be dissolved or suspended into the mixture from which the gel resin is produced. In some specific embodiments, the lead is in the form of a lead salt. Examples of lead salts in this context include, but are not limited to: lead acetate, lead orthoarsenate, lead pyroarsenate, lead bromide, lead caprate, lead carproate, lead caprylate, lead chlorate, lead chloride, lead fluoride, lead monooxide, lead nitrate, lead oxychloride, lead orthophosphate sulfate, lead sulfide, and lead tungstate. Combinations of the above lead salts may also be employed.

In some embodiments, the lead salt dissolved into the mixture from which the gel resin is produced is soluble in the reaction mixture. In this case, the mixture from which the gel resin is produced may contain an acid and/or alcohol which improves the solubility of the lead salt. The lead-containing polymer gel can be freeze dried, followed by pyrolysis and activation to result in lead-containing activated carbon suitable for use in hybrid carbon/metal energy storage devices as discussed in more detail below.

The sol gel polymerization process is generally performed under catalytic conditions. Accordingly, in some embodiments, preparing the polymer gel comprises co-polymerizing one or more polymer precursors in the presence of a catalyst. In some embodiments, the catalyst comprises a basic volatile catalyst. For example, in one embodiment, the basic volatile catalyst comprises ammonium carbonate, ammonium bicarbonate, ammonium acetate, ammonium hydroxide, or combinations thereof. In a further embodiment, the basic volatile catalyst is ammonium carbonate. In another further embodiment, the basic volatile catalyst is ammonium acetate.

The molar ratio of catalyst to phenolic compound may have an effect on the final properties of the polymer gel as well as the final properties of the carbon materials, for example. Thus, in some embodiments such catalysts are used in the range of molar ratios of 5:1 to 2000:1 phenolic compound:catalyst. In some embodiments, such catalysts can be used in the range of molar ratios of 20:1 to 200:1 phenolic compound:catalyst. For example in other embodiments, such catalysts can be used in the range of molar ratios of 5:1 to 100:1 phenolic compound:catalyst.

The reaction solvent is another process parameter that may be varied to obtain the desired properties (e.g., surface area, porosity, purity, etc.) of the polymer gels and carbon materials. In some embodiments, the solvent for preparation of the polymer gel is a mixed solvent system of water and a miscible co-solvent. For example, in certain embodiments the solvent comprises a water miscible acid. Examples of water miscible acids include, but are not limited to, propionic acid, acetic acid, and formic acid. In further embodiments, the solvent comprises a ratio of water-miscible acid to water of 99:1, 90:10, 75:25, 50:50, 25:75, 10:90 or 1:90. In other embodiments, acidity is provided by adding a solid acid to the reaction solvent.

In some other embodiments of the foregoing, the solvent for preparation of the polymer gel is acidic. For example, in certain embodiments the solvent comprises acetic acid. For example, in one embodiment, the solvent is 100% acetic acid. In other embodiments, a mixed solvent system is provided, wherein one of the solvents is acidic. For example, in one embodiment of the method the solvent is a binary solvent comprising acetic acid and water. In further embodiments, the solvent comprises a ratio of acetic acid to water of 99:1, 90:10, 75:25, 50:50, 25:75, 20:80, 10:90 or 1:90. In other embodiments, acidity is provided by adding a solid acid to the reaction solvent.

In some embodiments, the lead is incorporated into the polymer gel after the polymerization step, for example either before or after drying of the polymer gel. In some other embodiments, the polymer gel (either before or after drying) is impregnated with lead by immersion in a lead salt solution or suspension. The lead salt solution or suspension may comprise acids and/or alcohols to improve solubility of the lead salt. Lead salts in this context include, but are not limited to, those described above. In yet another variation, the polymer gel (either before or after drying) is contacted with a paste comprising lead. In yet another variation, the polymer gel (either before or after drying) is contacted with lead or a lead oxide sol. The sol is a nanophase colloidal suspension which is maintained using control over pH and liquid solid interfacial properties such as surface tension, polarity, and solvent solid interactions.

In some embodiments, the polymerization is conducted to produce a single continuous phase that is used to form a monolithic resin after curing. In other embodiments, the polymerization is conducted in a two or more phase system, wherein the aqueous polymer containing phase is cured in particulate form.

Some embodiments of the disclosed method do not comprise a solvent exchange step (e.g., exchange t-butanol for water) prior to drying (e.g., lyophilization). For example, in one embodiment of any of the methods described herein, before freezing, the polymer gel or polymer gel particles are rinsed with water. In one embodiment, the average diameter of the polymer gel particles prior to freezing is less than 25 mm, for example, between 0.001 mm and 25 mm; alternately, the average diameter of the polymer gel particles prior to freezing is between 0.01 mm and 15 mm, for example, between 1.0 mm and 15 mm. In some examples, the polymer gel particles are between 1 mm and 10 mm. In further embodiments, the polymer gel particles are frozen via immersion in a medium having a temperature of below about −10° C., for example, below about −20° C., or alternatively below about −30° C. For example, the medium may be liquid nitrogen or ethanol (or other organic solvent) in dry ice or ethanol cooled by another means. In some embodiments, drying under vacuum comprises subjecting the frozen particles to a vacuum pressure of below about 1400 mTorr.

Other methods of rapidly freezing the polymer gel particles are also envisioned. For example, in another embodiment the polymer gel is rapidly frozen by co-mingling or physical mixing of polymer gel particles with a suitable cold solid, for example, dry ice (solid carbon dioxide). Another envisioned method comprises using a blast freezer with a metal plate at −60° C. to rapidly remove heat from the polymer gel particles scattered over its surface. Another method of rapidly cooling water in a polymer gel particle is to snap freeze the particle by pulling a high vacuum very rapidly (the degree of vacuum is such that the temperature corresponding to the equilibrium vapor pressure allows for freezing). Yet another method for rapid freezing comprises admixing a polymer gel with a suitably cold gas. In some embodiments the cold gas may have a temperature below about −10° C. In some embodiments the cold gas may have a temperature below about −20° C. In some embodiments the cold gas may have a temperature below about −30° C. In yet other embodiments, the gas may have a temperature of about −196° C. For example, in some embodiments, the gas is nitrogen. In yet other embodiments, the gas may have a temperature of about −78° C. For example, in some embodiments, the gas is carbon dioxide.

In other embodiments, the polymer gel particles are frozen on a lyophilizer shelf at a temperature of −20° C. or lower. For example, in some embodiments the polymer gel particles are frozen on the lyophilizer shelf at a temperature of −30° C. or lower. In some other embodiments, the polymer gel monolith is subjected to a freeze thaw cycle (from room temperature to −20° C. or lower and back to room temperature), physical disruption of the freeze-thawed gel to create particles, and then further lyophilization processing. For example, in some embodiments, the polymer gel monolith is subjected to a freeze thaw cycle (from room temperature to −30° C. or lower and back to room temperature), physical disruption of the freeze-thawed gel to create particles, and then further lyophilization processing.

In some embodiments of the methods described herein, the molar ratio of phenolic precursor to catalyst is from about 5:1 to about 2000:1 or the molar ratio of phenolic precursor to catalyst is from about 20:1 to about 200:1. In further embodiments, the molar ratio of phenolic precursor to catalyst is from about 25:1 to about 100:1. In further embodiments, the molar ratio of phenolic precursor to catalyst is from about 25:1 to about 50:1. In further embodiments, the molar ratio of phenolic precursor to catalyst is from about 100:1 to about 5:1.

In the specific embodiment wherein one of the polymer precursors is resorcinol and another polymer precursor is formaldehyde, the resorcinol to catalyst ratio can be varied to obtain the desired properties of the resultant polymer gel and carbon materials. In some embodiments of the methods described herein, the molar ratio of resorcinol to catalyst is from about 10:1 to about 2000:1 or the molar ratio of resorcinol to catalyst is from about 20:1 to about 200:1. In further embodiments, the molar ratio of resorcinol to catalyst is from about 25:1 to about 100:1. In further embodiments, the molar ratio of resorcinol to catalyst is from about 25:1 to about 50:1. In further embodiments, the molar ratio of resorcinol to catalyst is from about 100:1 to about 5:1.

Polymerization to form a polymer gel can be accomplished by various means described in the art and may include addition of an electrochemical modifier. For instance, polymerization can be accomplished by incubating suitable polymer precursor materials, and optionally an electrochemical modifier, in the presence of a suitable catalyst for a sufficient period of time. The time for polymerization can be a period ranging from minutes or hours to days, depending on the temperature (the higher the temperature the faster, the reaction rate, and correspondingly, the shorter the time required). The polymerization temperature can range from room temperature to a temperature approaching (but lower than) the boiling point of the starting solution. For example, the temperature can range from about 20° C. to about 90° C. In the specific embodiment wherein one polymer precursor is resorcinol and one polymer precursor is formaldehyde, the temperature can range from about 20° C. to about 100° C., typically from about 25° C. to about 90° C. In some embodiments, polymerization can be accomplished by incubation of suitable synthetic polymer precursor materials in the presence of a catalyst for at least 24 hours at about 90° C. Generally polymerization can be accomplished in between about 6 and about 24 hours at about 90° C., for example between about 18 and about 24 hours at about 90° C.

The polymer precursor materials as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used. Representative polyhydroxy compounds include sugars, such as glucose, and other polyols, such as mannitol. Aldehydes in this context include: straight chain saturated aldehydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In some embodiments, one polymer precursor is an alcohol-containing species and another polymer precursor is a carbonyl-containing species. The relative amounts of alcohol-containing species (e.g., alcohols, phenolic compounds and mono- or poly-hydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

The total solids content in the solution or suspension prior to polymer gel formation can be varied. The weight ratio of resorcinol to water is from about 0.05 to 1 to about 0.70 to 1. Alternatively, the ratio of resorcinol to water is from about 0.15 to 1 to about 0.6 to 1. Alternatively, the ratio of resorcinol to water is from about 0.15 to 1 to about 0.35 to 1. Alternatively, the ratio of resorcinol to water is from about 0.25 to 1 to about 0.5 to 1. Alternatively, the ratio of resorcinol to water is from about 0.3 to 1 to about 0.4 to 1.

Examples of solvents useful in the preparation of the polymer gels disclosed herein include but are not limited to water or alcohols such as, for example, ethanol, t butanol, methanol or combinations thereof as well as aqueous mixtures of the same. Such solvents are useful for dissolution of the polymer precursor materials, for example dissolution of the phenolic compound. In addition, in some processes such solvents are employed for solvent exchange in the polymer gel (prior to freezing and drying), wherein the solvent from the polymerization of the precursors, for example, resorcinol and formaldehyde, is exchanged for a pure alcohol. In one embodiment of the present application, a polymer gel is prepared by a process that does not include solvent exchange.

Suitable catalysts in the preparation of the polymer gels include volatile basic catalysts that facilitate polymerization of the precursor materials into a monolithic polymer. The catalyst can also comprise various combinations of the catalysts described above. In embodiments comprising phenolic compounds, such catalysts can be used in the range of molar ratios of 5:1 to 200:1 phenolic compound:catalyst. For example, in some specific embodiments such catalysts can be used in the range of molar ratios of 25:1 to 100:1 phenolic compound:catalyst.

2. Creation of Polymer Gel Particles

A monolithic polymer gel can be physically disrupted to create smaller particles according to various techniques known in the art. The resultant polymer gel particles generally have an average diameter of less than about 30 mm, for example, in the size range of about 1 mm to about 25 mm, or between about 1 mm to about 5 mm or between about 0.5 mm to about 10 mm. Alternatively, the size of the polymer gel particles can be in the range below about 1 mm, for example, in the size range of about 10 to 1000 microns. Techniques for creating polymer gel particles from monolithic material include manual or machine disruption methods, such as sieving, grinding, milling, or combinations thereof. Such methods are well-known to those of skill in the art. Various types of mills can be employed in this context such as roller, bead, and ball mills and rotary crushers and similar particle creation equipment known in the art.

In a specific embodiment, a roller mill is employed. A roller mill has three stages to gradually reduce the size of the gel particles. The polymer gels are generally very brittle and are not damp to the touch. Consequently they are easily milled using this approach; however, the width of each stage must be set appropriately to achieve the targeted final mesh. This adjustment is made and validated for each combination of gel recipe and mesh size. Each gel is milled via passage through a sieve of known mesh size. Sieved particles can be temporarily stored in sealed containers.

In one embodiment, a rotary crusher is employed. The rotary crusher has a screen mesh size of about $\frac{1}{8}^{th}$ inch. In another embodiment, the rotary crusher has a screen mesh size of about $\frac{3}{8}^{th}$ inch. In another embodiment, the rotary crusher has a screen mesh size of about $\frac{5}{8}^{th}$ inch. In another embodiment, the rotary crusher has a screen mesh size of about $\frac{3}{8}^{th}$ inch.

Milling can be accomplished at room temperature according to methods well known to those of skill in the art. Alternatively, milling can be accomplished cryogenically, for example by co-milling the polymer gel with solid carbon dioxide (dry ice) particles. In this embodiment, the two steps of (a) creating particles from the monolithic polymer gel and (b) rapid, multidirectional freezing of the polymer gel are accomplished in a single process.

3. Rapid Freezing of Polymer Gels

After the polymer gel particles are formed from the monolithic polymer gel, freezing of the polymer gel particles may be accomplished rapidly and in a multi-directional fashion as described in more detail above. Freezing slowly and in a unidirectional fashion, for example by shelf freezing in a lyophilizer, results in dried material having a very low surface area. Similarly, snap freezing (i.e., freezing that is accomplished by rapidly cooling the polymer gel particles by pulling a deep vacuum) also results in a dried material having a low surface area. As disclosed herein rapid freezing in a multidirectional fashion can be accomplished by rapidly lowering the material temperature to at least about −10° C. or lower, for example, −20° C. or lower, or for example, to at least about −30° C. or lower. Rapid freezing of the polymer gel particles creates a fine ice crystal structure within the particles due to widespread nucleation of ice crystals, but leaves little time for ice crystal growth. This provides a high specific surface area between the ice crystals and the hydrocarbon matrix, which is necessarily excluded from the ice matrix.

The concept of extremely rapid freezing to promote nucleation over crystal growth can also be applied to mixed solvent systems. In one embodiment, as the mixed solvent system is rapidly cooled, the solvent component that predominates will undergo crystallization at its equilibrium melting temperature, with increased concentration of the co-solvent(s) and concomitant further freezing point depression. As the temperature is further lowered, there is increased crystallization of the predominant solvent and concentration of co-solvent(s) until the eutectic composition is reached, at which point the eutectic composition undergoes the transition from liquid to solid without further component concentration or product cooling until complete freezing is achieved. In the specific case of water and acetic acid (which as pure substances exhibit freezing points of 0° C. and 17° C., respectively), the eutectic composition is comprised of approximately 59% acetic acid and 41% water and freezes at about −27° C. Accordingly, in one embodiment, the mixed solvent system is the eutectic composition, for example, in one embodiment the mixed solvent system comprises 59% acetic acid and 41% water.

In one embodiment, freezing slowly and in a unidirectional fashion can be employed to intentionally modulate the surface area in the gel after lyophilization, in order to obtained the desired pore structure in the freeze dried gel.

4. Drying of Polymer Gels

In one embodiment, the frozen polymer gel particles containing a fine ice matrix are lyophilized under conditions designed to avoid collapse of the material and to maintain fine surface structure and porosity in the dried product. Generally drying is accomplished under conditions where the temperature of the product is kept below a temperature that would otherwise result in collapse of the product pores, thereby enabling the dried material to retain an extremely high surface area.

The structure of the final carbon material is reflected in the structure of the dried polymer gel which in turn is established by the polymer gel properties. These features can be created in the polymer gel using a sol-gel processing approach as described herein, but if care is not taken in removal of the solvent, then the structure is not preserved. It is of interest to both retain the original structure of the polymer gel and modify its structure with ice crystal formation based on control of the freezing process. In some embodiments prior to drying, the aqueous content of the polymer gel is in the range of about 50% to about 99%. In certain embodiments upon drying, the aqueous content of the polymer cryogel is about 10%, alternately less than about 5% or less than about 2.5%.

A lyophilizer chamber pressure of about 2250 microns results in a primary drying temperature in the drying product of about −10° C. Drying at about 2250 micron chamber pressure or lower case provides a product temperature during primary drying that is no greater than about −10° C. As a further illustration, a chamber pressure of about 1500 microns results in a primary drying temperature in the drying product of about −15° C. Drying at about 1500 micron chamber pressure or lower provides a product temperature during primary drying that is no greater than about −15° C. As yet a further illustration, a chamber pressure of about 750 microns results in a primary drying temperature in the drying product of about −20° C. Drying at 750 micron chamber pressure or lower provides a product temperature during primary drying that is no greater than about −20° C. As yet a further illustration, a chamber pressure of about 300 microns results in a primary drying temperature in the drying product of about −30° C. Drying at 300 micron chamber pressure or lower provides a product temperature during primary drying that is no greater than about −30° C.

In some embodiments, lead is incorporated into the carbon material after drying of the polymer gel. For example, lead can be incorporated into the dried polymer gel by contacting the dried polymer gel with lead, for example, colloidal lead, lead salt, lead paste, lead oxide or other sources of lead. In some specific embodiments, lead is incorporated into the dried polymer gel by contacting the dried polymer gel with a lead salt in a manner and for a time sufficient to allow diffusion of the lead salt into the pores of the dried polymer gel. Lead salts useful in this context include those lead salts described above.

5. Pyrolysis and Activation of Polymer Gels

The polymer gels described above, can be further processed to obtain carbon materials. Such processing includes, for example, pyrolysis and/or activation. Generally, in the pyrolysis process, dried polymer gels are weighed and placed in a rotary kiln. The temperature ramp is set at 5° C. per minute, the dwell time and dwell temperature are set; cool down is determined by the natural cooling rate of the furnace. The entire process is usually run under an inert atmosphere, such as a nitrogen environment. Pyrolyzed samples are then removed and weighed. Other pyrolysis processes are well known to those of skill in the art.

In some embodiments, lead is incorporated into the carbon material after pyrolysis of the dried polymer gel. For example, lead can be incorporated into the pyrolyzed polymer gel by contacting the pyrolyzed polymer gel with lead, for example, colloidal lead, molten lead, lead salt, lead paste, lead oxide or other sources of lead. In some specific embodiments, the lead is incorporated into the pyrolyzed polymer gel by contacting the pyrolyzed polymer gel with a lead salt in a manner and for a time sufficient to allow diffusion of the lead salt into the pores of the pyrolyzed polymer gel. Lead salts useful in this context include those lead salts described above.

In some embodiments, pyrolysis dwell time (the period of time during which the sample is at the desired temperature) is from about 0 minutes to about 120 minutes, from about 0 minutes to about 60 minutes, from about 0 minutes to about 30 minutes, from about 0 minutes to about 10 minutes, from about 0 to 5 minutes or from about 0 to 1 minute.

Pyrolysis may also be carried out more slowly than described above. For example, in one embodiment the pyrolysis is carried out in about 120 to 480 minutes. In other embodiments, the pyrolysis is carried out in about 120 to 240 minutes.

In some embodiments, pyrolysis dwell temperature ranges from about 500° C. to 2400° C. In some embodiments, pyrolysis dwell temperature ranges from about 650° C. to 1800° C. In other embodiments pyrolysis dwell temperature ranges from about 700° C. to about 1200° C. In other embodiments pyrolysis dwell temperature ranges from about 800° C. to about 1000° C. In other embodiments pyrolysis dwell temperature ranges from about 850° C. to about 950° C. In other embodiments pyrolysis dwell temperature is about 900° C.

In still other embodiments, pyrolysis dwell temperature ranges from about 500° C. to about 750° C., or from about 550° C. to about 650° C. In other embodiments pyrolysis dwell temperature is about 650° C.

In some embodiments, the pyrolysis dwell temperature is varied during the course of pyrolysis. In one embodiment, the pyrolysis is carried out in a rotary kiln with separate, distinct heating zones. The temperature for each zone is sequentially decreased from the entrance to the exit end of the rotary kiln tube. In one embodiment, the pyrolysis is carried out in a rotary kiln with separate distinct heating zones, and the temperature for each zone is sequentially increased from entrance to exit end of the rotary kiln tube.

Activation time and activation temperature both have a large impact on the performance of the resulting activated carbon material, as well as the manufacturing cost thereof. Increasing the activation temperature and the activation dwell time results in higher activation percentages, which generally correspond to the removal of more material compared to lower temperatures and shorter dwell times. Activation temperature can also alter the pore structure of the carbon where lower temperatures result in more microporous carbon and higher temperatures result in mesoporosity. This is a result of the activation gas diffusion limited reaction that occurs at higher temperatures and reaction kinetic driven reactions that occur at lower temperature. Higher activation percentage often increases performance of the final activated carbon, but it also increases cost by reducing overall yield. Improving the level of activation corresponds to achieving a higher performance product at a lower cost.

Pyrolyzed polymer gels may be activated by contacting the pyrolyzed polymer gel with an activating agent. Many gases are suitable for activating, for example gases which contain oxygen. Non-limiting examples of activating gases include carbon dioxide, carbon monoxide, steam, oxygen and combinations thereof. Activating agents may also include corrosive chemicals such as acids, bases or salts (e.g., phosphoric acid, acetic acid, citric acid, formic acid, oxalic acid, uric acid, lactic acid, potassium hydroxide, sodium hydroxide, zinc chloride, etc.). Other activating agents are known to those skilled in the art.

In some embodiments, the activation time is between 1 minute and 48 hours. In other embodiments, the activation time is between 1 minute and 24 hours. In other embodiments, the activation time is between 5 minutes and 24 hours. In other embodiments, the activation time is between 1 hour and 24 hours. In further embodiments, the activation time is between 12 hours and 24 hours. In certain other embodiments, the activation time is between 30 min and 4 hours. In some further embodiments, the activation time is between 1 hour and 2 hours.

Pyrolyzed polymer gels may be activated using any number of suitable apparatuses known to those skilled in the art, for example, fluidized beds, rotary kilns, elevator kilns, roller hearth kilns, pusher kilns, etc. In one embodiment of the activation process, samples are weighed and placed in a rotary kiln, for which the automated gas control manifold is set to ramp at a 20° C. per minute rate. Carbon dioxide is introduced to the kiln environment for a period of time once the proper activation temperature has been reached. After activation has occurred, the carbon dioxide is replaced by nitrogen and the kiln is cooled down. Samples are weighed at the end of the process to assess the level of activation. Other activation processes are well known to those of skill in the art. In some of the embodiments disclosed herein, activation temperatures may range from 800° C. to 1300° C. In another embodiment, activation temperatures may range from 800° C. to 1050° C. In another embodiment, activation temperatures may range from about 850° C. to about 950° C. One skilled in the art will recognize that other activation temperatures, either lower or higher, may be employed.

The degree of activation is measured in terms of the mass percent of the pyrolyzed dried polymer gel that is lost during the activation step. In one embodiment of the methods described herein, activating comprises a degree of activation from 5% to 90%; or a degree of activation from 10% to 80%; in some cases activating comprises a degree of activation from 40% to 70%, or a degree of activation from 45% to 65%.

In some embodiments, lead is incorporated into the carbon material after activation of the pyrolyzed polymer gel. For example, lead can be incorporated into the activated carbon material by contacting the activated carbon material with lead, for example, molten lead, colloidal lead, lead salt, lead paste, lead oxide or other sources of lead. In some specific embodiments, the lead is incorporated into the pyrolyzed polymer gel by contacting the activated carbon material with a lead salt in a manner and for a time sufficient to allow diffusion of the lead salt into the pores of activated carbon material. Lead salts useful in this context include those lead salts described above.

In one embodiment, micropores, mesopores and macropores of the carbon particles contain lead. In another, related embodiment, both micropores, mesopores and macropores of the carbon particles are impregnated with lead. The lead is then preferentially washed from the mesopores and macropores resulting in carbon particle comprising lead predominantly present in the micropores. In another embodiment, impregnation of the carbon particles with lead is carried out under mild conditions such that the mesopores are impregnated with lead (but no substantial impregnation into micropores) resulting in a material comprising lead predominantly present in mesopores.

Examples of forms of carbon that can be impregnated with lead as described above are not limited to carbon materials prepared by a sol gel process. Such forms of carbon include, but are not limited to: carbon monoliths, carbon particles, carbon nanotubes, and carbon fibers. The carbon can be present in more than one form, for example a combination of carbon particles and carbon monoliths, or carbon particles and carbon fibers. The employment of a combination of different forms of carbon may facilitate binding of lead into the carbon matrix. In some embodiments, a carbon monolith may be formed from a polymer gel prepared in the presence of carbon fibers, with the purpose of retention of the monolith upon freezing, drying, and subsequent pyrolysis, activation, and optional lead impregnation. In another embodiment, bulking and/or glass-forming agents are incorporated into the polymer gel such that the monolith is retained upon freezing, drying, and subsequent pyrolysis, activation, and optional impregnation with lead. Examples of bulking and/or glass-forming agents in this context include, but are not limited to: sugars and poly(ols) such as sucrose and mannitol, and linear or branched polymers such as poly(ethylene glycol)s and dextran.

D. Characterization of Polymer Gels and Carbon Particles

The structural properties of the final carbon material and intermediate polymer gels may be measured using Nitrogen sorption at 77K, a method known to those of skill in the art. The final performance and characteristics of the finished carbon material is important, but the intermediate products (both dried polymer gel and pyrolyzed, but not activated, polymer gel), can also be evaluated, particularly from a quality control standpoint, as known to those of skill in the art. The Micromeretics ASAP 2020 is used to perform detailed micropore and mesopore analysis, which reveals a pore size distribution from 0.35 nm to 50 nm in some embodiments. The system produces a nitrogen isotherm starting at a pressure of $10^{-7}$ atm, which enables high resolution pore size distributions in the sub 1 nm range. The software generated reports utilize a Density Functional Theory (DFT) method to calculate properties such as pore size distributions, surface area distributions, total surface area, total pore volume, and pore volume within certain pore size ranges.

The impurity and lead content of the carbon particles can be determined by any number of analytical techniques known to those of skill in the art. One particular analytical method useful within the context of the present disclosure is proton induced x-ray emission (PIXE). This technique is capable of measuring the concentration of elements having atomic numbers ranging from 11 to 92 at low ppm levels. Accordingly, in one embodiment the concentration of lead, as well as all other elements, present in the carbon particles or blends is determined by PIXE analysis.

E. Devices Comprising the Blends

The disclosed blends can be used as electrode material in any number of electrical energy storage and distribution devices. One such device is a hybrid carbon/metal battery, for example a carbon/lead acid battery. The high purity, surface area and porosity of the blends impart improved electrical properties to electrodes prepared from the same. Accordingly, the present disclosure provides electrical energy storage devices having longer active life and improved power performance relative to devices containing other carbon materials. Specifically, because of the open-cell, porous network, and relatively small pore size of the carbon particles, the chemically active material of the positive and negative electrodes of an electrical energy storage device can be intimately integrated with the current collectors. The reaction sites in the chemically active carbon can therefore be close to one or more conductive carbon structural elements. Thus, electrons produced in the chemically active material at a particular reaction site must travel only a short distance through the active material before encountering one of the many conductive structural elements of a particular current collector.

In addition, the porosity of the disclosed carbon particles provides for a reservoir of electrolyte ions (e.g., sulfate ions) necessary for the charge and discharge in chemical reactions. The proximity of the electrolyte ions to the active material is much closer than in traditional electrodes, and as a result, devices (e.g., batteries) comprising electrodes incorporating the carbon material offer both improved specific power and specific energy values. In other words, these devices, when placed under a load, sustain their voltage above a predetermined threshold value for a longer time than devices comprising traditional current collectors made of lead, graphite plates, activated carbon without lead and the like.

The increased specific power values offered by the disclosed devices also may translate into reduced charging times. Therefore, the disclosed devices may be suitable for applications in which charging energy is available for only a limited amount of time. For instance, in vehicles, a great deal of energy is lost during ordinary braking. This braking energy may be recaptured and used to charge a battery of, for example, a hybrid vehicle. The braking energy, however, is available only for a short period of time (e.g., while braking is occurring). Thus, any transfer of braking energy to a battery must occur during braking. In view of their reduced charging times, the devices of the present invention may provide an efficient means for storing such braking energy.

FIG. 1 provides an illustration of an energy storage device 10, according to one embodiment of the present disclosure. Energy storage device 10 may include various types of batteries. For example, in one embodiment, energy storage device 10 may include a lead acid battery. Other battery chemistries, however, may be used, such as those based on nickel, lithium, sodium-sulfur, zinc, metal hydrides or any other suitable chemistry or materials that can be used to provide an electrochemical potential.

Energy storage device 10 may include a housing 12, terminals 14 (only one shown), and cells 16. Each cell 16 may include one or more positive plates (i.e., electrodes) 18 and one or more negative plates 19. In a lead acid battery, for example, positive plates 18 and negative plates 19 may be stacked in an alternating fashion. Plates 18 and 19 typically comprise an active material in electrical contact with a current collector. In each cell 16, a bus bar 20 may be provided to connect positive plates 18 together. A similar bus bar (not shown) may be included to connect negative plates 19 together.

Each cell 16 may be electrically isolated from adjacent cells by a cell separator 22. Moreover, positive plates 18 may be separated from negative plates 19 by a plate isolator 23. Both cell separators 22 and plate isolators 23 may be made from electrically insulating materials that minimize the risk of two adjacent electrical conductors shorting together. To enable the free flow of electrolyte and/or ions produced by electrochemical reactions in energy storage device 10, however, cell separators 22 and plate isolators 23 may be made from porous materials or materials conducive to ionic transport.

Depending on the chemistry of the energy storage device 10, each cell 16 will have a characteristic electrochemical potential. For example, in a lead acid battery used in automotive and other applications, each cell may have a potential of about 2 volts. Cells 16 may be connected in series to provide the overall potential of the battery. As shown in FIG. 1, an electrical connector 24 may be provided to connect positive bus bar 20 of one cell 16 to a negative bus bar of an adjacent cell. In this way, six lead acid cells may be linked together in series to provide a desired total potential of about 12 volts, for example. Alternative, electrical configurations may be possible depending on the type of battery chemistry employed and the total potential desired.

Once the total desired potential has been provided using an appropriate configuration of cells 16, this potential may be conveyed to terminals 14 on housing 12 using terminal leads 26. These terminal leads 26 may be electrically connected to any suitable electrically conductive components present in energy storage device 10. For example, as illustrated in FIG. 1, terminal leads 26 may be connected to positive bus bar 20 and a negative bus bar of another cell 16. Each terminal lead 26 may establish an electrical connection between a terminal 14 on housing 12 and a corresponding positive bus bar 20 or negative bus bar (or other suitable electrically conductive elements) in energy storage device 10.

Energy storage device 10 may include aqueous or solid electrolytic materials that at least partially fill a volume between positive plates 18 and negative plates 19. In a lead acid battery, for example, the electrolytic material may include an aqueous solution of sulfuric acid and water. Nickel-based batteries may include alkaline electrolyte solutions that include a base, such as potassium hydroxide, mixed with water. It should be noted that other acids and other bases may be used to form the electrolytic solutions of the disclosed batteries.

Electrode plates 18 and 19 may each include a current collector and an active material disposed on the current collector. In certain embodiments, the active material of either electrode plate 18 or 19 or both comprises any of the carbon-lead blends disclosed herein. In other specific embodiments, the lead is in the form of elemental lead, lead (II) oxide, lead (IV) oxide or combinations thereof. In yet other embodiment, the carbon particles are mesoporous, and in other embodiments the carbon particles are microporous.

In other embodiments, the active material of either electrode plate 18 or 19 or both comprises a paste of lead, lead (II) oxide, lead (IV) oxide or combinations thereof and comprises a carbon-lead blend as disclosed herein. While not wishing to be bound by theory, it is believed that the presence of certain elements, in combination with the high surface area, porosity and purity of the carbon particles, is expected to improve the performance of lead/acid batteries employing traditional lead pastes when the carbon-lead blends are admixed with the lead paste. Accordingly, in some embodiments the present disclosure provides a lead/acid battery, wherein, a blend according to the present disclosure is admixed with the lead paste of one of the electrode plates. In yet other embodiment, the carbon particles are mesoporous, and in other embodiments the carbon particles are microporous. Other battery chemistries as described above (e.g., nickel, lithium, etc.) are expected to benefit from the use of the disclosed blends and the above described embodiment is not limited to lead/acid battery chemistries.

In some other embodiments, the present disclosure provides a hybrid device comprising one or more battery electrodes and one or more supercapacitor (i.e., ultracapacitor) electrodes. These devices comprise improved performance properties compared to known batteries or known supercapacitors. Supercapacitor electrodes are described in detail in co-owned U.S. Pat. No. 7,835,136, which is hereby incorporated in its entirety, and generally comprise a carbon material, a binder and an electrode and find utility in a number of electrical storage and distribution devices. Supercapacitor electrodes of certain embodiments herein may also comprise a current collector, for example, a current collector comprising lead.

The hybrid device may comprise a positive battery electrode and a negative supercapacitor electrode. For example, in some embodiments, the positive battery electrode comprises any of the disclosed blends and the negative supercapacitor electrode comprises activated carbon. Accordingly, in some embodiments the positive battery electrode comprises a blend as disclosed herein and the supercapacitor comprises activated carbon, for example ultrapure activated carbon.

In other embodiments of the hybrid device, the supercapacitor electrode comprises activated carbon, for example, ultrapure activated carbon. In other devices, the supercapacitor electrode comprises a blend according to the present disclosure. For example, the supercapacitor electrode may comprise activated carbon impregnated with lead, sulfur, oxides thereof or combinations thereof. Accordingly, in one embodiment the hybrid device comprises a positive battery electrode comprising a carbon-lead blend and further comprises a negative supercapacitor electrode comprising a carbon material or a carbon-lead blend as disclosed herein.

The device can comprise lead-based positive electrodes and one or a plurality of carbon-based negative electrodes. The carbon can contain lead or a lead salt within the carbon matrix. Alternatively, both positive and negative electrode components can contain a carbon component. In this case, either positive or negative electrode components, or both, can contain lead or a lead salt in the carbon matrix.

In another embodiment, the present disclosure provides an electrical energy storage device comprising:

a) at least one positive electrode comprising a first active material in electrical contact with a first current collector;

b) at least one negative electrode comprising a second active material in electrical contact with a second current collector; and c) an electrolyte;

wherein the positive electrode and the negative electrode are separated by an inert porous separator, and wherein at least one of the first or second active materials comprises the carbon-lead blend. In certain embodiments, the device is a battery, for example, a lead acid battery. Active materials within the scope of the present disclosure include materials capable of storing and/or conducting electricity (e.g., an electrochemical modifier).

In other embodiments, the electrical energy storage device comprises one or more lead-based positive electrodes and one or more carbon-based negative electrodes, and the carbon-based electrode comprises a carbon-lead blend. In other embodiments of the disclosed device, both positive and negative electrode components optionally comprise carbon, for example, a blend as disclosed herein. For example, either the positive or negative electrode components, or both, comprise any of the disclosed blends. In further embodiments of the foregoing, the positive and/or negative electrodes further comprise one or more other elements in addition to lead and carbon which act to enhance the performance of the active materials. Such other elements include, but are not limited to, lead, tin, antimony, bismuth, arsenic, tungsten, silver, zinc, cadmium, indium, sulfur, silicon and combinations thereof as well as oxides of the same and compounds comprising the same.

The disclosed blends find utility in electrodes for use in lead acid batteries. Accordingly, one embodiment of the present disclosure is a hybrid lead-carbon-acid electrical energy storage device comprising at least one cell, wherein the at least one cell comprises a plurality of carbon-lead-based positive electrodes and one or more carbon-lead-based negative electrodes. The device further comprises separators between the cells, an acid electrolyte (e.g., aqueous sulfuric acid), and a casing to contain the device.

In some embodiments of the hybrid lead-carbon-acid energy storage device, each carbon-based negative electrode comprises a highly conductive current collector; a carbon-lead blend adhered to and in electrical contact with at least one surface of the current collector, and a tab element extending above the top edge of the negative or positive electrode. For example, each carbon-lead-based positive electrode may comprise a lead-based current collector and a lead dioxide-based active material paste adhered to, and in electrical contact with, the surfaces thereof, and a tab element extending above the top edge of the positive electrode. The lead dioxide based active material comprises any of the disclosed blends. The lead or lead oxide in the blend serves as the energy storing active material for the cathode.

In other embodiments of the hybrid lead-carbon-acid energy storage device, the front and back surfaces of a lead-based current collector each comprise a matrix of raised and lowered portions with respect to the mean plane of the lead-based current collector, and further comprises slots formed between the raised and lowered portions thereof. In this embodiment, the aggregate thickness of the lead-based current collector is greater than the thickness of the lead-based material forming the current collector.

A negative electrode may comprise a conductive current collector; a carbon-lead blend; and a tab element extending from a side, for example from above a top edge, of the negative electrode. Negative electrode tab elements may be electrically secured to one another by a cast-on strap, which may comprise a connector structure. The active material may be in the form of a sheet that is adhered to, and in electrical contact, with the current collector matrix. In order for the blend to be adhered to and in electrical contact with the current collector matrix, the blend may be mixed with a suitable binder substance such as PTFE or ultra high molecular weight polyethylene (e.g., having a molecular weight numbering in the millions, usually between about 2 and about 6 million). In some embodiments, the binder material does not exhibit thermoplastic properties or exhibits minimal thermoplastic properties.

In certain embodiments, each battery cell comprises four positive electrodes which are lead-based and comprise lead dioxide active material. Each positive electrode comprises a highly conductive current collector comprising porous carbon material (e.g., a carbon-lead blend) adhered to each face thereof and lead dioxide contained within the carbon. Also, in this embodiment, the battery cell comprises three negative electrodes, each of which comprises a highly conductive current collector comprising porous carbon material adhered to each face thereof where this porous carbon material comprises lead within the carbon.

In other embodiments, each cell comprises a plurality of positive electrodes and a plurality of negative electrodes that are placed in alternating order. Between each adjacent pair of positive electrodes and the negative electrodes, there is placed a separator. Each of the positive electrodes is constructed so as to have a tab extending above the top edge of each respective electrode; and each of the negative electrodes has a tab extending above the top edge of each of the respective negative electrodes. In certain variations, the separators are made from a suitable separator material that is intended for use with an acid electrolyte, and that the separators may be made from a woven material such as a non-woven or felted material, or a combination thereof. In other embodiments, the material of the current collector is sheet lead, which may be cast or rolled and punched or machined.

Each cell may comprise alternating positive and negative plates, and an electrolyte may be disposed in a volume between the positive and negative plates. Additionally, the electrolyte can occupy some or all of the pore space in the materials included in the positive and negative plates. In one embodiment, the electrolyte includes an aqueous electrolytic solution within which the positive and negative plates may be immersed. The electrolytic solution composition may be chosen to correspond with a particular battery chemistry. In lead acid batteries, for example, the electrolyte may include a solution of sulfuric acid and distilled water. Other acids, however, may be used to form the electrolytic solutions of the disclosed batteries.

In another embodiment, the electrolyte may include a silica gel. This silica gel electrolyte can be added to the battery such that the gel at least partially fills a volume between the positive and negative plate or plates of cell.

In some other variations, the positive and negative plates of each cell may include a current collector packed or coated with a chemically active material. Chemical reactions in the active material disposed on the current collectors of the battery enable storage and release of electrical energy. The composition of this active material, and not the current collector material, determines whether a particular current collector functions either as a positive or a negative plate.

The composition of the chemically active material also depends on the chemistry of the device. For example, lead acid batteries may include a chemically active material comprising, for example, an oxide or salt of lead. In certain embodiments, the chemically active material may comprise lead dioxide ($PbO_2$). The chemically active material may also comprise various additives including, for example, varying percentages of free lead, structural fibers, conductive materials, carbon, and extenders to accommodate volume changes over the life of the battery. In certain embodiments, the constituents of the chemically active material for lead acid batteries may be mixed with sulfuric acid and water to form a paste, slurry, or any other type of coating material.

The chemically active material in the form of a paste or a slurry, for example, may be applied to the current collectors of the positive and negative plates. The chemically active material may be applied to the current collectors by dipping, painting, or via any other suitable coating technique.

In certain embodiments, the positive and negative plates of a battery are formed by first depositing the chemically active material on the corresponding current collectors to make the plates. While not necessary in all applications, in certain embodiments, the chemically active material deposited on current collectors may be subjected to curing and/or drying processes. For example, a curing process may include exposing the chemically active materials to elevated temperature and/or humidity to encourage a change in the chemical and/or physical properties of the chemically active material.

After assembling the positive and negative plates to form cells, the battery may be subjected to a charging (i.e., formation) process. During this charging process, the composition of the chemically active materials may change to a state that provides an electrochemical potential between the positive and negative plates of the cells. For example, in a lead acid battery, the PbO active material of the positive plate may be electrically driven to lead dioxide ($PbO_2$), and the active material of the negative plate may be converted to sponge lead. Conversely, during subsequent discharge of a lead acid battery, the chemically active materials of both the positive and negative plates convert toward lead sulfate.

The blends of the presently disclosed embodiments include a network of pores, which can provide a large amount of surface area for each current collector. For example, in certain embodiments of the above described devices the carbon particles are mesoporous, and in other embodiments the carbon particles are microporous. Current collectors comprising the blends may exhibit more than 2000 times the amount of surface area provided by conventional current collectors. Further, a carbon layer may be fabricated to exhibit any combination of physical properties described above.

The substrate (i.e., support) for the active material may include several different material and physical configurations. For example, in certain embodiments, the substrate may comprise an electrically conductive material, glass, or a polymer. In certain embodiments, the substrate may comprise lead or polycarbonate. The substrate may be formed as a single sheet of material. Alternatively, the substrate may comprise an open structure, such as a grid pattern having cross members and struts.

The substrate may also comprise a tab for establishing an electrical connection to a current collector. Alternatively, especially in embodiments where substrate includes a polymer or material with low electrical conductivity, a carbon layer may be configured to include a tab of material for establishing an electrical connection with a current collector. In such an embodiment, the carbon used to form a tab and the carbon layer may be infused with a metal such as lead, silver, or any other suitable metal for aiding in or providing good mechanical and electrical contact to the carbon layer.

The blends may be physically attached to the substrate such that the substrate can provide support for the blend. In one embodiment, the blend may be laminated to the substrate. For example, the blend and substrate may be subjected to any suitable laminating process, which may comprise the application of heat and/or pressure, such that the blend becomes physically attached to the substrate. In certain embodiments, heat and/or pressure sensitive laminating films or adhesives may be used to aid in the lamination process.

In other embodiments, the blend may be physically attached to the substrate via a system of mechanical fasteners. This system of fasteners may comprise any suitable type of fasteners capable of fastening a carbon layer to a support. For example, a blend may be joined to a support using staples, wire or plastic loop fasteners, rivets, swaged fasteners, screws, etc. Alternatively, a blend can be sewn to a support using wire thread, or other types of thread. In some of the embodiments, the blend may further comprise a binder (e.g., Teflon and the like) to facilitate attachment of the blend to the substrate.

In addition to the two-layered current collector (i.e., blend plus substrate) described above, the presently disclosed embodiments include other types of current collectors in combination with the two-layered current collector. For example, current collectors suitable for use with the presently disclosed embodiments may be formed substantially from carbon alone. That is, a carbon current collector consistent with this embodiment would lack a support backing. The carbon current collector may, however, comprise other materials, such as, metals deposited on a portion of the carbon surface to aid in establishing electrical contact with the carbon current collector.

Other current collectors may be formed substantially from an electrically conductive material, such as lead. The current collector may be made from lead and may be formed to include a grid pattern of cross members and struts. In one embodiment, the current collector may include a radial grid pattern such that struts intersect cross members at an angle. Current collector may also include a tab useful for establishing electrical contact to the current collector.

In one embodiment, the current collector may be made from lead and may be formed to include a hexagonal grid pattern. Specifically, the structural elements of the current collector may be configured to form a plurality of hexagonally shaped interstices in a hexagonally close packed arrangement. The current collector may also include a tab useful for establishing electrical contact to the current collector.

Consistent with the present disclosure, cells may be configured to include several different current collector arrangements. In one embodiment, one or more negative plates of a cell may comprise a current collector having a carbon layer disposed on a substrate. In this embodiment, one or more positive plates of a cell may include a carbon current collector (e.g., a carbon layer not including a substrate) or a lead grid current collector (e.g., a lead grid collector not including a layer of carbon).

In another embodiment, one or more positive plates of a cell may include a current collector comprising a carbon layer deposited on a substrate. In this embodiment, one or more negative plates of a cell may include a carbon current collector (e.g., a carbon collector not including a substrate) or a lead grid current collector (e.g., a lead grid collector not including a layer of carbon).

In yet another embodiment, both one or more negative plates and one or more positive plates may include a current collector comprising a carbon layer deposited on a substrate. Thus, in this embodiment, the two-layered current collector may be incorporated into both the positive and the negative electrode plates.

By incorporating the blends into the positive and/or negative plates of a battery, corrosion of the current collectors may be suppressed. As a result, batteries consistent with the present disclosure may offer significantly longer service lives. Additionally, the disclosed carbon current collectors may be pliable, and therefore, they may be less susceptible to damage from vibration or shock as compared to current collectors made from graphite plates or other brittle materials. Batteries including carbon current collectors may perform well in vehicular applications, or other applications, where vibration and shock are common.

In another embodiment, the blend for use in the novel carbon lead energy storage device may also comprise certain metal and metal oxide additives that enhance electrochemical performance. To this end, the cathode paste comprising lead and lead oxides can be mixed intimately with activated carbon particles. Minor additions of certain other elements such as tin, antimony, bismuth, arsenic, tungsten, silver, zinc, cadmium, indium, silicon, oxides thereof, compounds comprising the same or combinations thereof offer the potential to increase the chemical energy storage efficiency of the positive active material. Some of these metal elements and their oxides act to replicate the lead dioxide crystal structure and provide additional nucleation sites for the charge discharge processes as well as an additional conductive network within the lead dioxide active material. These materials can be located within the pores of the activated carbon and on the carbon surface before the lead paste is applied. These metals can act as conductivity aids for the lead dioxide positive active material as well as increasing the efficiency of the lead dioxide active material through this increased conductivity network within the cathode. In certain embodiments, impurities such as arsenic, cobalt, nickel, iron, chromium and tellurium are minimized in the carbon and the electrode because they increase oxygen evolution on the cathode during the charge cycle.

In other embodiments, the blend does not contain significant quantities of metallic impurities such as sodium, potassium and especially calcium, magnesium, barium, strontium, chromium, nickel, iron and other metals, which form highly insoluble sulfate salts. These impurities will precipitate inside the pores of the carbon material and effectively impede its effectiveness. Sodium and potassium will neutralize an equi-molar amount of hydrogen ions and render them ineffective.

In another embodiment of the disclosure, the carbon particles in the blend for use in the hybrid carbon lead energy storage device may be structured with a predominance of mesopores, that is pores from 2 nm to 50 nm in size, that when mixed into the positive or negative electrodes will enhance the electrochemical performance. To this end, the cathode paste comprising lead and lead oxides can be mixed intimately with activated carbon particles and the anode paste comprising lead can be mixed intimately with activated carbon particles. These mesoporous carbons offer the ability to promote fluid electrolyte to fully penetrate the active material within the electrode. By increasing the fluid penetration within the electrode structure, the diffusion distances between the electrolyte ions (e.g., sulfate) and the active material is reduced and the chemical charge and discharge process can proceed more efficiently. In addition, the activated carbon used in this embodiment may also comprise a number of micropores less than 2 nm in size in conjunction with the mesopores.

The blends can be integrated into ultracapacitor test cells. The activated carbons, such as activated carbon cryogels, are milled to an average particle size of about 10 microns using a jetmill operating in a nitrogen atmosphere. This fine particle size enhances particle-to-particle conductivity, as well as enabling the production of very thin sheet electrodes. The jetmill essentially grinds the carbon against itself by spinning it inside a disc shaped chamber propelled by high-pressure nitrogen. As the larger particles are fed in, the centrifugal force pushes them to the outside of the chamber; as they grind against each other, the particles migrate towards the center where they eventually exit the grinding chamber once they have reached the appropriate dimensions.

The capacitance and power output are measured using cyclic voltammetry (CV), chronopotentiometry (CP) and impedance spectroscopy at various voltages (ranging from 1.0-2.5 V maximum voltage) and current levels (from 1-10 mA) on a Biologic electrochemical workstation. The capacitance is calculated from the discharge curve of the potentiogram using the formula:

$$C = i/s \quad \text{Equation 1}$$

where i is the current (A) and s=V/t is the voltage rate in V/s. Since the test capacitor is a symmetric carbon-carbon (C—C) electrode, the specific capacitance is determined from:

$$C_s = 2C/m_e \quad \text{Equation 2}$$

where $m_e$ is the surface area of a single electrode. The specific energy and power is determined using:

$$E_s = \frac{1}{4} \frac{CV_{max}^2}{m_e} \quad \text{Equation 3}$$

$$P_s = E_s/4ESR \quad \text{Equation 4}$$

where C is the measured capacitance $V_{max}$ is the maximum test voltage and ESR is the equivalent series resistance obtained from the voltage drop at the beginning of the discharge.

The present disclosure also provides an electrode comprising the disclosed blends, for example for use in an electrical energy storage and distribution device. In some embodiments, the electrode comprises a binder and any of the blends described herein. In other embodiments, the electrode comprises from 0.1%-20% by weight of the binder. For example, in some embodiments the binder is polytetrafluoroethylene.

In still other embodiments, the electrode further comprises a current collector. For example, in some embodiments the current collector comprises lead, and in other embodiments the current collector is in the form of a grid or plate.

In yet more embodiments, the electrode further comprises an electrolyte, for example sulfuric acid. In other embodiments, the electrode further comprises an expander.

The present inventions also includes use of a device comprising the disclosed carbon-lead blends for storage and distribution of electrical energy. For example, in some embodiments the device is a battery. In other embodiments, the device is in microhybrid, start-stop hybrid, mild-hybrid vehicle, vehicle with electric turbocharging, vehicle with regenerative braking, hybrid vehicle, an electric vehicle, industrial motive power such as forklifts, electric bikes, golf carts, aerospace applications, a power storage and distribution grid, a solar or wind power system, a power backup system such as emergency backup for portable military backup, hospitals or military infrastructure, and manufacturing backup or a cellular tower power system.

The following Examples are offered by way of illustration and not by way of limitation.

EXAMPLES

The polymer gels, cryogels, pyrolyzed cryogels and carbon materials disclosed in the following Examples were prepared according to the methods disclosed herein and as described in co-pending U.S. application Ser. Nos. 12/748,219; 12/897,969; 12/829,282; 13/046,572; 12/965,709; 13/336,975; and 61/585,611, each of which are hereby incorporated by reference in their entireties. Chemicals were obtained from commercial sources at reagent grade purity or better and were used as received from the supplier without further purification.

Unless indicated otherwise, the following conditions were generally employed for preparation of the carbon materials and precursors. Phenolic compound and aldehyde were reacted in the presence of a catalyst in a binary solvent system (e.g., water and acetic acid). The molar ratio of phenolic compound to aldehyde was typically 0.5 to 1. The reaction was allowed to incubate in a sealed container at temperatures of up to 85 C for up to 24 h. The resulting polymer hydrogel contained water, but no organic solvent;

and was not subjected to solvent exchange of water for an organic solvent, such as t-butanol. The polymer hydrogel monolith was then physically disrupted, for example by grinding, to form polymer hydrogel particles having an average diameter of less than about 5 mm. Unless stated otherwise, the particles were then rapidly frozen, generally by immersion in a cold fluid (e.g., liquid nitrogen or ethanol/dry ice) and lyophilized. Generally, the lyophilizer shelf was pre-cooled to −30° C. before loading a tray containing the frozen polymer hydrogel particles on the lyophilizer shelf. The chamber pressure for lyophilization was typically in the range of 50 to 1000 mTorr and the shelf temperature was in the range of +10 to +25° C. Alternatively, the shelf temperature can be set lower, for example in the range of 0 to +10° C. Alternatively, the shelf temperature can be set higher, for example in the range of 25 to +100° C. Chamber pressure can be held in the range of 50 to 3000 mTorr. For instance, the chamber pressure can be controlled in the range of 150 to 300 mTorr.

The dried polymer hydrogel was typically pyrolyzed by heating in a nitrogen atmosphere at temperatures ranging from 550-1200° C. for a period of time as specified in the examples. Activation conditions generally comprised heating a pyrolyzed polymer hydrogel in a $CO_2$ atmosphere at temperatures ranging from 900-1000° C. for a period of time as specified in the examples. Specific pyrolysis and activation conditions were as described in the following examples.

In certain embodiments, impregnation of the carbon particles with lead was accomplished by including a source of lead in the polymerization reaction or contacting the carbon particles, or precursors of the same (e.g., polymer hydrogel, dried polymer hydrogel, pyrolyzed polymer gel, etc.), with a source of lead as described more fully above and exemplified below.

Example 1

Preparation of Dried Polymer Gel

A polymer gel was prepared by polymerization of resorcinol and formaldehyde (0.5:1) in water and acetic acid (75:25) and ammonium acetate (RC=25, unless otherwise stated). The reaction mixture was placed at elevated temperature (incubation at 45° C. for about 6 h followed by incubation at 85° C. for about 24 h) to allow for gellation to create a polymer gel. Polymer gel particles were created from the polymer gel and passed through a 4750 micron mesh sieve. The sieved particles were frozen by immersion in liquid nitrogen, loaded into a lyophilization tray at a loading of 3 to 7 g/in$^2$, and lyophilized. The time to dry (as inferred from time for product to reach within 2° C. of shelf temperature) varied with product loading on the lyophilizer shelf.

The surface area of the dried polymer gel was examined by nitrogen surface analysis using a Micrometrics Surface Area and Porosity Analyzer (model TriStar II). The measured specific surface area using the BET approach was in the range of about 500 to 700 m$^2$/g.

Additional methodologies for preparation of dried polymer gel can be found in the art. These additional methodologies include, but are not limited to, spray drying, air drying, freeze drying using shelf or snap freezing, and freeze drying under conditions to obtain dried polymer gel with about 200 to 500 m2/g specific surface area.

Example 2

Preparation of Pyrolyzed Carbon Material from Dried Polymer Gel

Dried polymer gel prepared according to Example 2 was pyrolyzed by passage through a rotary kiln at 850° C. with a nitrogen gas flow of 200 L/h. The weight loss upon pyrolysis was about 52%-54%.

The surface area of the pyrolyzed dried polymer gel was examined by nitrogen surface analysis using a surface area and porosity analyzer. The measured specific surface area using the standard BET approach was in the range of about 600 to 700 m$^2$/g.

Additional methodologies for preparation of pyrolyzed carbon can be found in the art. These additional methodologies can be employed to obtain pyrolzyed carbon with about 100 to 600 m2/g specific surface area.

Example 3

Production of Activated Carbon

The pyrolyzed carbon as described in Example 2 was activated in a rotary kiln (alumina tube with 2.75 in inner diameter) at 900° C. under a $CO_2$ flow rate of 30 L/min, resulting in a total weight of about 37%. Subsequently, this material was further activated at 900° C. in batchwise fashion in a silica tube (3.75 inch inner diameter) with 15 L/min $CO_2$ flow rate, to achieve a final weight loss (compared to the starting pyrolyzed carbon) of about 42 to 44%.

The surface area of the dried gel was examined by nitrogen surface analysis using a surface area and porosity analyzer. The measured specific surface area using the BET approach was in the range of about 1600 to 2000 m$^2$/g.

Additional methodologies for preparation of activated carbon can be found in the art. These additional methodologies can be employed to obtain dried polymer gel with about 100 to 600 m2/g specific surface area.

Example 4

Micronization of Activated Carbon Via Jet Milling

The activated ultrapure carbon from Example 3 was jet milled using a 2 inch diameter jet mill. The conditions were about 0.7 lbs of ultrapure activated carbon per hour, nitrogen gas flow about 20 scf per min and about 100 psi pressure. The average particle size after jet milling was about 8 to 10 microns.

Additional methodologies for preparation of micronized particles of activated carbon can be found in the art. These additional methodologies can be employed to obtain micronized particles with mon- or polydisperse particle size distributions. These additional methodologies can be employed to obtain micronized particles with average size of about 1 to 8 microns. These additional methodologies can be employed to obtain micronized particles with average size of greater than 8 microns.

Example 5

Purity Analysis of Activated Carbon & Comparison Carbons

Activated carbon samples prepared according to Example 4 were examined for their impurity content via proton induced x-ray emission (PIXE). PIXE is an industry-standard, highly sensitive and accurate measurement for simultaneous elemental analysis by excitation of the atoms in a sample to produce characteristic X-rays which are detected and their intensities identified and quantified. PIXE is capable of detection of all elements with atomic numbers ranging from 11 to 92 (i.e., from sodium to uranium).

The PIXE impurity (Imp.) data for activated carbons as disclosed herein as well as other activated carbons for comparison purposes is presented in Table 1. Sample 1, 3, 4 and 5 are activated carbons prepared according to Example 3, Sample 2 is a micronized activated carbon prepared according to Example 4, Samples 6 and 7 are commercially available activated carbon samples).

As seen in Table 1, the synthetic activated carbons according to the instant disclosure have a lower PIXE impurity content and lower ash content as compared to other known activated carbon samples.

mately 182 mg of carbon black is weighed out and added to the solution above. This is stirred 25 minutes followed by sonication for 20 minutes. Finally, approximately 790 mg of the activated carbon of interest (e.g., prepared according to the examples herein) is added to the solution while stirring, then allowed to stir for another 25 minutes followed by sonication for another 20 minutes. At this point the slurry is complete.

Example 8

Preparation of Carbon Slurry Electrodes

The slurry from Example 10 is spread onto an aluminum foil current collector (3"×6"×30 micron) using a doctor blade and a vacuum-coater apparatus. The wet as-coated electrodes are placed in an oven set to 85° C. and allowed to dry for 8-12 hours. The dried carbon coated sheets are

TABLE 1

Purity Analysis of Activated Carbon & Comparison Carbons

| | Impurity Concentration (PPM) | | | | | | |
|---|---|---|---|---|---|---|---|
| Impurity | Sample 1 | Sample 2 | Sample 3 | Sample 4 | Sample 5 | Sample 6 | Sample 7 |
| Na | ND* | ND | ND | ND | ND | 353.100 | ND |
| Mg | ND | ND | ND | ND | ND | 139.000 | ND |
| Al | ND | ND | ND | ND | ND | 63.850 | 38.941 |
| Si | 53.840 | 92.346 | 25.892 | 17.939 | 23.602 | 34.670 | 513.517 |
| P | ND | ND | ND | ND | ND | ND | 59.852 |
| S | ND | ND | ND | ND | ND | 90.110 | 113.504 |
| Cl | ND | ND | ND | ND | ND | 28.230 | 9.126 |
| K | ND | ND | ND | ND | ND | 44.210 | 76.953 |
| Ca | 21.090 | 16.971 | 6.141 | 9.299 | 5.504 | ND | 119.804 |
| Cr | ND | ND | ND | ND | ND | 4.310 | 3.744 |
| Mn | ND | ND | ND | ND | ND | ND | 7.552 |
| Fe | 7.582 | 5.360 | 1.898 | 2.642 | 1.392 | 3.115 | 59.212 |
| Ni | 4.011 | 3.389 | 0.565 | ND | ND | 36.620 | 2.831 |
| Cu | 16.270 | 15.951 | ND | ND | ND | 7.927 | 17.011 |
| Zn | 1.397 | 0.680 | 1.180 | 1.130 | 0.942 | ND | 2.151 |
| Total | 104.190 | 134.697 | 35.676 | 31.010 | 31.44 | 805.142 | 1024.198 |
| (% Ash) | (0.018) | (0.025) | (<0.007) | (0.006) | (0.006) | (0.13) | (0.16) |

*ND = not detected by PIXE analysis

Example 6

Preparation of a Dry Carbon Negative Electrode 200 mg of activated (BET specific surface area=2380 m$^2$/g) carbon prepared as described above was weighed out followed by 6 mg of Teflon tape. These were combined in an agate mortar and pestel and hand ground together until a homogenous sheet was obtained. This sheet was continually folded (~5 times) and rolled flat to a thickness of ~50 micron. A ⅝" diameter punch was used to punch out a circular disc electrode from this material.

The surface area of the rolled electrode material was examined by nitrogen surface analysis using a Micromeritics Surface Area and Porosity Analyzer (model TriStar II). The measured specific surface area using the BET approach was 2117 m$^2$/g.

Example 7

Preparation of Carbon Slurry 9 mg of poly(vinyldiene fluoride) is weighed out and dissolved in 20 mL of 1-methyl-2-pyrrolidinone. Approxiplaced in a furnace and heated to 195° C. for 90 minutes under vacuum. The sheets are removed and ⅝" diameter electrode discs are punched out of the sheet. The electrodes are weighed and two of similar masses are assembled into a stainless steel coin cell as the anode and cathode. DKK cellulose paper is used as the separator material and 37 wt % sulfuric acid is used as the electrolyte.

Example 9

Electrochemical Measurement of Carbon Capacitance

Figure 2:
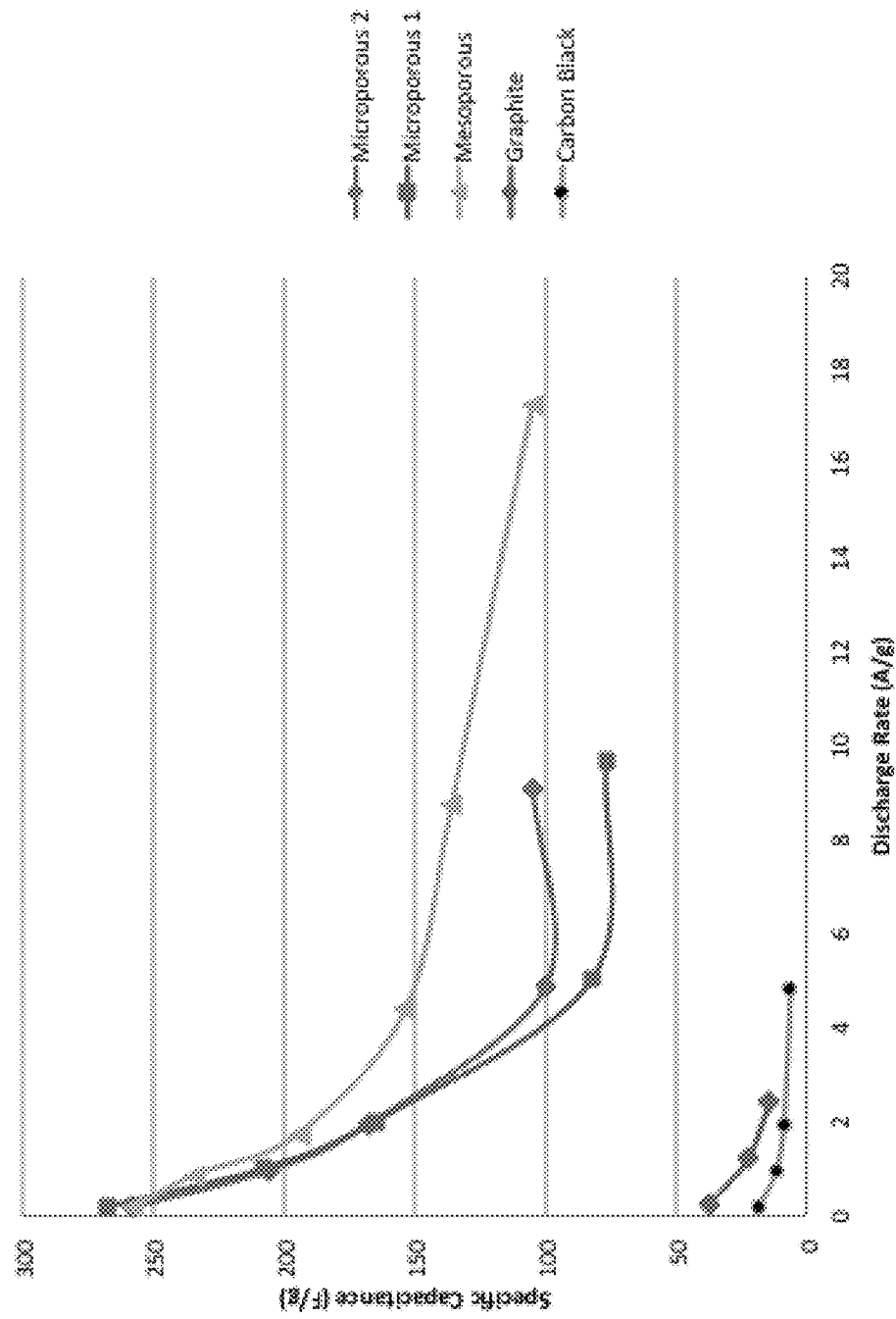
FIG. 2 presents carbon capacitance of different carbon samples.

The assembled coin-cells from Example 11 are connected to a potentiostat as a two electrode system. The coin cell is first held at open circuit for 15 minutes. The cell is then charged at constant current (10 mA) until a potential of 0.9V (vs. SCE) is reached. This is held at constant voltage for two minutes before being discharged at a constant current of −1 mA until a potential of 0.1V (vs. SCE) is reached. The process is repeated with discharge currents of −5 mA, −10 mA, −25 mA, −50 mA, and finally −100 mA. Capacitance data for various carbon samples is presented in FIG. 2. The data is interpreted as F/g vs. A/g.

Example 10

Ultrapure Carbon Used as Electrode Material in an Electric Double Layer Capacitor Device The ultrapure activated carbon was used as an electrode material for an electric double later capacitor device. Capacitor electrodes comprised 99 parts by weight carbon particles (average particle size 5-15 microns) and 1 part by weight Teflon. The carbon and Teflon were masticated in a mortar and pestle until the Teflon was well distributed and the composite had some physical integrity. After mixing, the composite was rolled out into a flat sheet, approximately 50 microns thick. Electrode disks, approximately 1.59 cm in diameter, were punched out of the sheet. The electrodes were placed in a vacuum oven attached to a dry box and heated for 12 hours at 195 C. This removed water adsorbed from the atmosphere during electrode preparation. After drying, the electrodes were allowed to cool to room temperature, the atmosphere in the oven was filled with argon and the electrodes were moved into the dry box where the capacitors were made.

A carbon electrode was placed into a cavity formed by a 1 inch (2.54 cm) diameter carbon-coated aluminum foil disk and a 50 micron thick polyethylene gasket ring which had been heat sealed to the aluminum. A second electrode was then prepared in the same way. Two drops of electrolyte consisting of 1.8M tetraethylene ammonium tetrafluoroborate in acetonitrile were added to each electrode. Each electrode was covered with a 0.825 inch diameter porous polypropylene separator. The two electrode halves were sandwiched together with the separators facing each other and the entire structure was hot pressed together.

Example 11

Ultrapure Carbon Used as Electrode Material in an Electric Double Layer Capacitor Device The device described in Example 13 was subjected to electrical testing with a potentiostat/function generator/frequency response analyzer. Capacitance was measured by a constant current discharge method, consisting of applying a current pulse for a known duration and measuring the resulting voltage profile over time. By choosing a given time and ending voltage, the capacitance was calculated from the following $C = It/\Delta V$, where C=capacitance, I=current, t=time to reached the desired voltage and $\Delta V$=the voltage difference between the initial and final voltages. The specific capacitance based on the weight and volume of the two carbon electrodes was obtained by dividing the capacitance by the weight and volume respectively. This data is reported in Table 2 below for discharge between 2.7 and 1.89V.

TABLE 2

Summary of Capacitance Performance Parameters

| Capacitance Performance Parameters | Measured Value |
|---|---|
| Gravimetric Power* | 13.1 W/g |
| Volumetric Power* | 8.7 W/cc |
| Gravimetric Energy* | 4.8 Wh/kg |
| Volumetric Energy* | 3.2 Wh/liter |
| Gravimetric Capacitance @ RC = 5** | 22 F/g |
| Volumetric Capacitance @ RC = 5** | 15 F/cc |

TABLE 2-continued

Summary of Capacitance Performance Parameters

| Capacitance Performance Parameters | Measured Value |
|---|---|
| Gravimetric Capacitance @ RC = 20‡ | 27 F/g |
| Volumetric Capacitance @ RC = 20‡ | 18 F/cc |

*By constant current discharge from 2.7 to 1.89 volts with TEATFB in AN, 0.5 second time constant.
**By constant current discharge from 2.7 to 0.1 V, 5-second time constant.
‡By constant current discharge from 2.7 to 0.1 V, 20-second time constant.

Example 12

Electrochemical Performance of Electric Double Layer Capacitor Device with Ultrapure Carbon Activated to a Higher Weight Loss Used as Electrode Material The ultrapure activated carbon was used as an electrode material for an electric double later capacitor device. For this specific example, the carbon was activated for a longer time, corresponding into about a 10% additional weight loss and an increase in surface area by 27%. The electrode fabrication and electrochemical testing parameters are similar to those described above for Example 14 and 13. The data (Table 3) revealed a significantly increased gravimetric and volumetric power and energy.

TABLE 3

Summary of capacitance performance parameters

| Capacitance Performance Parameters | Measured Value |
|---|---|
| Gravimetric Power* | 24.4 W/g |
| Volumetric Power* | 14.2 W/cc |
| Gravimetric Energy* | 8.8 Wh/kg |
| Volumetric Energy* | 4.0 Wh/liter |
| Gravimetric Capacitance @ RC = 5** | 20 F/g |
| Volumetric Capacitance @ RC = 5** | 12 F/cc |
| Gravimetric Capacitance @ RC = 20‡ | 25 F/g |
| Volumetric Capacitance @ RC = 20‡ | 14 F/cc |

*By constant current discharge from 2.7 to 1.89 volts with TEATFB in AN, 0.5 second time constant.
**By constant current discharge from 2.7 to 0.1 V, 5-second time constant.
‡By constant current discharge from 2.7 to 0.1 V, 20-second time constant.

Example 13

Electrochemical Performance of Electric Double Layer Capacitor Device with Ultrapure Carbon Blended from Different Milling Fractions Loss Used as Electrode Material The ultrapure activated carbon was used as an electrode material for an electric double later capacitor device. For this specific example, the final carbon product was a result of adding the milled material that was collected in the usual procedure in the product collection jar with material that did not deposit into the jar (but instead was collected in a bag upstream from the collection jar. In this case, the specific ratio of blending was about 3:1 (w:w) for milled carbon collected from the collection jar to milled carbon collected in the bag upstream from the collection jar. The electrode fabrication and electrochemical testing parameters are similar to those described above for Example 14 and 13. The data (Table 4) revealed a significantly increased gravimetric and volumetric power and energy.

TABLE 4

Summary of capacitance performance parameters.

| Capacitance Performance Parameters | Measured Value |
|---|---|
| Gravimetric Power* | 28.8 W/g |
| Volumetric Power* | 14.4 W/cc |
| Gravimetric Energy* | 7.4 Wh/kg |
| Volumetric Energy* | 3.7 Wh/liter |
| Gravimetric Capacitance @ RC = 5** | 28 F/g |
| Volumetric Capacitance @ RC = 5** | 14 F/cc |
| Gravimetric Capacitance @ RC = 20‡ | 29 F/g |
| Volumetric Capacitance @ RC = 20‡ | 14 F/cc |

*By constant current discharge from 2.7 to 1.89 volts with TEATFB in AN, 0.5 second time constant.
**By constant current discharge from 2.7 to 0.1 V, 5-second time constant.
‡By constant current discharge from 2.7 to 0.1 V, 20-second time constant.

Example 14

Device with Lead Acid Electrode and Carbon-Containing Electrode

An energy storage device is constructed from a lead acid cathode and a carbon and lead containing anode. The latter is prepared from a carbon-lead blend as disclosed herein and lead paste.

In this embodiment, the anode paste comprising lead and lead oxides is mixed intimately with the carbon-lead blend. It is important that carbon is not exposed directly to the electrolyte in order to minimize oxygen evolution on carbon and subsequent carbon dioxide formation during discharge which will lead to carbon loss and anode performance decay. For this reason, it is important that the carbon be located deep in the anode paste, preferably in the back half and better in the rear 25% of the anode. Minor additions of certain metals such as tin, titanium, zirconium, tantalum and niobium, alloys and oxides thereof are poor electrocatalysts for oxygen evolution and stable in strong acid environments. These materials can be located within the pores of the activated carbon and on the carbon surface before the lead paste is applied. It is important to exclude the presence of impurities such as arsenic, cobalt, nickel, iron, antimony and tellurium in the carbon and from the electrode in general because they increase hydrogen evolution on the anode during the charge cycle.

It is important that the activated carbon not contain metallic impurities such as sodium, potassium and especially calcium, magnesium, barium, strontium, iron and other metals, which form highly insoluble sulfate salts. These will precipitate inside the pores of the carbon and effectively impede its effectiveness. Sodium and potassium will neutralize an equi-molar amount of hydrogen ions and render them ineffective.

Carbon is more conductive than lead and will improve the performance of the electrode by reducing its overall resistance and creating a more uniform current distribution.

If highly pure carbon as described above is present in the anode paste as concentrations of 1 to 10%, cycle life will improve by a factor of 2-5 in deep discharge and float charge applications (50% state of charge). Current and energy efficiency will improve also.

Example 15

Device with all Electrodes Comprising Lead and Carbon

An energy storage device is constructed from two electrodes that both contain lead and carbon containing elements. The electrodes are prepared by contacting a carbon-lead blend as disclosed herein with lead paste.

In this embodiment, the cathode paste comprising lead dioxide is intimately mixed with activated carbon particles. It is important that carbon not be exposed directly to the electrolyte to limit hydrogen evolution on discharge. Additions of chromium, bismuth and tin to the carbon will limit the hydrogen discharge rate. Oxygen present in the electrolyte may also react at the cathode during the discharge cycle. The presence of arsenic, bismuth, nickel, antimony, selenium, tin and tellurium enhance oxygen reduction and should be avoided. Cobalt and chromium suppress oxygen reduction and can be added to the carbon before mixing in the cathode paste.

It is important that the activated carbon not contain metallic impurities such as sodium, potassium and especially calcium, magnesium, barium, strontium, iron and other metals, which form highly insoluble sulfate salts. These will precipitate inside the pores of the carbon and effectively impede its effectiveness. Sodium and potassium will neutralize an equi-molar amount of hydrogen ions and render them ineffective.

Carbon is more conductive than lead dioxide and will improve the performance of the electrode by reducing its overall resistance and creating a more uniform current distribution.

If highly pure carbon as described above is present in the anode paste as concentrations of 1 to 10%, cycle life will improve by a factor of 2-5 in deep discharge and float charge applications (50% state of charge). Current and energy efficiency will improve also.

Example 16

Impregnation of Activated Carbon with Lead

In certain embodiments, the blends comprise a plurality of carbon particles and a plurality of lead particles, and the carbon particles comprise lead impregnated within the pores of the carbon particle or on the surface of the carbon particle. Carbon particles in these embodiments can be prepared according to the following examples.

Saturated solutions of lead acetate, lead nitrate, lead carbonate and lead sulfate in 25:75 acetic acid:water (vol: vol) were prepared. Activated carbon (300 mg, microporous and mesoporous) samples prepared according to Example 4 were suspended in each lead salt solution and shaken overnight at room temperature. The liquid mixture was then centrifuged and the supernatant removed. The carbon pellet was washed three times with deionized water (5 mL) and dried overnight at 45° C. The lead content of the carbon samples thus prepared was analyzed by PIXE. The results are tabulated in Table 5 below.

TABLE 5

Lead Content of Various Activated Carbon Samples

| Sample | Activated Carbon Type | Lead Source | Lead Content |
|---|---|---|---|
| 8 | Microporous | Lead (II) acetate | 7.892% |
| 9 | Mesoporous | Lead (II) acetate | 6.526% |
| 10 | Microporous | Lead (II) nitrate | 0.294% |
| 11 | Mesoporous | Lead (II) nitrate | 2.427% |
| 12 | Microporous | Lead (II) carbonate | 1.855% |
| 13 | Mesoporous | Lead (II) carbonate | 1.169% |
| 14 | Microporous | Lead (II) sulfate | 84.060 ppm |
| 15 | Mesoporous | Lead (II) sulfate | 27.021 ppm |

Figure 3:
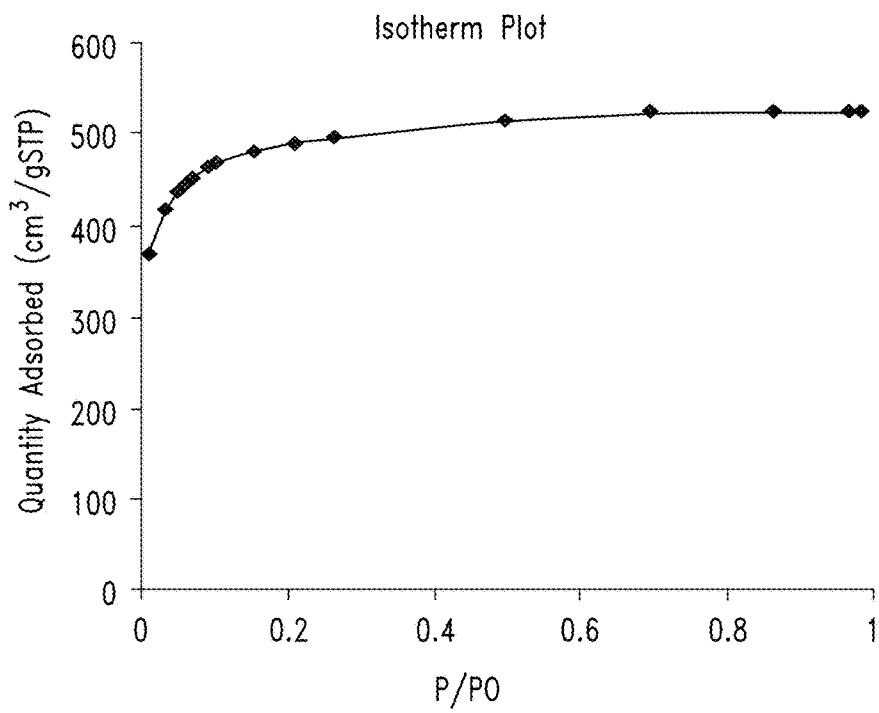
FIG. 3 shows a nitrogen sorption isotherm for microporous activated carbon.
Figure 4:
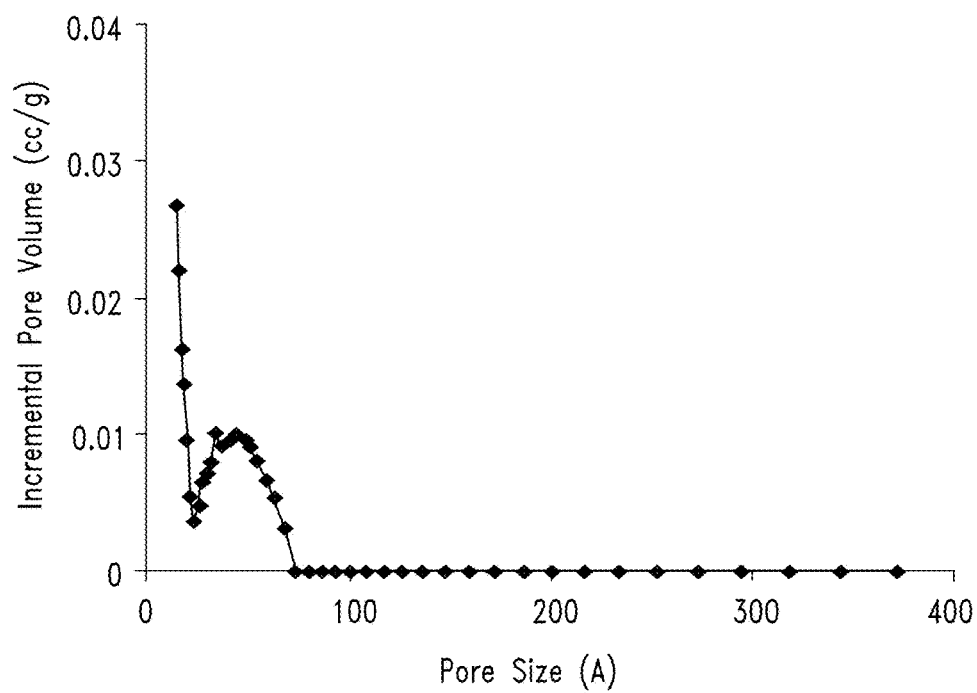
FIG. 4 presents a DFT pore volume distribution for microporous carbon.
Figure 5:
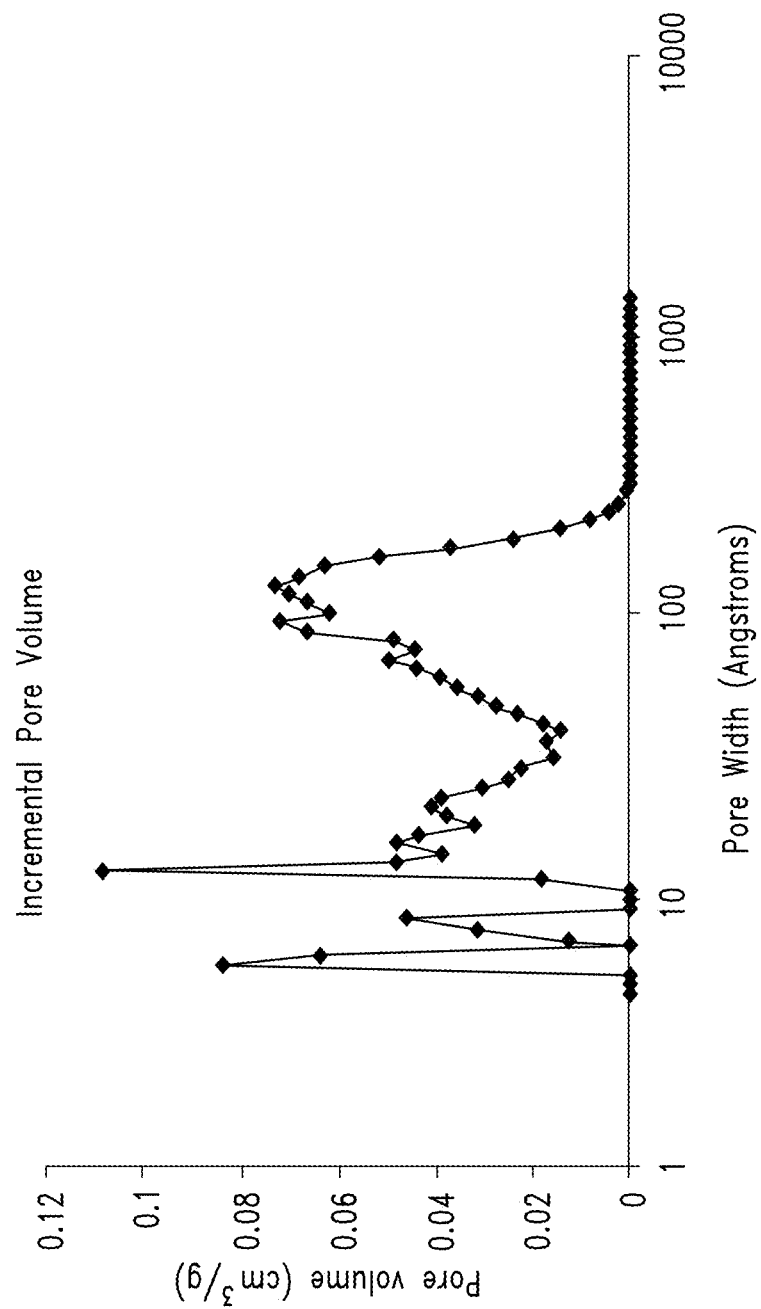
FIG. 5 depicts a DFT pore volume distribution for mesoporous activated carbon.

Both microporous and mesoporous activated carbons were studied. An example nitrogen sorption isotherm for microporous carbon is shown in FIG. 3. In this case, the total specific BET surface area was 1746 m²/g, and the total pore volume was 0.82 cc/g. From these data, the DFT pore distribution was determined as shown in FIG. 4. About 50% of the pore volume resides in pores of less than about 25 Å. About 50% of the pore surface area resides in pores of less than 17 Å. An example DFT pore distribution for mesoporous carbon is depicted in FIG. 5. In this case, the total specific BET surface area was 2471 m²/g, and the total pore volume was 2.05 cc/g. About 50% of the pore volume resides in pores of less than about 54 Å.

As can be seen from the data in Table 5, for highly soluble lead salts (such as lead acetate, lead nitrate and lead carbonate) it was possible to generate carbon materials with substantial levels of lead in the final material, in the range of 0.3 to 8%. In the case of lead sulfate, only ppm levels (<100) were achieved via the impregnation method. Best results were obtained for more highly soluble lead salt forms such as acetate (water solubility=45.6 parts per 100 parts). In the case of lead nitrate (soluble in water at 56 parts per 100 parts), a relatively high amount of lead was impregnated into the mesoporous carbon, but a much less efficient result was obtained for the microporous carbon.

Figure 6:
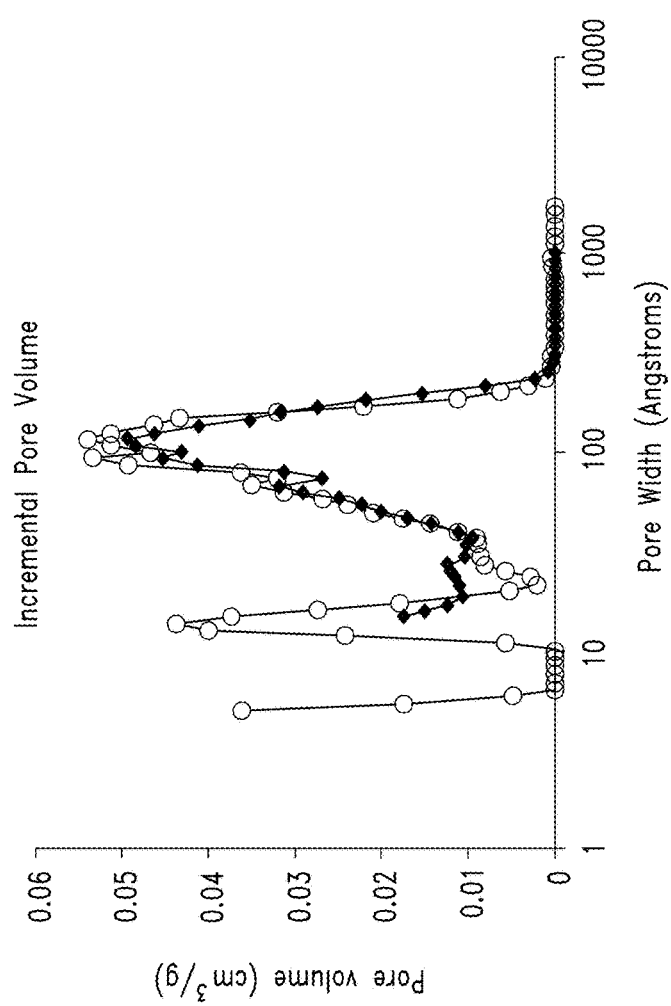
FIG. 6 shows the DFT pore volume distribution for mesoporous carbon before (open circles) and after (solid diamonds) impregnation with lead acetate.

The data in FIG. 6 depict the DFT pore volume data for mesoporous activated carbon before (open circles) and after (solid diamonds) impregnation with lead acetate. DFT parameters for this lead-impregnated carbon are given in Table 6. It can be seen that the mesoporous after lead (II) acetate) impregnation had a dramatically reduced micropore volume (and a relatively unchanged mesopore volume). The impregnation of lead into the micropores would be consistent with this observation.

TABLE 6

Data for Lead-Impregnated Mesoporous Carbon

| Sample | Total BET SSA (m²/g) | Total pore volume (cc/g) | DFT pore volume <20 Å (cc/g) | DFT pore volume >20 Å (cc/g) |
|---|---|---|---|---|
| 16 (Before lead (II) acetate impregnated) | 1751 | 1.48 | 0.50 | 0.78 |
| 17 (After lead (II) acetate impregnated) | 1057 | 1.11 | 0.26 | 0.77 |

Example 17

Impregnation of Pyrolyzed Polymer Gel with Lead

Pyrolyzed polymer gel (900 mg) prepared according to Example 2 was suspended in saturated lead acetate prepared according to Example 19. The liquid mixture was then shaken overnight at room temperature. The liquid mixture was then centrifuged and the supernatant removed. The carbon pellet was washed three times with deionized water (5 mL) and dried overnight at 45° C. The lead content of the carbon samples thus prepared was analyzed by PIXE. As can be seen in Table 7 below, the microporous pyrolyzed carbon provided more efficient impregnation of lead, i.e., 13.6%, whereas mesoporous carbon achieved about 1% lead content.

TABLE 7

Lead Content of Various Pyrolyzed Polymer Gel Samples

| Sample | Pyrolyzed Carbon Type | Lead Source | Lead Content |
|---|---|---|---|
| 18 | Mesoporous | Lead (II) acetate | 1.012% |
| 19 | Microporous | Lead (II) acetate | 13.631% |

Example 18

Impregnation of Dried Polymer Gel with Lead

Dried polymer gel (900 mg) prepared according to Example 1 was suspended in saturated lead acetate prepared according to Example 19. The liquid mixture was then shaken overnight at room temperature. The liquid mixture was then centrifuged and the supernatant removed. The polymer gel pellet was washed three times with deionized water (5 mL) and dried overnight at 45° C. The lead content of the polymer gel thus prepared was analyzed by PIXE.

Example 19

Incorporation of Lead During Polymerization of Polymer Gel

A resorcinol-formaldehyde gel mixture was prepared. The solids content was 41%, the resorcinol to catalyst ratio was 5:1, the catalyst was ammonium acetate, and the acetic acid content was 30%. About 20 mL of polymer solution was obtained (prior to placing solution at elevated temperature and generating the polymer gel). To this solution, about 5 mL of saturated lead (II) acetate in 25% acetic acid solution was added. The resulting final acetic acid content was thus about 29%, and the resulting final solids content was about 33%. The solution was then stored at 45° C. for about 5 h, followed by 24 h at 85° C. to fully induce the formation of a lead-containing polymer gel. This gel was disrupted to create particles, and the particles were frozen in liquid nitrogen and then dried in a lyophilizer as follows. The liquid-nitrogen frozen material was poured into a tray, and the tray was placed on a lyophilizer shelf pre-chilled to −30° C. The chamber pressure was then lowered to and maintained at 150 to 300 mTorr. The shelf temperature was ramped from −30° C. to +50° C. over an hour, and then held at 50° C. for about 8 hours. The dried polymer gel (Sample 20) was found to contain 7.008% lead by PIXE analysis.

Lead-containing activated carbon was then produced as follows. The resulting dried lead-containing polymer gel was pyrolyzed and activated by heating from room temperature to 850° C. under nitrogen gas at a ramp rate of 20° C. per min, followed by a hold for 4 hours at 850° C. under carbon dioxide, followed by cooling under nitrogen from 850° C. to ambient over several hours.

Example 20

Purity Analysis of Carbon Materials and Polymer Gels Comprising Lead

The lead impregnated carbon materials (Samples 8-15, 18 and 19) and lead impregnated polymer gel (Sample 20) were analyzed by PIXE to determine the lead and other elemental content. These data are tabulated in Table 8. Elements such as tantalum, chlorine and aluminum were not typically observed in the non-impregnated carbon materials or polymer gels, accordingly their presence in the impregnated samples is attributed to impurities in the lead source. Higher purity carbon materials and polymer gels can be prepared by using purified sources of lead.

chemical modifiers are incorporated into the carbons as described above. For example, electrochemical modifiers are incorporated during the polymerization stage, into the dried (or undried polymer gel) or after pyrolysis of the polymer gel. The mass of carbon material on each lead wire

TABLE 8

Purity Analysis of Carbon Materials & Polymer Gels Comprising Electrochemical modifiers

| | Element Concentration | | | | | | | | | | |
|---|---|---|---|---|---|---|---|---|---|---|---|
| Element | S. 8 | S. 9 | S. 10 | S. 11 | S. 12 | S. 13 | S. 14 | S. 15 | S. 18 | S. 19 | S. 20 |
| Pb (%)  | 7.892 | 6.526 | 0.294 | 2.427 | 1.855 | 1.169 | 0.0084 | 0.0027 | 1.012 | 13.631 | 7.008 |
| Fe (ppm) | 7 | 8 | 3 | ND | 7 | 3 | 6 | 2 | ND | ND | 6 |
| Cl (ppm) | 312 | 254 | 20 | 103 | 85 | 66 | ND | ND | 41 | ND | ND |
| Si (ppm) | 97 | 94 | 27 | ND | 43 | ND | 29 | ND | ND | ND | ND |
| Ni (ppm) | ND | ND | ND | ND | ND | ND | ND | ND | ND | ND | 5 |
| Ta (ppm) | 64 | 45 | ND | 15 | 18 | 10 | ND | ND | 7 | 107 | 56 |
| Al (ppm) | ND | 72 | ND | ND | 47 | ND | 38 | ND | ND | ND | ND |
| Ca (ppm) | ND | ND | 7 | ND | ND | 10 | 4 | 9 | ND | ND | ND |
| Co (ppm) | ND | ND | ND | ND | ND | ND | 12 | ND | ND | ND | ND |
| S (ppm) | ND | ND | ND | ND | ND | ND | 23 | 23 | ND | ND | ND |
| Cu (ppm) | ND | ND | ND | ND | ND | ND | 2 | 1 | ND | ND | ND |

*ND = not detected by PIXE analysis

Example 21

Preparation of a Mesoporous Carbon Material

Figure 7:
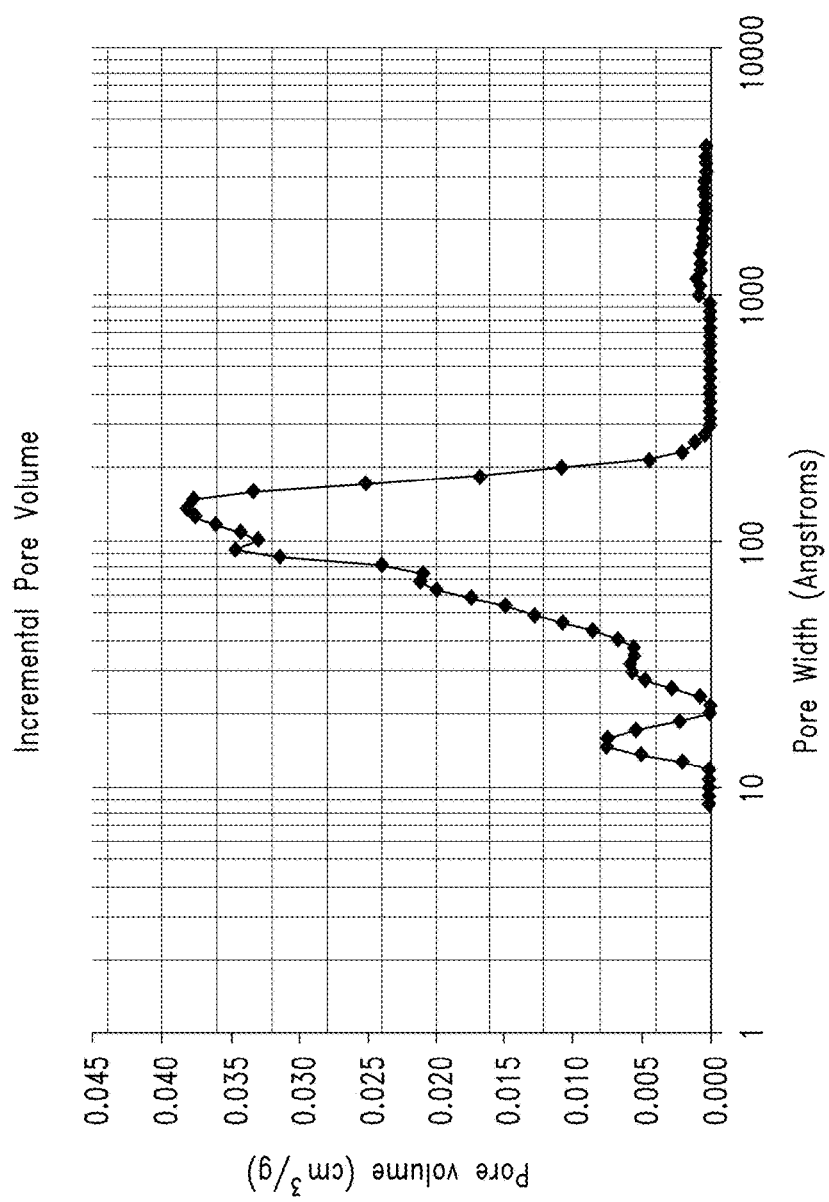
FIG. 7 is a pore size distribution for a mesoporous carbon material.

A polymer gel was prepared and pyrolyzed (but not activated) according to Examples 1 and 2. The carbon material was analyzed and determined to comprise a specific surface area of about 675 $m^2/g$, a total pore volume of about 0.70 cc/g and a tap density of about 0.45 g/cc. The pore size distribution of the mesoporous carbon material is presented in FIG. 7.

Electrochemical modifiers are incorporated in the mesoporous carbon material as described above. For example, electrochemical modifiers are incorporated during the polymerization stage, into the dried (or undried polymer gel) or after pyrolysis of the polymer gel.

Example 22

Preparation of a Dip Coated Carbon Electrode

Figure 8:
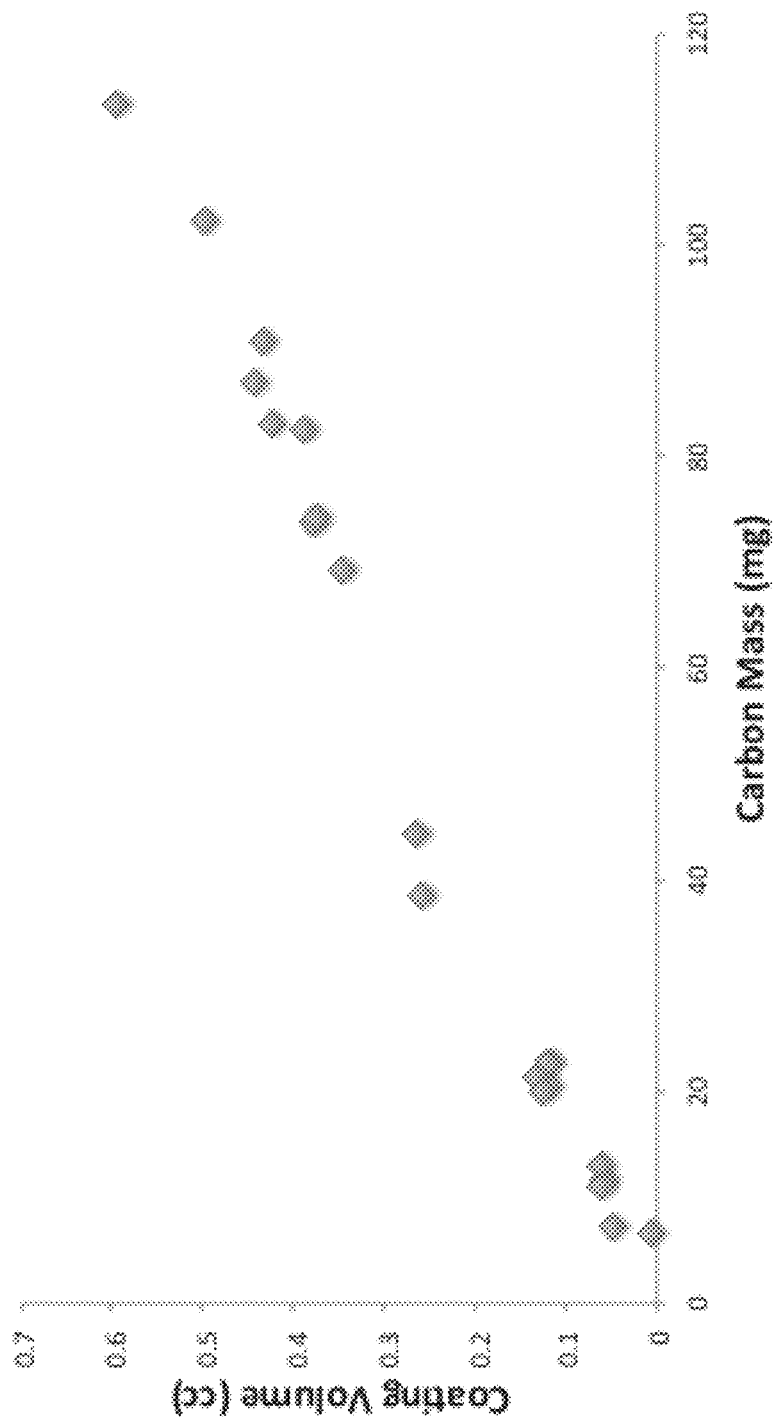
FIG. 8 shows carbon mass as a function of coating volume for a carbon coated lead electrode.

A carbon slurry is prepared following Example 10. Commercially available lead wire is cut to a length of 3 inches. The wire is dipped into the carbon slurry for 10 seconds and then allowed to air dry. Further coatings are applied as needed by successive dipping and drying. Excess solvent is removed by heating in an oven to at least 65° C. Electromay vary between 5 and 120 mg, as seen in FIG. 8. The thickness of the dip-coated electrode may also vary between 0.001 and 0.12 cm. The carbon coating volume and the carbon mass have a direct linear relationship. As the thickness and length of the coating increases, the amount of carbon on each electrode also increases.

Example 23

Water Uptake Properties of Carbon

Figure 9:
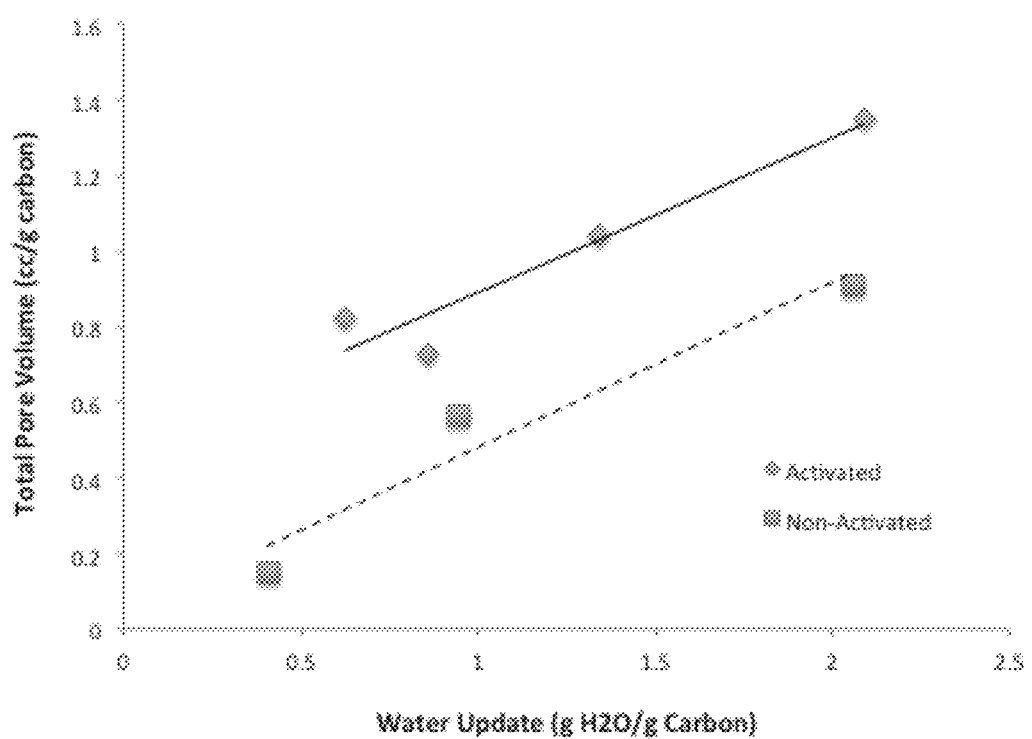
FIG. 9 is a plot showing water uptake for activated and unactivated carbons having various pore volumes.

In certain embodiments, the carbon is measured by the mass of water that can be absorbed. Carbon coated lead electrodes are made using Example 25. The electrodes are submerged in deionized water for 10 minutes and weighed. The mass change before and after soaking is recorded (see Table 9). There is a clear linear inverse relationship between the water adsorption and the tap density of the carbon (correlation of 97%). FIG. 9 depicts the relationship between the water adsorption and the total pore volume for activated and non-activated carbons. The more water absorption, the greater the surface area is exposed to water molecules and the capability of increasing the available lead-sulfate nucleation sites at the liquid-solid interface. The water accessible pores also allow for the transport of electrolyte into the center of the lead pasted plate for additional material utilization. A surprising result is that the water adsorption has no relationship to Specific Surface Area, carbon pH or quantity of impurities.

TABLE 9

Properties of exemplary carbon samples

| No. | SSA ($m^2/g$) | Total Pore Vol. (cc/g) | Tap Density (g/cc) | D50 | Water Adsorp. ($g_{H2O}/g_C$) | Water Uptake versus PV (g $H_2O$/cc carbon) | Act?* | pH | Imp.* (ppm) |
|---|---|---|---|---|---|---|---|---|---|
| C1 | 810 | 0.91 | 0.22 | 4.17 | 2.058 | 2.2615 | No | 5.9 | 62.43 |
| C2 | 2029 | 1.04 | 0.34 | 7.3 | 1.3415 | 1.2899 | Yes | 7.9 | 55.06 |
| C3 | 707 | 0.566 | 0.442 | 6.19 | 0.947 | 1.6731 | No | 5.4 | 59.238 |
| C4 | 1823 | 0.82 | 0.53 | 6.9 | 0.6237 | 0.7606 | Yes | 3.8 | 66.035 |
| C5 | 388 | 0.15 | 0.567 | 10.82 | 0.4058 | 2.7053 | No | 8.3 | N/A |
| C6 | 1741 | 1.35 | 0.22 | 5.4 | 2.089 | 1.5474 | Yes | 8.4 | 6.5 |

TABLE 9-continued

Properties of exemplary carbon samples

| No. | SSA ($m^2$/g) | Total Pore Vol. (cc/g) | Tap Density (g/cc) | D50 | Water Adsorp. ($g_{H2O}/g_C$) | Water Uptake versus PV (g $H_2O$/cc carbon) | Act?* | pH | Imp.* (ppm) |
|---|---|---|---|---|---|---|---|---|---|
| Comp 1 | 1573 | 0.73 | 0.413 | 5.8 | 0.859 | 1.1767 | Yes | 3.647 | 734 |

*Act. = Activated, Imp. = PIXE impurities

Example 24

Water Adsorption of Carbon in Varied Humidity

The initial step of negative plate formation is high and low exposures to humidity in order to convert available elemental lead to lead oxide. Depending on the adsorption of water by the carbon additives, the formation process may change.

In order to test the uptake of water by the carbon, five sealed chambers were established, each with a pre-determined humidity. Approximately 20 mL of saturated solutions of the following salts were first prepared: potassium sulfate (0.12 g/mL), sodium chloride (0.37 g/mL), magnesium nitrate (1.25 g/mL), magnesium chloride (0.56 g/mL), lithium chloride (0.80 g/mL). Each of these solutions were placed in a separate desiccator to produce a respective closed system relative humidity as follows: potassium sulfate=97%, sodium chloride=75%, magnesium nitrate=52%, magnesium chloride=33%, lithium chloride=11%. One gram portions of each carbon were placed in a glass vial (weight previously recorded) then heated in a 105° C. oven for >2 hours to remove any residual moisture. The carbon samples were weighed after drying and placed in each desiccator with different respective humidity. After sitting undisturbed between 30 and 60 days the carbon samples are removed and re-weighed to determine weight percent gain due to moisture adsorption.

In various embodiments, different saturated salt solutions are used to provide different humidity environments (e.g., potassium carbonate=43%, potassium chloride=85%, potassium nitrate=94%). In other embodiments, larger or smaller quantities of carbon are used depending on the size and factors associated with the experiment setup. For instance, large quantities of carbon may provide less error when determining percent weight gain or loss from moisture adsorption.

Figure 10:
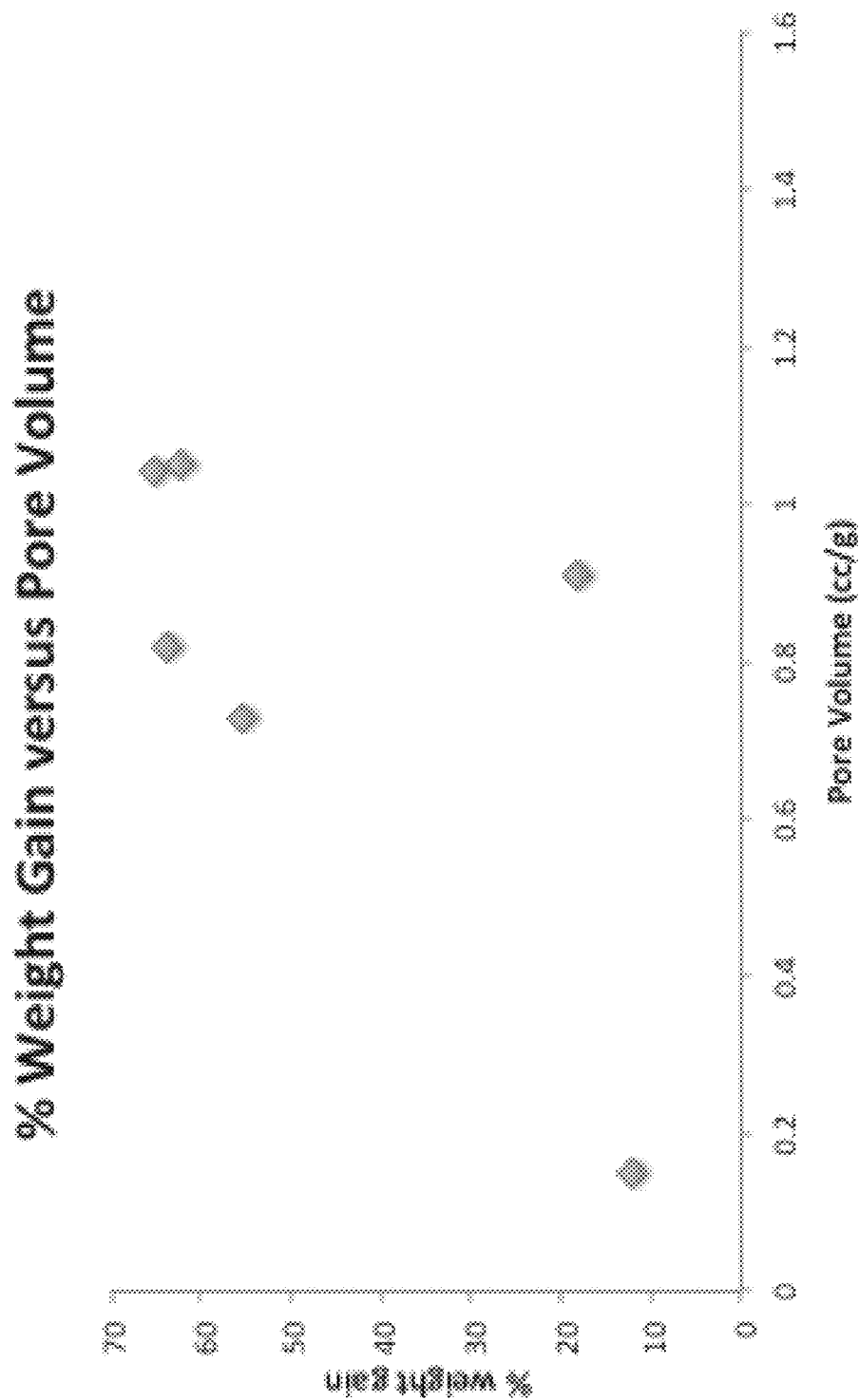
FIG. 10 displays water weight gain of different carbon particles.

The percent weight gain measured over a two week span is presented in FIG. 10.

Example 25

Electrochemical Performance of a Device Comprised of Lead-Carbon Electrodes

Lead-carbon pastes were mixed according to the general procedures described above. The pastes were pasted onto two lead alloy grids and dried at 85° C. for 24 hours. The pasted grids were assembled into a two-electrode symmetric prismatic cell arrangement in an open beaker configuration using AGM woven fiberglass as the separator material and 4.8 molar sulfuric acid as the electrolyte. The pasted grid electrodes were kept together using two Teflon plates fastened together with Teflon screws and nuts. Prior to electrochemical testing the plates were allowed to soak in the sulfuric acid electrolyte for 15 minutes. The capacitance of the cells were measured based on the discharge data of a galvanostatic charge/discharge profile to 0.9V and 0V at a symmetric current density ranging from 0.1 A/g carbon to 10 A/g carbon. A set of conditioning steps may be run prior to capacitance measurement. The low voltage window limit was chosen to inhibit pseudocapacitance due to water electrolysis or Faradaic charge transfer of the lead-acid battery system. Capacitance was determined from the equation: $C=(\Delta t*I)/\Delta V$ where the change in time is recorded between the change in discharge voltage. The size of electrodes may range according to a desired cell configuration (e.g., 1 in.×1 in., 3 in.×3 in., 5 in.×5 in., etc).

A surprising result is that the maximum capacitance occurs for a carbon with a neutral pH with the smallest D100. There is a clear relationship between the lead-carbon surface area and the capacitance. As the surface area increases, the available carbon sites for energy storage and the capacitance increases.

Figure 11:
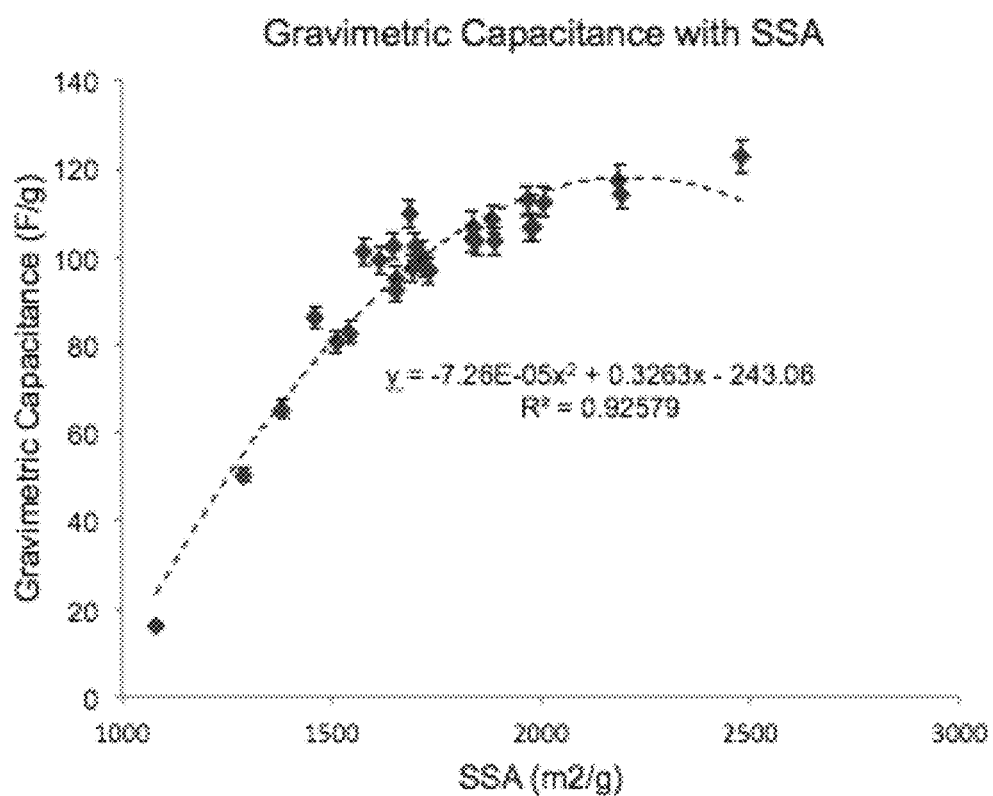
FIG. 11 shows the relationship between surface area and gravimetric capacitance for various carbon samples.
Figure 12:
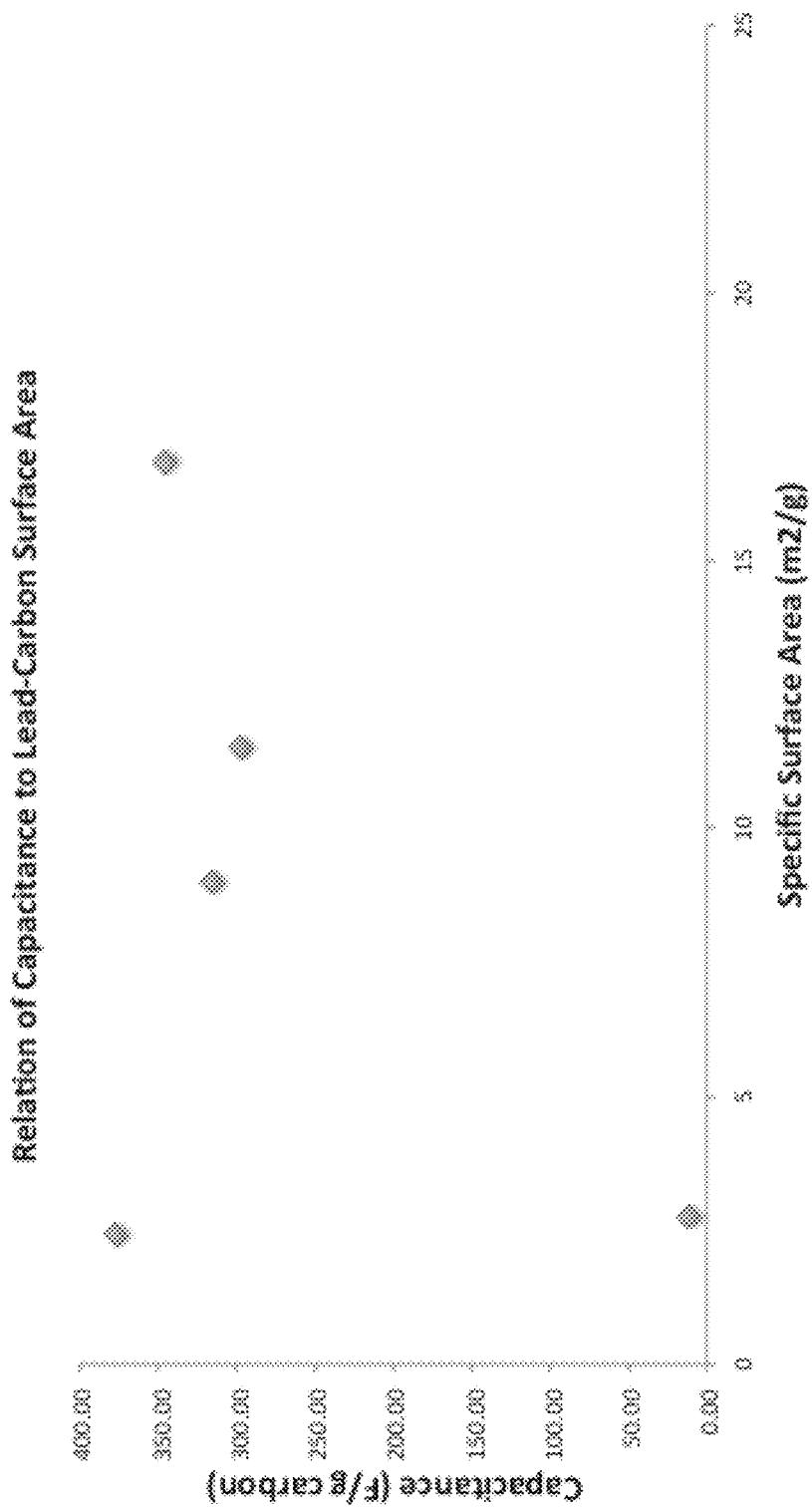
FIG. 12 is a graph showing capacitance and specific surface area of carbon-lead blends.

A highly unexpected result, however, is that sample B has the lowest specific surface area compared to other carbon-lead systems, but has the greatest capacitance. The lead-carbon blend results can be compared to what is predicted from the carbon capacitance results. FIG. 11 depicts the relationship between gravimetric capacitance of carbon with the specific surface area in acetonitrile electrolyte, while FIG. 12 shows the relationship between gravimetric capacitance of carbon-lead blends and their surface area. For sample B, with a surface area of 810, it is predicted that the carbon will have no measurable capacitance in either sulfuric acid or in acetonitrile. Table 10 shows the predicted versus the actual capacitance as measured in F per gram of carbon. Surprisingly, sample B has the highest capacitance despite having a predicted value of 0 F/g.

Capacitance may also be measured by the F per surface area of the lead-carbon blend (seen in Table 11). Using this metric, sample B has 3× capacitance than sample D and 10× capacitance over sample F.

TABLE 10

Actual and predicted capacitance of carbon samples

| | Capacitance (F/g) | |
|---|---|---|
| Sample | Acetonitrile/TEATFB | Sulfuric Acid/$H_2O$ |
| A | 0 | 0 |
| B | <20 | 375.99 |
| C | <20 | 11.85 |
| D | 104.80 | 344.34 |
| E | 114.02 | 315.83 |
| F | 112.45 | 296.73 |

TABLE 11

Electrochemical properties of carbons and carbon-lead blends

| Sample | Carbon SSA (m2/g) | Pb—C SSA (m2/g) | Pb—C Pore Volume (cm3/g) | Capacitance (F/g) | Capacitance (F/m2 of Pb—C) | pH |
|---|---|---|---|---|---|---|
| B | 810 | 2.4394 | 0.0046 | 376.0 | 1.54 | 5.9 |
| C | 705 | 2.7687 | 0.0025 | 11.85 | 0.075 | 3.8 |
| D | 1741 | 16.849 | 0.0130 | 344.34 | 0.409 | 8.4 |
| F | 1859 | 11.5317 | 0.0036 | 296.73 | 0.0116 | 8.3 |

Example 26

Preparation of Pasted Grids

Lead pasted grids are constructed as known in the art. Lead (II) oxide (PbO) pasted grids were constructed by first mixing the PbO paste. 40 grams of PbO powder is mechanically mixed with 0.4 grams expander pack from Hammond Expander and 0.4 grams high-surface area carbon. Once a homogeneous powder mixture was obtained, 5 milliliters of distilled water was added and the contents were mixed in a planetary mixer for 1 minute at 2000 rpm. An additional 4 milliliters of 4.8M sulfuric acid was added to the contents then mixed in the planetary mixer again for 30 seconds at 2000 rpm. The paste was hot due to the exothermic reaction of the PbO and sulfuric acid to form lead sulfate. The paste was cooled to room temperature before measuring paste density and pasting grids. Paste density was measured using a small plastic container with a known volume. The paste was added to the container until completely filled and flush with the top then weighed to determine density. The paste was applied to lead alloy grids by hand using a rubber spatula. The pasted grids were dried in a convection oven at 85° C. for 24 hours, at which point, they were ready for testing.

Different oxides of lead may be pasted other than PbO. In another embodiment the PbO powder is replaced with Pb metal powder or lead (II,III) oxide ($Pb_3O_4$).

The liquid may be added in different orders than previously explained. In a further embodiment the water and acid are first pre-mixed to create a lower molarity solution (e.g. 1M) before being added in a single step to the paste. In still another embodiment only water is added to the paste. After the grids are pasted, they are submerged in 4.8M sulfuric acid for a specific period of time (e.g. 10 seconds, 1 minute, 1 hour, etc.) to form the lead sulfate.

In another embodiment the pasted grids are dried at lower temperatures (e.g. 40, 50, 60° C.) or higher temperatures (e.g. 90, 100, 120° C.) for longer or shorter periods of time (e.g. 0, 2, 4, 6, 8, 10, 12, 36, 48 hours).

Example 27

Incorporation of Carbon into Pasted Grids

Carbon can be incorporated into lead pasted plates using methods known in the art. 40 grams of PbO powder is added to a plastic container followed by 0.4 grams of expander pack and 0.4 grams of high-surface area carbon. The mixture is stirred with a spatula by hand to mix the dry powders. Then 5 milliliters of water is added to the powders and the content are mixed in a planetary mixer for 1 minute at 2000 rpm. At this time, an additional 4 milliliters of 4.8M sulfuric acid is added then the contents are mixed again for 30 seconds at 2000 rpm. At this point a homogeneous yellow paste is obtained with the carbon fully incorporated.

In some embodiments, the high-surface area carbon is wetted with water or formed into a slurry prior to adding to the PbO powder/expander mixture. In other embodiments, more or less solvent (water/acid) is used to bring the paste to a desired/tailored density (e.g. 5 mL acid/4 mL water, 2 mL acid/4 mL water, etc.). In still other embodiments, the content of high-surface area carbon is either increased or decreased from that in Example 1 (e.g. 0.5 wt %, 2 wt %, 3 wt %, etc.)

Figure 13:
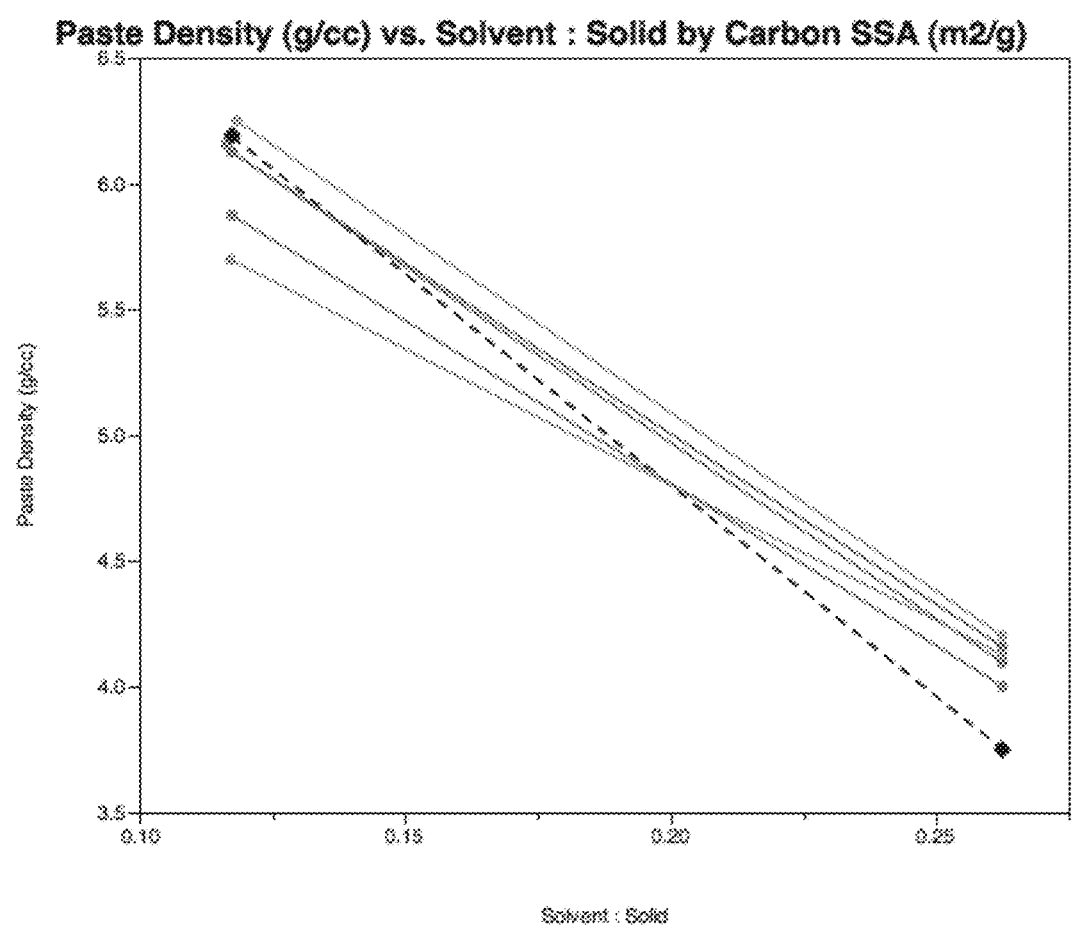
FIG. 13 depicts the relationship of the density of pastes comprising carbon-lead blends and the ratio of solvent to solid in the pastes.

Tables 12 and 13 show the physical properties of the pastes (i.e., carbon-lead blends). The density of the pastes with lead are greater than with lead oxide. Each carbon was made with both lead and lead oxide powder. Using lead powder, sample B had one of the greatest paste densities (~6.2 g/cc) while the paste density of sample J when mixed with lead oxide was the lowest (~3.8 g/cc). FIG. 13 shows the relationship of paste density to solvent:solid ratio.

The paste ratio as known in the lead-acid battery art, should be approximately 4 g/cc. Someone who is familiar in the art would be able to modify the water and carbon content from the table below in order to achieve the optimal paste density.

TABLE 12

Properties of Exemplary Carbon-Lead Blends

| No. | Lead Type | Paste Density (g/cc) | Carbon mass (g) | Pb mass (g) | Expander mass (g) | $H_2O$ (g) | $H_2SO_4$ (mL) | $H_2SO_4$ (g) | Mass Liquid (g) | Mass Solid (g) | Solvent: Solid | % carbon |
|---|---|---|---|---|---|---|---|---|---|---|---|---|
| A | Pb | 6.156 | 0 | 37.8 | 0.378 | 2.1 | 2.1 | 2.688 | 4.788 | 38.178 | 0.1254 | 0% |
| B | Pb | 6.1875 | 0.4 | 40 | 0.4 | 2.1 | 2.1 | 2.688 | 4.788 | 40.8 | 0.1174 | 1% |
| C | Pb | 6.157 | 2 | 100 | 1 | 5.58 | 5 | 6.4 | 11.98 | 103 | 0.1163 | 2% |
| D | Pb | 5.697 | 0.756 | 37.8 | 0.378 | 2 | 2 | 2.56 | 4.56 | 38.934 | 0.1171 | 2% |
| E | Pb | 5.875 | 0.4 | 40 | 0.4 | 2.1 | 2.1 | 2.688 | 4.788 | 40.8 | 0.1174 | 1% |
| F | Pb | 6.25 | 0.378 | 37.8 | 0.378 | 2 | 2 | 2.56 | 4.56 | 38.556 | 0.1183 | 1% |
| G | Pb | 6.125 | 0.4 | 40 | 0.4 | 2.1 | 2.1 | 2.688 | 4.788 | 40.8 | 0.1174 | 1% |
| H | Pb | 6.125 | 0.4 | 40 | 0.4 | 2.1 | 2.1 | 2.688 | 4.788 | 40.8 | 0.1174 | 1% |
| I | PbO | 4.258 | 0 | 37.8 | 0.378 | 5 | 4 | 5.12 | 10.12 | 38.178 | 0.2651 | 0% |
| J | PbO | 3.75 | 0.378 | 37.8 | 0.378 | 5 | 4 | 5.12 | 10.12 | 38.556 | 0.2625 | 1% |
| K | PbO | 4.125 | 0.378 | 37.8 | 0.378 | 5 | 4 | 5.12 | 10.12 | 38.556 | 0.2625 | 1% |
| L | PbO | 4 | 0.378 | 37.8 | 0.378 | 5 | 4 | 5.12 | 10.12 | 38.556 | 0.2625 | 1% |
| M | PbO | 4.2 | 0.378 | 37.8 | 0.378 | 5 | 4 | 5.12 | 10.12 | 38.556 | 0.2625 | 1% |
| N | PbO | 4.156 | 0.378 | 37.8 | 0.378 | 5 | 4 | 5.12 | 10.12 | 38.556 | 0.2625 | 1% |
| O | PbO | 4.0938 | 0.378 | 37.8 | 0.378 | 5 | 4 | 5.12 | 10.12 | 38.556 | 0.2625 | 1% |

TABLE 13

Properties of Exemplary Carbon-Lead Blends

| No. | Total mass (g) | Carb. mass % | Carbon vol (cc) | Pb vol (cc) | C particle vol: Pb Particle vol | Expander vol (cc) | Total vol (cc) | Carbon vol % | Carbon SSA (m2/g) | Pb—C SSA (m2/g) | Pb—C Pore Volume (cm3/g) | Particle Size D10 | D50 | D100 |
|---|---|---|---|---|---|---|---|---|---|---|---|---|---|---|
| A | 38.18 | 0.00 | 0.00 | 5.37 | 0.00 | 0.56 | 5.94 | 0.00 | N/A | −0.0785 | 0.0022 | 0.392 | 1.85 | 16.3 |
| B | 40.80 | 0.98 | 1.82 | 5.69 | 0.32 | 0.60 | 8.10 | 22.45 | 810 | 2.4394 | 0.0046 | 0.309 | 1.83 | 11.2 |
| C | 103.00 | 1.94 | 4.55 | 14.21 | 0.32 | 1.49 | 20.25 | 22.45 | 705 | 2.7687 | 0.0025 | 0.43 | 4.85 | 27.4 |
| D | 38.93 | 1.94 | 3.44 | 5.37 | 0.64 | 0.56 | 9.37 | 36.66 | 1741 | 16.849 | 0.0130 | 0.563 | 4.12 | 14.4 |
| E | 40.80 | 0.98 | 0.91 | 5.69 | 0.16 | 0.60 | 7.19 | 12.64 | 1888 | 8.9912 | 0.0059 | 0.409 | 3.2 | 23.5 |
| F | 38.56 | 0.98 | 0.86 | 5.37 | 0.16 | 0.56 | 6.80 | 12.64 | 1859 | 11.5317 | 0.0036 | N/A | N/A | N/A |
| G | 40.80 | 0.98 | 0.97 | 5.69 | 0.17 | 0.60 | 7.25 | 13.36 | 1699 | 39.4625 | 0.0180 | 0.331 | 2.46 | 16.4 |
| H | 40.80 | 0.98 | 2.06 | 5.69 | 0.36 | 0.60 | 8.34 | 24.66 | 20 | 0.0537 | 0.0003 | 0.431 | 3.38 | 18.6 |
| I | 38.18 | 0.00 | 0.00 | 9.48 | 0.00 | 0.56 | 10.04 | 0.00 | N/A | 0.7183 | 0.0048 | 0.427 | 2.96 | 12.7 |
| J | 38.56 | 0.98 | 1.72 | 9.48 | 0.18 | 0.56 | 11.76 | 14.61 | 810 | 1.7482 | 0.0058 | 0.63 | 2.71 | 14.4 |
| K | 38.56 | 0.98 | 1.72 | 9.48 | 0.18 | 0.56 | 11.76 | 14.61 | 1741 | 4.3645 | 0.0084 | 0.552 | 5.51 | 27.4 |
| L | 38.56 | 0.98 | 1.22 | 9.48 | 0.13 | 0.56 | 11.26 | 10.81 | 1888 | 5.2225 | 0.0066 | 0.564 | 4.26 | 13.4 |
| M | 38.56 | 0.98 | 0.86 | 9.48 | 0.09 | 0.56 | 10.90 | 7.88 | 1859 | 2.6179 | 0.0017 | 0.937 | 6.12 | 24 |
| N | 38.56 | 0.98 | 0.92 | 9.48 | 0.10 | 0.56 | 10.95 | 8.35 | 1699 | 1.6655 | 0.0013 | 0.43 | 2.75 | 12.7 |
| O | 38.56 | 0.98 | 1.94 | 9.48 | 0.21 | 0.56 | 11.98 | 16.22 | 20 | 0.0049 | 0.0000 | 0.342 | 2.94 | 18.6 |

Example 28

Wettability of Carbon for Paste Preparation

Figure 14:
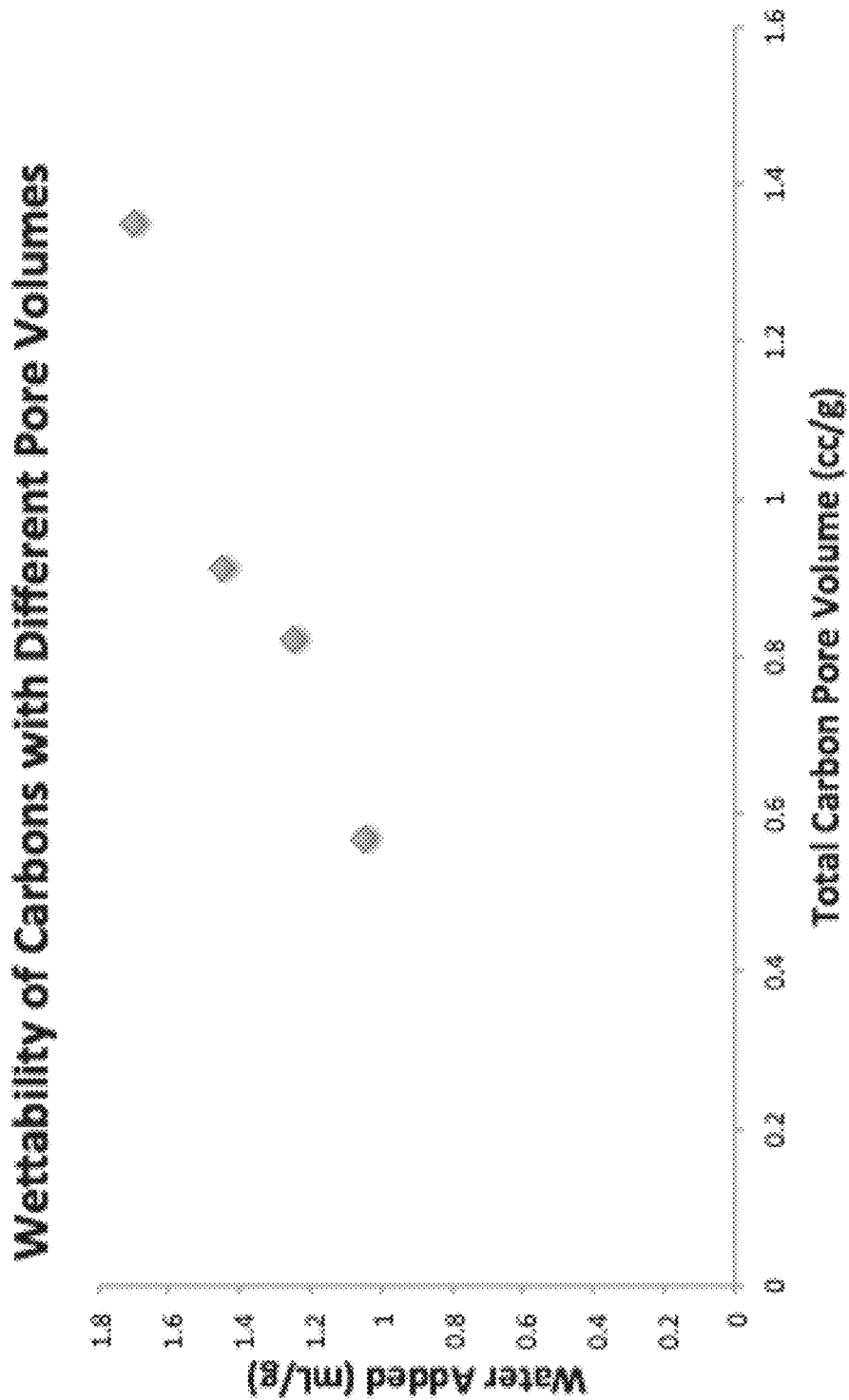
FIG. 14 shows wettability of different carbon samples.
Figure 15:
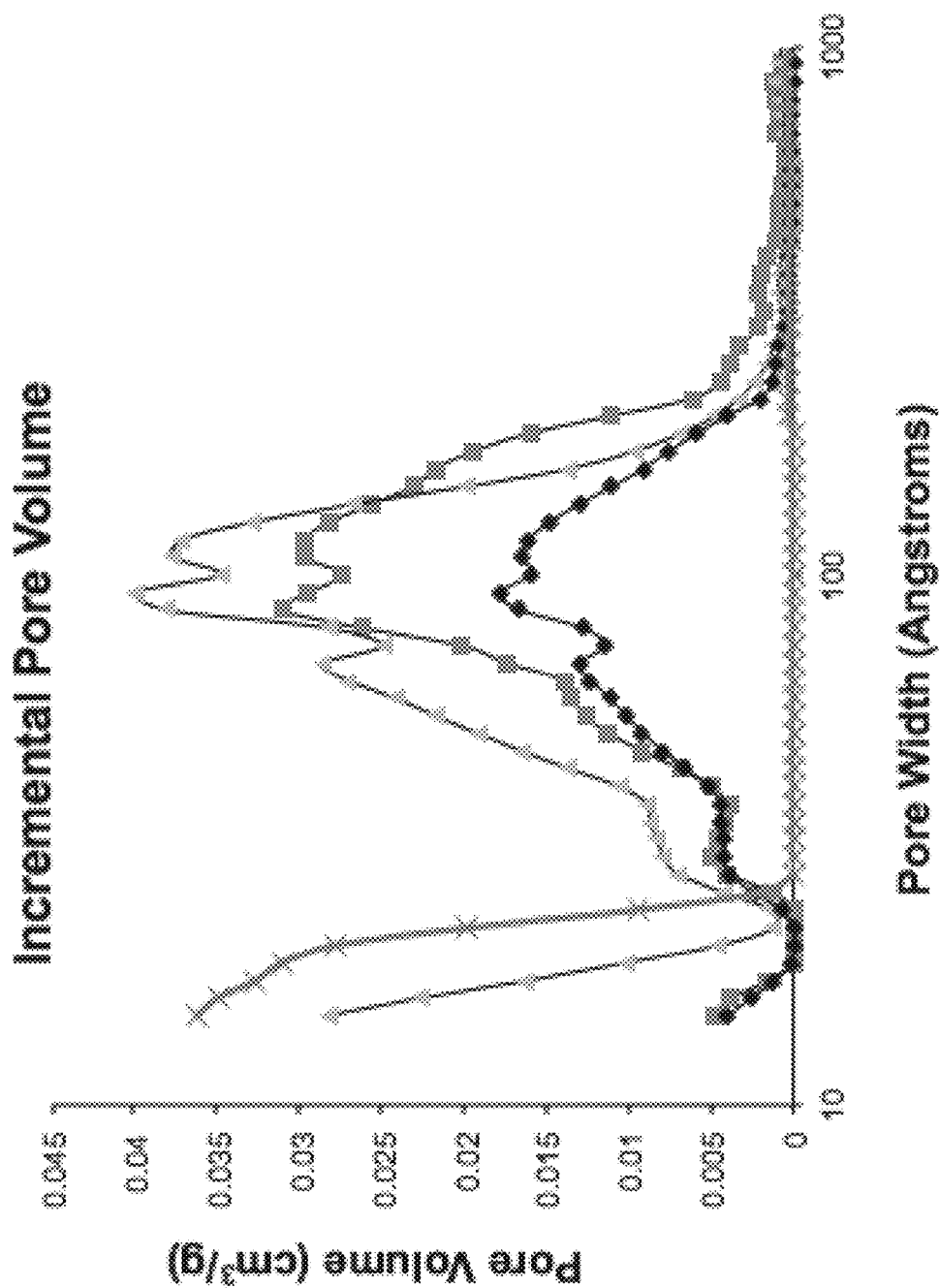
FIG. 15 is a plot showing incremental pore volume of different carbon samples.

The amount of additional water needed to properly paste lead grids as negative active material (NAM) depends upon the physical properties of the carbon, such as pore volume and pore type. The point at which the carbon is fully wet is determined through titration of water into carbon and mechanical mixing. Wettability of the carbon is determined as follows: 2.409 grams of meso-porous carbon from Example 25 is combined with water in a planetary mixer. An R-Factor can be used to assess the amount of water needed to fully wet a carbon. At 4 mL (R=1.6603 mL water/g carbon), the mixture visibly transitions from partially wet to fully wet. FIG. 14 depicts the water needed to fully wet the carbon and the pore volume of the carbon, and FIG. 15 shows the pore volume distribution for the tested carbons. In one embodiment the carbon has high pore volume where the R-value>1.6 mL/g. In another embodiment the carbon has a medium pore volume where the R-value is between 1.2 and 1.6 mL/g. In yet another embodiment the carbon has a low pore volume where the R-value is less than 1.2 mL/g. The more electrolyte access to the interior of the structure the more active material utilization. In some embodiments, the highest pore volume carbon allows for the greatest access of electrolyte to the internal lead structure.

Example 29

Figure 16:
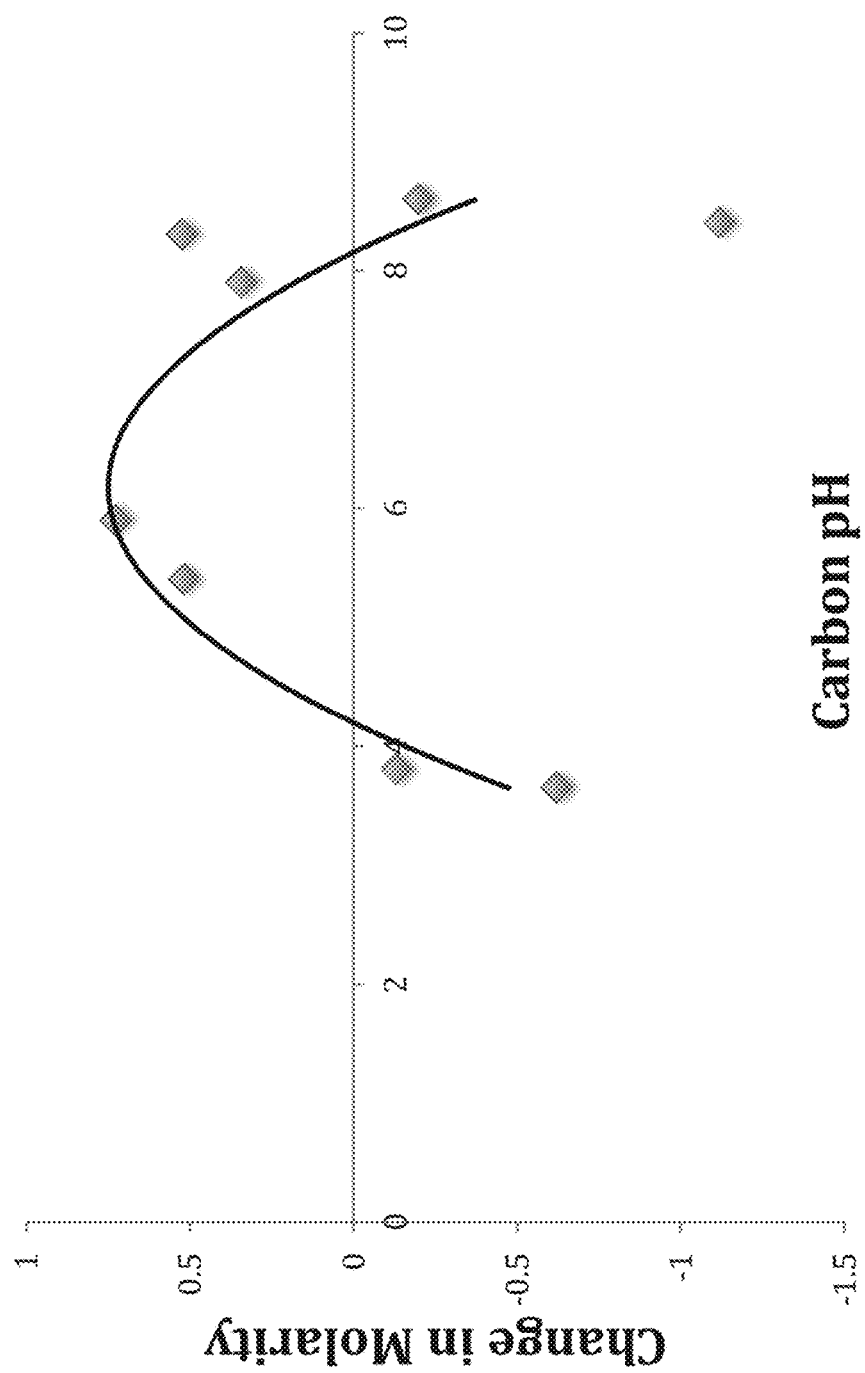
FIG. 16 illustrates the change in the molarity of a sulfuric acid solution versus the pH of activated and pre-activated carbon samples.

Acid Titration Properties of Carbon 0.25 grams of carbon are measured into a 60 mL polypropylene bottle. 45% of 37% sulfuric acid aqueous solution is added to the bottle and sealed. The bottle is secured and agitated for 24 hours. The liquid is then filtered from the solids and titrated using NaOH, as known in the art. Plotted in FIG. 16 is the change in the molarity of sulfuric acid solution versus the pH of activated and pre-activated carbon. A positive change in molarity per carbon indicates that the solution was more acidic after the test. A negative change in molarity per carbon indicates that the solution was more basic after the test.

An unexpected result was the effect of heat treatment on activated carbons. Once activated carbons are heat treated to a pH>7, the change in molarity per gram carbon becomes independent of the carbon pH. It is only for non-heat treated carbon that there is a direct correlation between the change in molarity per carbon and the pH. There is an unexpected maxiuma in the change in molarity of the solution per carbon when carbon is close to a neutral pH (between 5 and 7). This is for both activated and pre-activated carbons. In other embodiments the change in molarity per carbon is negative, indicating more basic from a control, as seen from carbons with low (<5). In yet other embodiments the acid adsorption as measured as a change in molarity per carbon is not dependent upon the pH for pH values above 7.

Yet another surprising result was that the change in molarity of the solution per carbon had no dependence upon the pore volume or pore type (micro versus mesoporous). In fact, the only correlation is between the pH and the change in molarity. In an even more surprising result, the more acid carbon did not yield more acid solution, rather the solution was actually more basic than the control. As previously explained, this unexpected result gives rise to the local maxima for a semi-neutral carbon pH.

Example 30

Alternative Preparation of a Carbon Material

A carbon material was prepared according to the procedures described in PCT App. No. US/2011/067278, which application is hereby incorporated by reference in its entirety. Briefly, polymer gel was prepared by polymerization of resorcinol and formaldehyde (0.5:1) in a water/acetic acid solvent (80:20) in the presence of ammonium acetate catalyst. The resultant polymer to solvent ratio was 0.3, and the resorcinol to catalyst ratio (R/C) was 25. The reaction mixture was placed at elevated temperature (incubation at 45° C. for about 6 h followed by incubation at 85° C. for about 24 h) to allow for gellation to create a polymer gel. Polymer gel particles were created from the polymer gel with a rock crusher through a screen with ¾ inch sized holes. The particles were flash frozen by immersion in liquid nitrogen, loaded into a lyophilization tray at a loading of 3 to 7 g/in², and lyophilized at approximately 50 to 150 mTorr. The time to dry (as inferred from time for product to reach within 2° C. of shelf temperature) varied with product loading on the lyophilizer shelf.

The mass loss on drying the polymer gel was approximately 72%. The surface area of the dried polymer gel was determined to be 691 m²/g, the total pore volume was 1.05 cc/g and the tap density was 0.32 g/cc. Dried polymer gel materials comprising different properties (e.g., surface area, pore structure, etc.) can be prepared by altering the drying conditions (e.g., pressure, temperature, time, etc.) described above.

Dried polymer gel prepared according was pyrolyzed by passage into a rotary kiln at 900° C. with a nitrogen gas flow of 200 L/h. The surface area of the pyrolyzed dried polymer gel was examined by nitrogen surface analysis using a surface area and porosity analyzer. The measured specific surface area using the standard BET approach was 737 m²/g, the total pore volume was 0.64 cc/g. Carbon materials comprising different properties (e.g., surface area, pore structure, etc.) can be prepared by altering the pyrolysis conditions (e.g., temperature, time, etc.) described above.

From the DFT cumulative volume plot for the activated carbon material, it was determined that about 40% of the pore volume resides in micropores and about 60% of the pore volume resides in mesopores. Carbon materials comprising different properties (e.g., surface area, pore structure, etc.) can be prepared by altering the activation conditions (e.g., temperature, time, etc.) described above.

Pyrolyzed carbon prepared was jet milled using a manufacturing scale 15 inch diameter jet mill. The average particle size after jet milling was about 4 to 7 microns. Properties of the carbon material are summarized in Table 14. Table 15 summarizes the range of properties of various carbon embodiments prepared according the above procedures.

TABLE 14

Physiochemical Properties of Carbon Material

| Test | Parameter | Result |
|---|---|---|
| Tap Density | Tap Density (g/cc) | 0.43 |
| N2 Sorption Isotherm | Specific Surface Area (m²/g) | 737 |
| | Total pore volume (cc/g) | 0.64 |
| | DFT Pore volume > 20 Å (cc/g) | 0.38 |
| | $N_2$ $(p/p0)_{95}/(p/po)_5$: 2.0-2.7 (i.e., "P95/P5") | 2.2 |
| Thermal Gravimetric Analyis (TGA) | % weight loss observed between 250 to 850 C. | 1.0 |
| Ash Content | Calculated from PIXE elemental data (%) | 0.0008 |
| PIXE Purity | Sulfur (ppm): | ND |
| | Silicon (ppm): | ND |
| | Calcium (ppm): | ND |
| | Iron (ppm): | 6.2 |
| | Nickel ppm): | 1.1 |
| | Zinc (ppm): | ND |
| | Copper (ppm): | ND |
| | Chromium (ppm): | ND |
| | All other elements: | ND |

ND = not detected

Example 31

Alternative Preparation of a Carbon Material

A carbon material having increased energy density with balanced power performance was prepared according to the following description. A polymer gel was prepared by polymerization of resorcinol and formaldehyde (0.5:1) in a water/acetic acid solvent (80:20) in the presence of ammonium acetate catalyst. The resultant polymer to solvent ratio was 0.3, and the resorcinol to catalyst ratio (R/C) was 25. The reaction mixture was placed at elevated temperature (incubation at 45° C. for about 6 h followed by incubation at 85° C. for about 24 h) to allow for gellation to create a polymer gel. Polymer gel particles were created from the polymer gel with a rock crusher through a screen with ¾ inch sized holes. The particles were loaded into a lyophilization tray at a loading of 3 to 7 g/in², frozen on the shelf of a freeze-dryer until particles were frozen below −30° C. The frozen particles were lyophilized at approximately 50 mTorr. The time to dry (as inferred from time for product to reach within 2° C. of shelf temperature) varied with product loading on the lyophilizer shelf. At manufacturing scale, polymer gel particles were loaded on lyophilization trays in a −30° C. cold room and frozen over the course of 24 hours. These frozen particles were lyophilized at approximately 120 mTorr. The time to dry (as inferred from time for product to reach within 2° C. of shelf temperature) varied with product loading on the lyophilizer shelf.

The mass loss on drying the polymer gel was 74.1%. The surface area of the dried polymer gel was determined to be 515 m²/g, the total pore volume was 0.39 cc/g and the tap density was 0.22 g/cc.

Dried polymer gel prepared according to the above procedure was pyrolyzed by passage into a furnace at 625° C. with a nitrogen gas flow of 400 L/h. At manufacturing scale, dried polymer gel prepared according to the above procedure was pyrolyzed by passage into a rotating kiln furnace set with three hot zones of 685° C., 750° C., and 850° C.

The surface area of the pyrolyzed dried polymer gel pyrolyzed by passage into a furnace at 625° C. was examined by nitrogen surface analysis using a surface area and porosity analyzer. The measured specific surface area using the standard BET approach was 622 m²/g, the total pore volume was 0.33 cc/g. The surface area of the pyrolyzed dried polymer gel pyrolyzed by passage into a rotary kiln furnace set with three hot zones of 685° C., 750° C., and 850° C. was examined by nitrogen surface analysis using a surface area and porosity analyzer. The measured specific surface area using the standard BET approach was 588 m²/g, the total pore volume was 0.25 cc/g. Carbon materials comprising different properties (e.g., surface area, pore structure, etc.) can be prepared by altering the pyrolysis conditions (e.g., temperature, time, etc.) described above.

Pyrolyzed carbon material prepared according to above was activated in a batch rotary kiln at 900° C. under $CO_2$ for approximately 840 min, resulting in a total weight loss of 50%. In another case, Pyrolyzed carbon material prepared according to above was activated in a fluidized bed reactor at 925° C. under $CO_2$.

The surface area of the activated carbon produced by a batch rotary kiln as described above was examined by nitrogen surface analysis using a surface area and porosity analyzer. The measured specific surface area using the BET approach was 1857 m²/g, the total pore volume was 0.87 cc/g and the tap density was 0.41 g/cc. In the second case using a fluidized bed reactor, the resultant material was also measured by nitrogen adsorption analysis and the measured specific surface area using the BET approach was 2046 m²/g, and the total pore volume was 1.03 cc/g.

From the DFT cumulative volume plot for the activated carbon material, it was determined that the 80% of the pore volume resides in micropores and 20% of the pore volume resides in mesopores. In other examples, it was determined that 70% of the pore volume resides in the micropores and 30% of the pore volume resides in the mesopores. Carbon materials comprising different properties (e.g., surface area, pore structure, etc.) can be prepared by altering the activation conditions (e.g., temperature, time, etc.) described above.

Activated carbon prepared was jet milled using a Jet Pulverizer Micron Master 2 inch diameter jet mill and at the manufacturing scale, a 15 inch diameter jet mill was used. The average particle size after jet milling was about 4 to 7 microns.

Chemical species on the surface of the activated carbon was removed with a heat treatment process by heating the carbon in an elevator furnace under nitrogen gas for 1 hour at 900° C. The pH was measured on the treated carbon and was 7.9 indicating a lack of oxygen containing surface functional groups. Properties of various carbons prepared by the above method are summarized in Table 14.

Example 32

Alternative Preparation of a Carbon Material

A carbon material having increased energy density with balanced power performance was prepared according to the following description. A polymer gel was prepared by polymerization of resorcinol and formaldehyde (0.5:1) in a water/acetic acid solvent (80:20) in the presence of ammonium acetate catalyst. The resultant polymer to solvent ratio was 0.3, and the resorcinol to catalyst ratio (R/C) was 25.

The reaction mixture was placed at elevated temperature (incubation at 45° C. for about 6 h followed by incubation at 85° C. for about 24 h) to allow for gellation to create a polymer gel. Polymer gel particles were created from the polymer gel with a rock crusher through a screen with ¾ inch sized holes.

Polymer gel particles were prepared was pyrolyzed by passage into a furnace at 625° C. with a nitrogen gas flow of 400 L/h.

The surface area of the pyrolyzed dried polymer gel was examined by nitrogen surface analysis using a surface area and porosity analyzer. The measured specific surface area using the standard BET approach was 585 $m^2/g$, the total pore volume was 0.28 cc/g. Carbon materials comprising different properties (e.g., surface area, pore structure, etc.) can be prepared by altering the pyrolysis conditions (e.g., temperature, time, etc.) described above.

Pyrolyzed carbon material prepared according to above was activated in a 4" Fluidized Bed Reactor at 900° C. under a $CO_2$ for approximately 15 hours.

The surface area of the activated carbon was examined by nitrogen surface analysis using a surface area and porosity analyzer. The measured specific surface area using the BET approach was 2529 $m^2/g$, the total pore volume was 1.15 cc/g and the tap density was 0.36 g/cc.

From the DFT cumulative volume plot for the activated carbon material, it was determined that the 68% of the pore volume resides in micropores and 32% of the pore volume resides in mesopores. Carbon materials comprising different properties (e.g., surface area, pore structure, etc.) can be prepared by altering the activation conditions (e.g., temperature, time, etc.) described above.

Activated carbon prepared was jet milled using a Jet Pulverizer Micron Master 2 inch diameter jet mill. The average particle size after jet milling was about 4 to 7 microns.

Example 33

Properties of Various Carbon Materials

Carbon materials having various properties can be prepared according to the general procedures described above. Table 14 summarizes the properties of carbon materials prepared according to the noted examples.

TABLE 14

Physiochemical Characteristics of Carbon Samples

| Example | SSA ($m^2/g$) | Total Pore Volume (cc/g) | Tap Density (g/cc) | Ratio $N_2$ adsorbed (P/Po)95/(P/Po)5 | PV meso/PV total (%) | Purity |
|---|---|---|---|---|---|---|
| Ex. 33 | 600-800 | 0.5-0.9 | 0.35-0.45 | 2.0-3.0 | 40-60% | <200 ppm impurities Ash: 0.001-0.03% |
| Ex. 1-3 | 1550-2100 | 1.2-1.6 | 0.25-0.35 | 1.8-2.5 | 52-60% | <200 ppm impurities Ash: 0.001-0.03% |
| Ex. 1-3 | 2100-2800 | 1.5-2.7 | 0.19-0.28 | 2.0-2.5 | 52-60% | <200 ppm impurities Ash: 0.001-0.03% |
| Ex. 34 | 1800-2200 | 0.8-1.2 | 0.30-0.45 | 1.2-1.6 | 20-50% | <200 ppm impurities Ash: 0.001-0.03% |
| Ex. 35 | 1800-2600 | 0.7-1.3 | 0.25-0.45 | 1.2-1.8 | 20-50% | <200 ppm impurities Ash: 0.001-0.03% |

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A blend comprising a plurality of amorphous carbon particles and a plurality of lead particles, wherein:
the amorphous carbon particles have a specific surface area of at least 500 $m^2/g$, a pH greater than 8, and a total pore volume of at least 0.5 cc/g; and
the blend comprises a total impurity content of less than 500 ppm of all elements having atomic numbers ranging from 11 to 92, excluding lead, as measured by proton induced x-ray emission.

2. The blend of claim 1, wherein the amorphous carbon particles comprise lead within a pore structure or on a surface of the amorphous carbon particles.

3. The blend of claim 1, wherein the amorphous carbon particles comprise a total of less than 500 PPM of elements having atomic numbers ranging from 11 to 92, excluding lead, as measured by proton induced x-ray emission.

4. The blend of claim 3, wherein the amorphous carbon particles comprise a total of less than 100 PPM of elements having atomic numbers ranging from 11 to 92, excluding lead, as measured by proton induced x-ray emission.

5. The blend of claim 1, wherein the blend comprises a total of less than 100 PPM of elements having atomic numbers ranging from 11 to 92, excluding lead, as measured by proton induced x-ray emission.

6. The blend of claim 1, wherein the blend comprises a total of less than 10 PPM of elements having atomic numbers ranging from 11 to 92, excluding lead, as measured by proton induced x-ray emission.

7. The blend of claim 1, wherein the lead particles are in the form of lead (II) oxide, lead (IV) oxide, lead acetate, lead carbonate, lead sulfate, lead orthoarsenate, lead pyroarsenate, lead bromide, lead caprate, lead carproate, lead caprylate, lead chlorate, lead chloride, lead fluoride, lead nitrate, lead oxychloride, lead orthophosphate sulfate, lead chromate, lead chromate, basic, lead ferrite, lead sulfide, lead tungstate or combinations thereof.

8. The blend of claim 1, wherein the mass percent of carbon as a percentage of the total mass of carbon and lead ranges from 0.1 to 3.0%.

9. The blend of claim 1, wherein the mass percent of carbon as a percentage of the total mass of carbon and lead ranges from 1.0% to 2.0%.

10. The blend of claim 1, wherein the volume percent of carbon as a percentage of the total volume of carbon and lead ranges from 1% to 20%.

11. The blend of claim 1, wherein the surface area of the amorphous carbon particles as a percentage of the total surface area of carbon and lead in the blend ranges from 80% to 99% as determined by nitrogen surface analysis.

12. The blend of claim 1, wherein the surface area residing in carbon pores less than 20 angstroms as a percentage of the total surface area residing in carbon and lead pores less than 20 angstroms ranges from 20% to 60% as determined by nitrogen surface analysis.

13. The blend of claim 1, wherein the volume average particle size of the amorphous carbon particles relative to the volume average particle size of the lead particles ranges from 0.1:1 to 2:1.

14. The blend of claim 1, wherein the capacitance of the amorphous carbon particles measured at a rate of 1 mA is greater than 250 F/g.

15. The blend of claim 1, wherein the ash content of the blend, excluding the ash associated with lead, is less than 0.01% as calculated from proton induced x-ray emission data.

16. The blend of claim 1, wherein the amorphous carbon particles comprise less than 10 ppm iron as measured by proton induced x-ray emission.

17. The blend of claim 1, wherein the amorphous carbon particles comprise less than 5 ppm nickel as measured by proton induced x-ray emission.

18. The blend of claim 1, wherein the amorphous carbon particles comprise less than 5 ppm of each of manganese, nickel, mercury and platinum as measured by proton induced x-ray emission.

19. The blend of claim 1, wherein the amorphous carbon particles comprise an undetectable amount of manganese, nickel, mercury and platinum as measured by proton induced x-ray emission.

20. The blend of claim 1, wherein the amorphous carbon particles comprises less than 5 ppm chromium, less than 10 ppm iron, less than 5 ppm nickel, less than 20 ppm silicon, less than 5 ppm zinc, and bismuth, silver, copper, mercury, manganese, platinum, antimony and tin are not detected as measured by proton induced x-ray emission.

21. The blend of claim 1, wherein the amorphous carbon particles have a BET specific surface area of at least 700 $m^2/g$.

22. The blend of claim 1, wherein the amorphous carbon particles have a BET specific surface area of at least 1500 $m^2/g$.

23. The blend of claim 1, wherein the amorphous carbon particles have a total pore volume of at least 1.0 cc/g.

24. The blend of claim 1, wherein the amorphous carbon particles have a total pore volume of at least 0.7 cc/g.

25. The blend of claim 1, wherein the amorphous carbon particles have a DFT pore volume of at least 0.25 cc/g for pores less than 20 angstroms.

26. The blend of claim 1, wherein the amorphous carbon particles have a DFT pore volume of at least 0.75 cc/g for pores greater than 20 angstroms.

27. The blend of claim 1, wherein the amorphous carbon particles have a pore volume ranging from 0.4 cc/g to 1.4 cc/g and an R factor of 0.2 or less at relative humidity ranging from about 10% to 100%.

28. The blend of claim 27, wherein the amorphous carbon particles have an R factor of 0.6 or less.

29. The blend of claim 1, wherein the amorphous carbon particles have an R factor greater than 1.6.

30. The blend of claim 1, wherein the amorphous carbon particles have an R factor ranging from 1.2 to 1.6.

31. The blend of claim 1, wherein the amorphous carbon particles have an R factor below 1.2.

32. The blend of claim 1, wherein the amorphous carbon particles have a pH ranging from greater than 8 to 9.5.

33. The blend of claim 1, wherein the amorphous carbon particles have a pH ranging from 9.0 to 9.5.

34. An electrical energy storage device comprising the blend of claim 1.

35. The device of claim 34, wherein the device is a battery comprising:
a) at least one positive electrode comprising a first active material in electrical contact with a first current collector;
b) at least one negative electrode comprising a second active material in electrical contact with a second current collector; and
c) an electrolyte comprising water and sulfuric acid;

wherein the positive electrode and the negative electrode are separated by an inert porous separator, and wherein at least one of the first or second active materials comprises a blend according to claim 1, and the first or second current collector comprises lead.

36. An electrode comprising a binder and the blend of claim 1.

37. A composition comprising the blend of claim 1 and an electrolyte.

38. A method for preparing the composition of claim 37, the method comprising admixing the blend and the electrolyte.

39. The device of claim 34, wherein the electrical energy storage device is for use in a microhybrid, start-stop hybrid, mild-hybrid vehicle, vehicle with electric turbocharging, vehicle with regenerative braking, hybrid vehicle, an electric vehicle, industrial motive power such as forklifts, electric bikes, golf carts, aerospace applications, a power storage and distribution grid, a solar or wind power system, a power backup system or a cellular tower power system.

40. The blend of claim 1, wherein the amorphous carbon particles have a pH greater than 9.

41. The blend of claim 1, wherein the amorphous carbon particles are mesoporous.

\* \* \* \* \*